(12) United States Patent  (10) Patent No.: US 8,111,155 B2
Barber et al.  (45) Date of Patent: *Feb. 7, 2012

(54) DETECTION AND CONTROL OF PESTS

(75) Inventors: Daniel T. Barber, Coarsegold, CA (US); Don Black, Boulder, WY (US)

(73) Assignee: Dow AgroSciences LLC, Indianapolis, IN (US)

( * ) Notice: Subject to any disclaimer, the term of this patent is extended or adjusted under 35 U.S.C. 154(b) by 77 days.

This patent is subject to a terminal disclaimer.

(21) Appl. No.: 11/894,268

(22) Filed: Aug. 20, 2007
(Under 37 CFR 1.47)

(65) Prior Publication Data

US 2008/0055094 A1  Mar. 6, 2008

Related U.S. Application Data

(60) Continuation of application No. 11/605,009, filed on May 31, 2007, now Pat. No. 7,719,429, which is a division of application No. 10/406,121, filed on Apr. 3, 2003, now Pat. No. 7,212,112, which is a continuation of application No. PCT/US02/24186, filed on Jul. 31, 2002, which is a continuation-in-part of application No. 10/103,460, filed on Mar. 21, 2002, now Pat. No. 7,212,129, which is a continuation-in-part of application No. 09/925,392, filed on Aug. 9, 2001, now Pat. No. 7,262,702, which is a continuation-in-part of application No. PCT/US00/26373, filed on Sep. 25, 2000, and a continuation-in-part of application No. 09/669,316, filed on Sep. 25, 2000, now Pat. No. 6,724,312, which is a continuation-in-part of application No. PCT/US99/16519, filed on Jul. 21, 1999.

(51) Int. Cl.
*G08B 1/00* (2006.01)
*G08B 13/14* (2006.01)
*G08B 21/00* (2006.01)
*H02B 1/00* (2006.01)
*H05K 1/00* (2006.01)
*A01M 1/24* (2006.01)
*A01M 7/00* (2006.01)
*G01D 7/00* (2006.01)
*G01G 9/00* (2006.01)

(52) U.S. Cl. ............... 340/539.2; 340/572.1; 340/573.1; 340/652; 340/870.16; 361/600; 361/748; 43/124; 43/132.1; 73/587; 73/865.8

(58) Field of Classification Search .................. None
See application file for complete search history.

(56) References Cited

U.S. PATENT DOCUMENTS 3,564,750 A  2/1971 Burgess
(Continued)

FOREIGN PATENT DOCUMENTS

DE  2811 532 A1  6/1979
(Continued)

OTHER PUBLICATIONS

Charge Transfer Sensing; Hal Philipp; Copyright 1997.
(Continued)

*Primary Examiner* — Julie Lieu
(74) *Attorney, Agent, or Firm* — Carl D. Corvin; Krieg DeVault

(57) ABSTRACT

Among the embodiments of the present invention are pest control devices (1010, 1110, 1210) each operable to detect the presence of pests. The pest control device (1010, 1110, 1210) has a bait (1032) that is consumed or displaced by one or more species of pest, a pest sensing circuit (1052, 1152, 1252), and a monitoring circuit (1069, 1169, 1269). The pest sensing circuit (1052, 1152, 1252) can be altered by pest activity. The monitoring circuit (1069, 1169, 1269) detects this alteration and reports it automatically or in response to an external stimulus or interrogation to indicate pest presence.

6 Claims, 29 Drawing Sheets

U.S. PATENT DOCUMENTS

| | | | |
|---|---|---|---|
| 3,778,805 A | 12/1973 | Gould | |
| 3,836,842 A | 9/1974 | Zimmermann et al. | |
| 4,074,456 A | 2/1978 | Tidwell | |
| 4,105,971 A | 8/1978 | Nevalainen | |
| 4,127,110 A | 11/1978 | Bullara | |
| 4,136,338 A | 1/1979 | Antenore | |
| 4,265,252 A | 5/1981 | Chubbuck et al. | |
| 4,366,644 A | 1/1983 | Lawrence | |
| 4,387,529 A | 6/1983 | Hedstrom | |
| 4,455,441 A | 6/1984 | Prestwich | |
| 4,472,904 A | 9/1984 | Wasielewski | |
| 4,653,221 A | 3/1987 | Pratscher | |
| 4,688,026 A | 8/1987 | Scribner et al. | |
| 4,737,770 A | 4/1988 | Brunius et al. | |
| 4,737,789 A | 4/1988 | Nysen | |
| 4,862,145 A | 8/1989 | Meehan et al. | |
| 4,951,057 A | 8/1990 | Nagel | |
| 4,988,510 A | 1/1991 | Brenner et al. | |
| 5,024,832 A | 6/1991 | Omata et al. | |
| 5,134,892 A | 8/1992 | Wilson et al. | |
| 5,209,233 A | 5/1993 | Holland et al. | |
| 5,237,310 A | 8/1993 | Smith | |
| 5,285,688 A | 2/1994 | Robbins et al. | |
| 5,329,726 A | 7/1994 | Thorne et al. | |
| 5,428,345 A | 6/1995 | Bruno | |
| 5,429,735 A | 7/1995 | Johnson et al. | |
| 5,465,525 A | 11/1995 | Mifune et al. | |
| 5,528,222 A | 6/1996 | Moskowitz et al. | |
| 5,564,222 A | 10/1996 | Brody | |
| 5,571,967 A | 11/1996 | Tanaka et al. | |
| 5,575,105 A | 11/1996 | Otomo | |
| 5,592,774 A | 1/1997 | Galyon | |
| 5,648,758 A | 7/1997 | Tweadey, II et al. | |
| 5,661,651 A | 8/1997 | Geschke et al. | |
| 5,739,514 A | 4/1998 | Uchida | |
| 5,764,138 A | 6/1998 | Lowe | |
| 5,815,090 A | 9/1998 | Su | |
| 5,864,241 A | 1/1999 | Schreck et al. | |
| 5,876,577 A | 3/1999 | McAleer et al. | |
| 5,877,422 A | 3/1999 | Otto | |
| 5,892,444 A | 4/1999 | Wittmer et al. | |
| 5,894,818 A | 4/1999 | Betzen | |
| 5,910,776 A | 6/1999 | Black | |
| 5,950,356 A | 9/1999 | Nimocks | |
| 5,974,344 A | 10/1999 | Shoemaker et al. | |
| 5,974,726 A | 11/1999 | Creeger et al. | |
| 5,986,570 A | 11/1999 | Black et al. | |
| 6,016,625 A | 1/2000 | Bishoff et al. | |
| 6,025,725 A | 2/2000 | Gershenfeld et al. | |
| 6,052,066 A | 4/2000 | Su | |
| 6,100,805 A | 8/2000 | Lake | |
| 6,111,520 A | 8/2000 | Allen et al. | |
| 6,130,602 A | 10/2000 | O'Toole et al. | |
| 6,150,944 A | 11/2000 | Martin et al. | |
| 6,178,834 B1 | 1/2001 | Cates | |
| 6,243,014 B1 | 6/2001 | Lake et al. | |
| 6,255,959 B1 | 7/2001 | Lake et al. | |
| 6,281,799 B1 | 8/2001 | Lake et al. | |
| 6,304,185 B1 | 10/2001 | Tuttle et al. | |
| 6,313,748 B1 | 11/2001 | Lake | |
| 6,339,897 B1 | 1/2002 | Hayes et al. | |
| 6,370,812 B1 | 4/2002 | Burns et al. | |
| 6,397,516 B1 | 6/2002 | Su | |
| 6,404,210 B1 | 6/2002 | Su | |
| 6,515,591 B2 | 2/2003 | Lake et al. | |
| 6,630,887 B2 | 10/2003 | Lake | |
| 6,724,312 B1 | 4/2004 | Barber et al. | |
| 6,914,529 B2 | 7/2005 | Barber et al. | |
| 7,212,112 B2 | 5/2007 | Barber et al. | |
| 7,212,129 B2 | 5/2007 | Barber et al. | |
| 7,262,702 B2 * | 8/2007 | Barber et al. | 340/573.1 |
| 2001/0009399 A1 | 7/2001 | Barber et al. | |
| 2001/0033230 A1 | 10/2001 | Barber et al. | |
| 2001/0054962 A1 | 12/2001 | Barber et al. | |
| 2003/1894442 | 10/2003 | Gardner, Jr. et al. | |
| 2007/0120690 A1 | 5/2007 | Barber et al. | |
| 2010/0123554 A1 * | 5/2010 | Tolley et al. | 340/10.1 |

FOREIGN PATENT DOCUMENTS

| | | |
|---|---|---|
| EP | 0 283 142 A1 | 9/1988 |
| EP | 2 286 662 A1 | 2/2011 |
| FR | 2 411 563 A | 7/1979 |
| GB | 1 513 190 | 6/1978 |
| JP | 7-043460 | 2/1995 |
| JP | 07-115887 | 5/1995 |
| JP | 07-197554 | 8/1995 |
| JP | 07-303430 | 11/1995 |
| JP | 09-026320 | 1/1997 |
| JP | 9-026320 | 1/1997 |
| JP | 9-098701 | 4/1997 |
| JP | 10-056935 | 3/1998 |
| JP | 10-56935 | 3/1998 |
| JP | 10-84834 | 4/1998 |
| JP | 10-105861 | 4/1998 |
| JP | 11-239440 | 9/1999 |
| WO | WO 93/23998 | 12/1993 |
| WO | WO 98/18319 | 5/1998 |
| WO | WO 98/46071 | 9/1998 |
| WO | WO 00/79243 | 12/2000 |
| WO | WO 01/06851 | 2/2001 |
| WO | WO 02/26033 | 4/2002 |
| WO | WO 03/013237 | 2/2003 |
| WO | WO 03/079779 | 10/2003 |

OTHER PUBLICATIONS

Passive RFID Device with Sensor Input; Microchip Technology Inc.; 1999.

Sentricon Colony Elimination System; Mar. 26, 1999.

DS2405 Addressable Switch, Dallas Semiconductor, Jul. 2002.

Abstract XP-002167430, Jennifer Jurgens, "Development and Evaluation of an Inexpensive Sensor System for Use in Measuring Relative Finger Positions",vol. 19, Medical Engineering & Physics, Elsevier Science Ltd., Oxford, England, Jan. 1997.

Abstract XP-002167431, Miyauchi Shin'nosuke, Ohmiya Yukio, Yokotsuka Masatoshi, Ohkita Kumakazu, "Electrical Properties of Carbon Black-Graft Polymers Crosslinked with Peroxide-Divinyl Monomer System", vol. 25, J Soc Mater Sci Jpn, Oct. 1976.

Abstract XP-002167432, RL Rosenbaum, "Survey of Some Secondary Thermometers for Possible Applications At Very Low Temperatures", vol. 41, Rev Sci Instrum, Jan. 1970.

Extended European Search Report and Search Opinion, EP10177488.3, European Patent Office, Munich, Germany, Nov. 17, 2010.

Japanese Written Opinion; Japanese Patent Application 2009-21179; Mailed Apr. 5, 2011.

* cited by examiner

DETECTION AND CONTROL OF PESTS

CROSS-REFERENCE TO RELATED APPLICATIONS

The present application is a continuation of U.S. patent application Ser. No. 11/605,009 (filed 31 May 2007) now U.S. Pat. No. 7,719,429 which is a divisional of U.S. patent application Ser. No. 10/406,121 (filed 3 Apr. 2003), now U.S. Pat. No. 7,212,112 which is a continuation of International Patent Application Number PCT/US02/24186 (filed 31 Jul. 2002), which is a continuation-in-part of U.S. patent application Ser. No. 10/103,460 (filed 21 Mar. 2002), now U.S. Pat. No. 7,212,129 which is a continuation-in-part of U.S. patent application Ser. No. 09/925,392 (filed 9 Aug. 2001), now U.S. Pat. No. 7,262,702 which is a continuation-in-part of International Patent Application Number PCT/US00/26373 (filed 25 Sep. 2000 and published in English 4 Apr. 2002) and U.S. patent application Ser. No. 09/669,316 (filed 25 Sep. 2000), now U.S. Pat. No. 6,724,312 both of which are a continuation-in-part of International Patent Application Number PCT/US99/16519 (filed 21 Jul. 1999 and published in English 1 Feb. 2001).

BACKGROUND

The present invention relates to data gathering and sensing techniques, and more particularly, but not exclusively, relates to techniques for gathering data from one or more pest control devices.

The removal of pests from areas occupied by humans, livestock, and crops has long been a challenge. Pests of frequent concern include various types of insects and rodents. Subterranean termites are a particularly troublesome type of pest with the potential to cause severe damage to wooden structures. Various schemes have been proposed to eliminate termites and certain other harmful pests of both the insect and noninsect variety. In one approach, pest control relies on the blanket application of chemical pesticides in the area to be protected. However, as a result of environmental regulations, this approach is becoming less desirable.

Recently, advances have been made to provide for the targeted delivery of pesticide chemicals. U.S. Pat. No. 5,815,090 to Su is one example. Another example directed to termite control is the SENTRICON™ system of Dow AgroSciences that has a business address of 9330 Zionsville Road, Indianapolis, Ind. In this system, a number of units each having a termite edible material, are placed in the ground about a dwelling to be protected. The units are inspected routinely by a pest control service for the presence of termites, and inspection data is recorded with reference to a unique barcode label associated with each unit. If termites are found in a given unit, a bait is installed that contains a slow-acting pesticide intended to be carried back to the termite nest to eradicate the colony.

However, techniques for more reliably and/or cost-effectively sensing the activity of termites or other pests are desired. Alternatively or additionally, the ability to gather more comprehensive data relating to pest behavior is sought. Thus, there is a continuing demand for further advancement in the area of pest control and related sensing technologies.

SUMMARY

One embodiment of the present invention includes a unique sensing technique applicable to the control of pests. In another embodiment, a unique technique to gather data concerning pest activity is provided. A further embodiment includes a unique pest control device to detect and exterminate one or more selected species of pest. As used herein, a "pest control device" refers broadly to any device that is used to sense, detect, monitor, bait, feed, poison, or exterminate one or more species of pest.

Another embodiment of the present invention includes a unique pest control system. This system includes a number of pest control devices and an apparatus to gather data from the pest control devices. In one embodiment, the apparatus communicates with the pest control devices using wireless techniques and can also be arranged to locate the devices. The pest control devices can be of different types, at least some of which are configured to provide information relating to different levels of pest activity in addition to an indication of whether pests are present or not.

Still another embodiment of the present invention includes a pest control device with a circuit including one or more sensing elements operable to be consumed or displaced by one or more pests. This circuit monitors an electrical and/or magnetic property of the one or more sensing elements that is indicative of different nonzero levels of pest consumption or displacement.

In still another embodiment, a sensor includes one or more portions operable to be separated or removed from each other and a circuit operable to monitor a property corresponding to electrical capacitance that changes with removal or separation of the one or more portions from the sensor. This separation or removal can occur due to consumption or displacement by pests; wear, erosion, or abrasion by mechanical means, and/or a chemical reaction. Accordingly, the sensor can be used to monitor various pest activities, mechanical operations, and chemical alterations to name only a few.

For a further embodiment of the present invention, one or more pest control devices are installed that each include a respective bait for one or more species of pest, a respective pest sensor, and respective communicative circuitry coupled to the respective pest sensor. A stimulus is provided to one of the pest control devices to activate the respective communication circuitry. In response to the stimulus, status information about the respective pest sensor is received.

For still a further embodiment, a pest control device includes a bait operable to be consumed or displaced by one or more species of pest, a pest sensing circuit, and a monitoring circuit to monitor status of the pest sensing member. The monitoring circuit includes one or more indicators and a device responsive to a magnetic field to provide information about the pest sensing circuit with the one or more indicators.

Another embodiment of the present invention includes: installing a pest control device including a bait, a pest sensing member, and a monitoring circuit to monitor status of the pest sensing member; applying a magnetic field to the pest control device to stimulate operation of the monitoring circuit; and providing information about the pest sensing member from the monitoring circuit in response to the applied magnetic field. In one form, the pest control device includes one or more visual indicators to provide the information. Alternatively or additionally, the magnetic field can be applied externally using an operator-controlled wand or the like and the monitoring circuit includes a magnetic switch responsive to the magnetic field.

One object of the present invention is to provide a unique sensing technique applicable to the control of pests.

Another object of the present invention is to provide a unique method, system, device or apparatus to gather data concerning pest activity and/or detect and exterminate one or more species of pest.

Other embodiments, forms, aspects, features, and objects of the present invention shall become apparent from the drawings and description contained herein.

DESCRIPTION OF THE PREFERRED EMBODIMENTS

Figure 1:
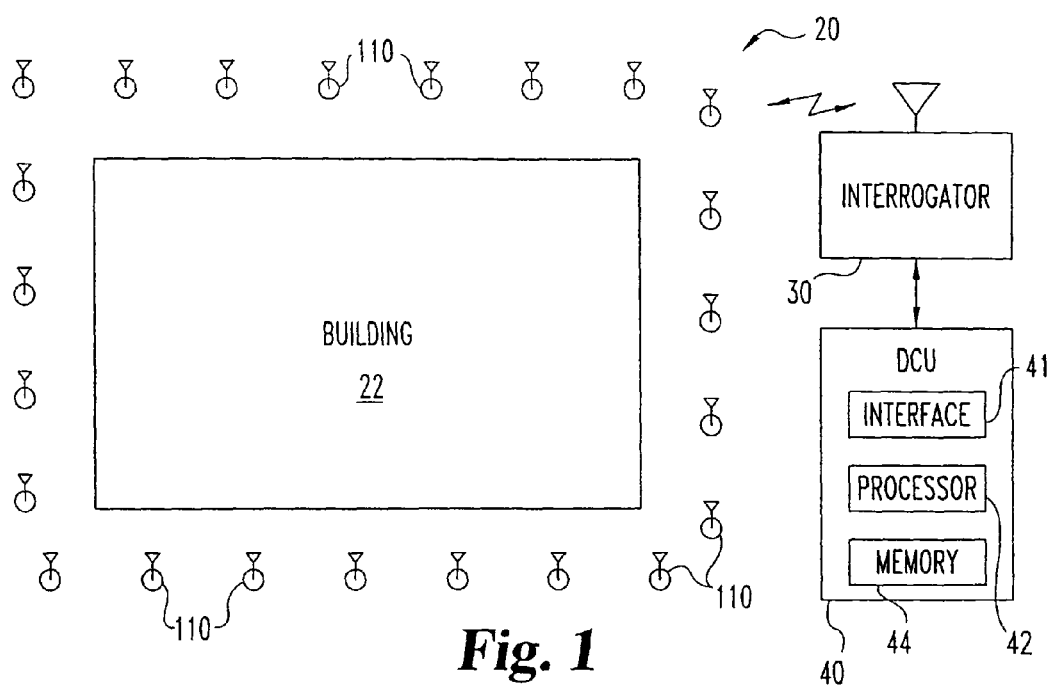
FIG. 1 is a diagrammatic view of a first type of pest control system according to the present invention that includes several of a first type of pest control device.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates pest control system 20 of one embodiment of the present invention. System 20 is arranged to protect building 22 from damage due to pests, such as subterranean termites. System 20 includes a number of pest control devices 110 positioned about building 22. In FIG. 1, only a few of devices 110 are specifically designated by reference numerals to preserve clarity. System 20 also includes interrogator 30 to gather information about devices 110. Data gathered from devices 110 with interrogator 30 is collected in Data Collection Unit (DCU) 40 through communication interface 41.

Figure 2:
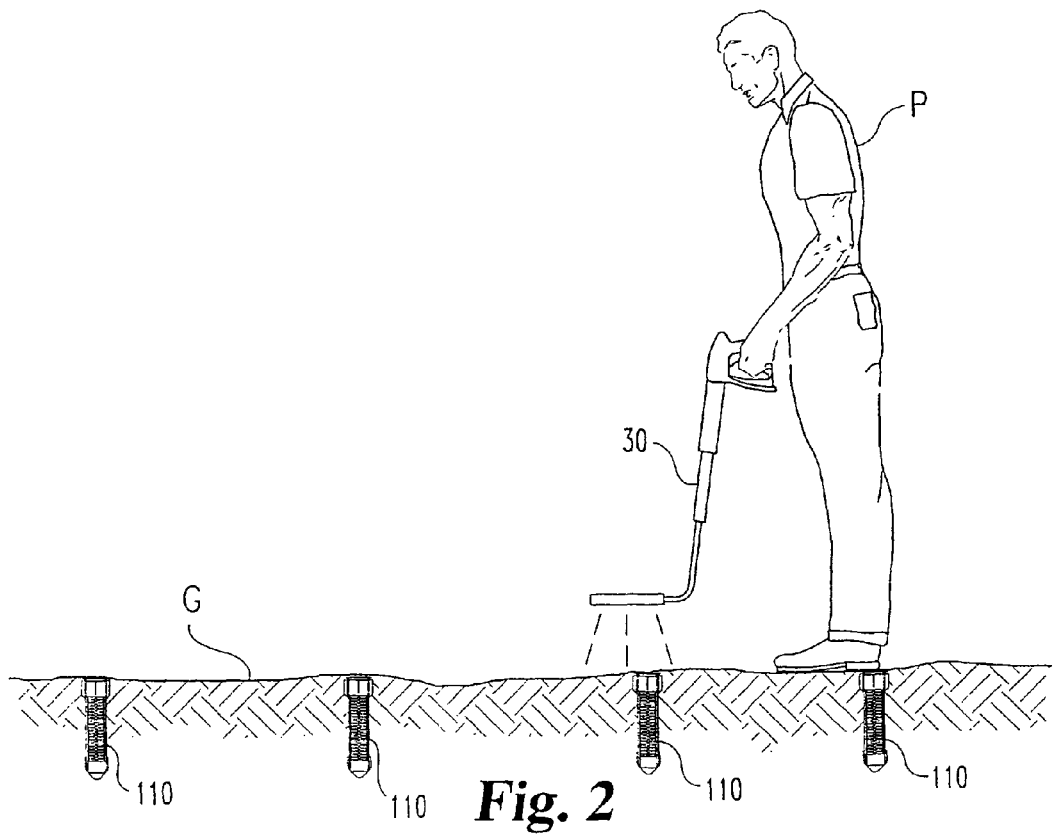
FIG. 2 is a view of selected elements of the system of FIG. 1 in operation.

Referring additionally to FIG. 2, certain aspects of the operation of system 20 are illustrated. In FIG. 2, a pest control service provider P is shown operating interrogator 30 to interrogate pest control devices 110 located at least partially below ground G using a wireless communication technique. In this example, interrogator 30 is shown in a hand-held form convenient for sweeping over ground G to establish wireless communication with installed devices 110. Additional aspects of system 20 and its operation are described in connection with FIGS. 8-10, but first further details concerning a representative pest control device 110 are described with reference to FIGS. 3-7.

Figure 3:
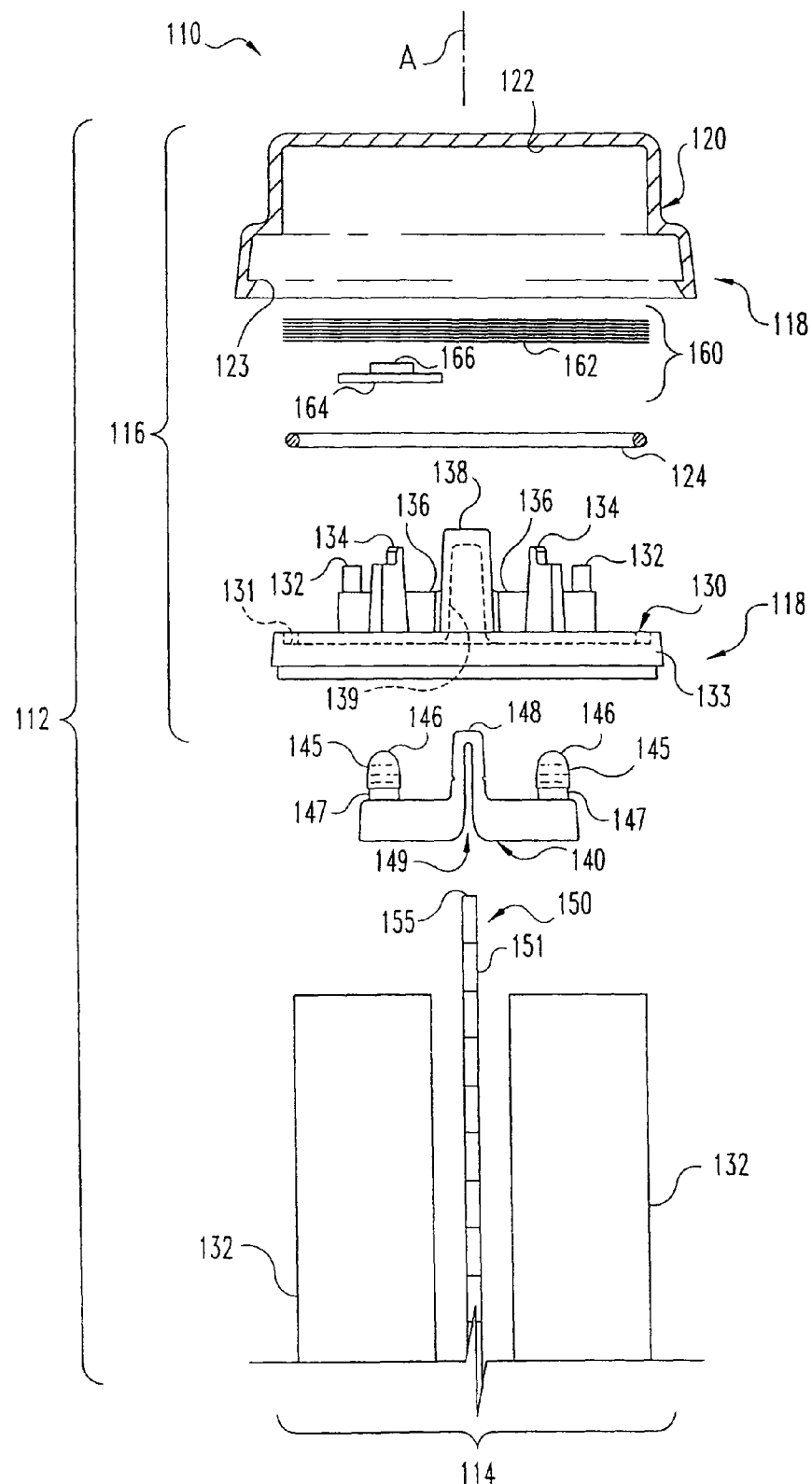
FIG. 3 is an exploded, partial sectional view of a pest monitoring assembly of the first type of pest control device.
Figure 4:
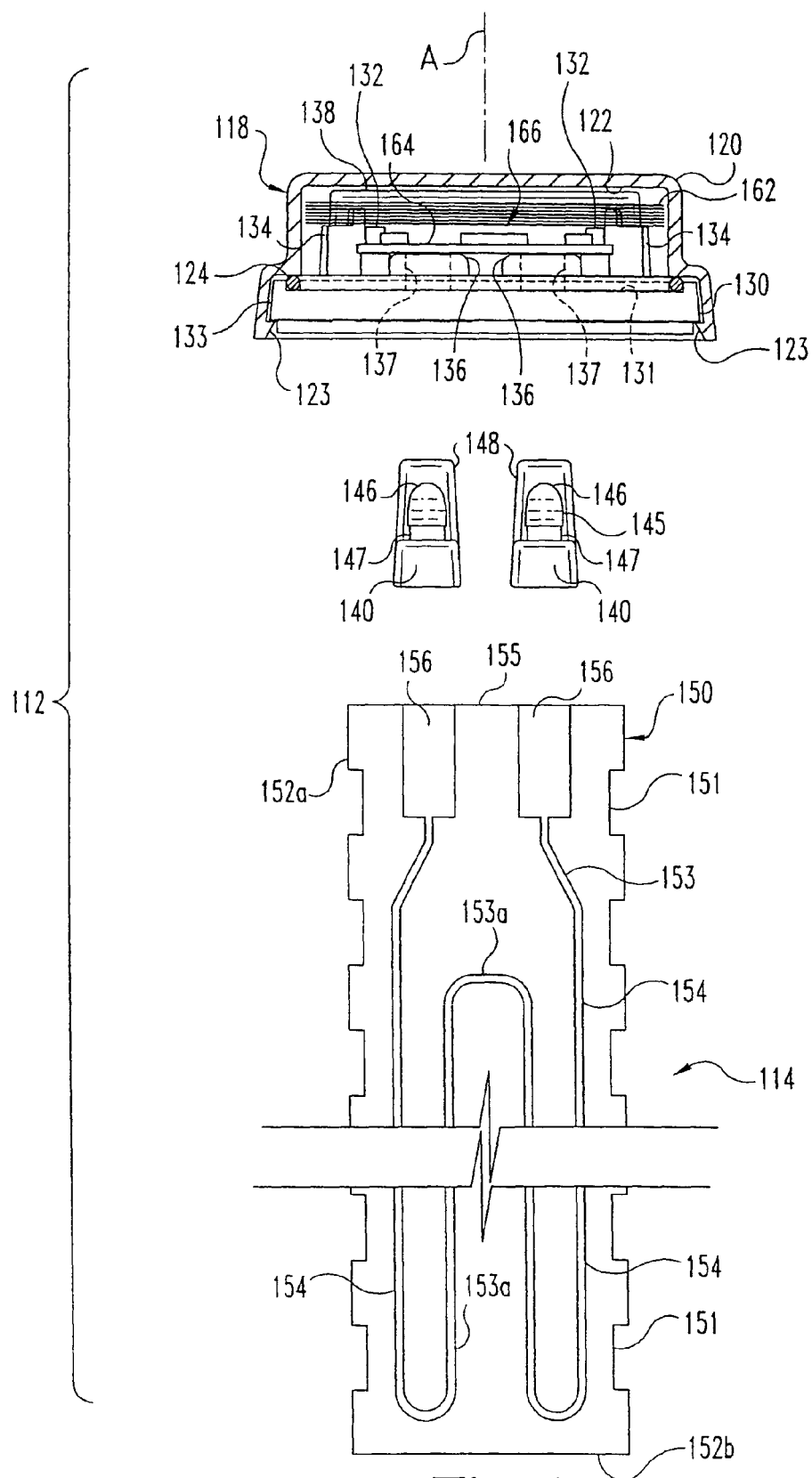
FIG. 4 is an exploded, partial sectional view of the pest monitoring assembly of FIG. 3 along a view plane perpendicular to the view plane of FIG. 3.

FIGS. 3-7 illustrates various features of pest control device 110. To initially detect pests, pest control device 110 is internally configured with pest monitoring assembly 112. Referring more specifically to FIGS. 3 and 4, pest monitoring assembly 112 is illustrated along centerline assembly axis A. Axis A coincides with the view planes of both FIGS. 3 and 4; where the view plane of FIG. 4 is perpendicular to the view plane of FIG. 3.

Pest monitoring assembly 112 includes sensor subassembly 114 below communication circuit subassembly 116 along axis A. Sensor subassembly 114 includes two (2) bait members 132 (see FIGS. 3 and 6). Bait members 132 are each made from a bait material for one or more selected species of pests. For example, bait members 132 can each be made of a material that is a favorite food of such pests. In one example directed to subterranean termites, bait members 132 are each in the form of a soft wood block without a pesticide component. In other examples for termites, one or more of bait members 132 can include a pesticide, have a composition other than wood, or a combination of these features. In still other examples where pest control device 110 is directed to a type of pest other than termites, a correspondingly different composition of each bait member 132 is typically used.

Figure 6:
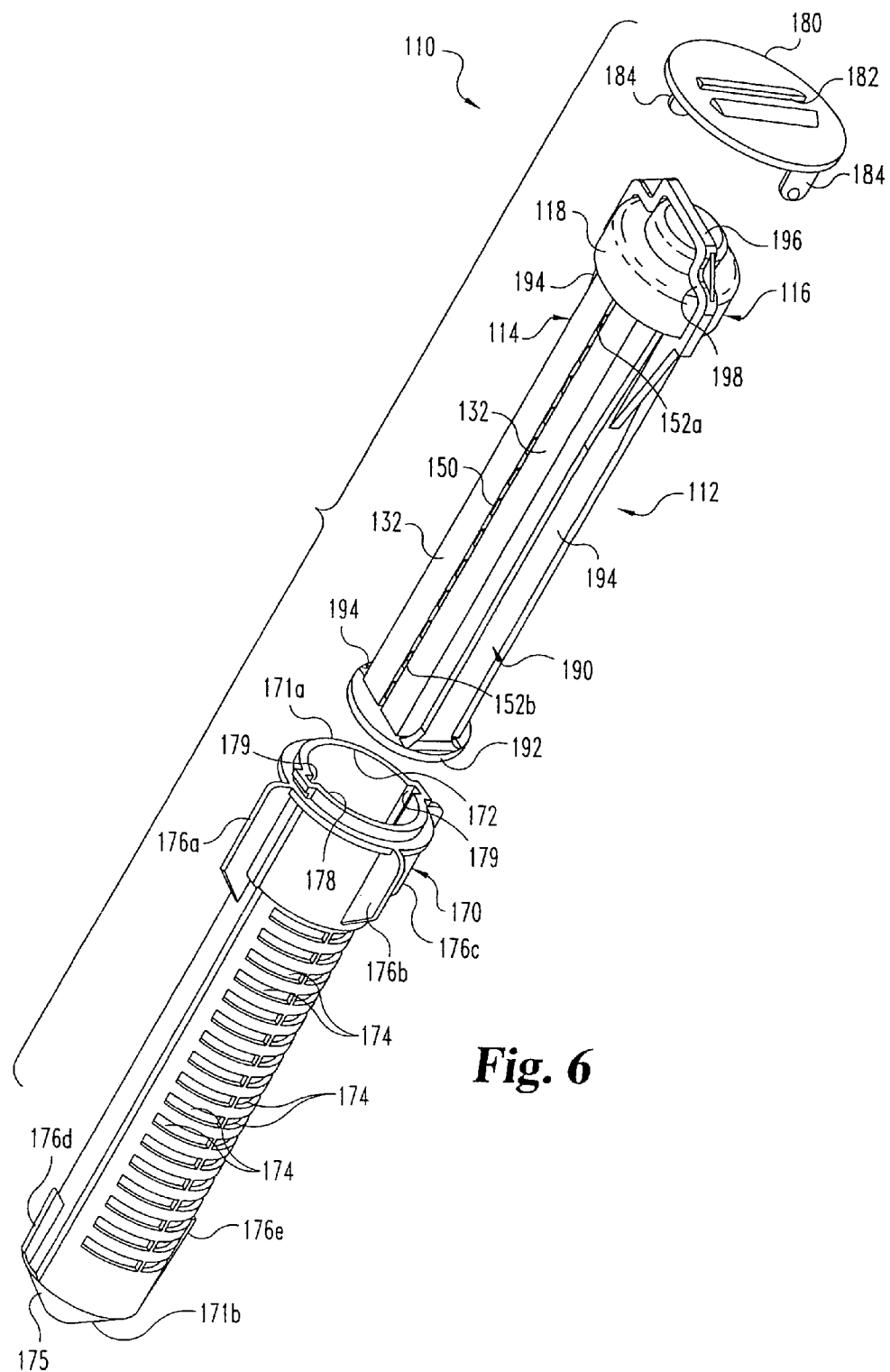
FIG. 6 is an exploded assembly view of the first type of pest control device with the pest monitoring assembly of FIG. 3.

Sensor subassembly 114 also includes sensor 150. Sensor 150 is depicted between bait members 132 in FIGS. 3 and 6; where FIG. 6 is a more fully assembled view of pest control device 110 than FIG. 3. Sensor 150 is generally elongated and has end portion 152a opposite end portion 152b as shown in FIGS. 4 and 6. A middle portion of sensor 150 is represented by a pair of adjacent break lines separating portions 152a and 152b in FIG. 4, and bait members 132 are not shown in FIG. 4 to prevent obscuring the view of sensor 150.

Sensor 150 includes substrate 151. Substrate 151 carries conductor 153 that is arranged to provide sensing element 153a in the form of an electrically conductive loop or pathway 154 shown in the broken view of FIG. 4. Along the middle sensor portion represented by the break lines of FIG. 4, the four segments of pathway 154 continue along a generally straight, parallel route (not shown), and correspondingly join the four pathway segments of end portion 152a ending at one of the break lines with the four pathway segments of end portion 152b ending at another of the break lines. Pathway 154 terminates with a pair of electrical contact pads 156 adjacent substrate edge 155 of end portion 152a.

Substrate 151 and/or conductor 153 are/is comprised of one or more materials susceptible to consumption or displacement by the pests being monitored with pest monitoring assembly 112. These materials can be a food substance, a nonfood substance, or a combination of both for the one or more pest species of interest. Indeed, it has been found that materials composed of nonfood substances will be readily displaced during the consumption of adjacent edible materials, such as bait members 132. As substrate 151 or conductor 153 are consumed or displaced, pathway 154 is eventually altered. This alteration can be utilized to indicate the presence of pests by monitoring one or more corresponding electrical properties of pathway 154 as will be more fully described hereinafter. Alternatively, substrate 151 and/or conductor 153 can be oriented with respect to bait members 132 so that a certain degree of consumption or displacement of bait members 132 exerts a mechanical force sufficient to alter the electrical conductivity of pathway 154 in a detectable manner. For this alternative, substrate 151 and/or conductor 153 need not be directly consumed or displaced by the pest of interest.

Pest monitoring assembly 112 further includes circuit subassembly 116 coupled to sensor subassembly 114. Circuit subassembly 116 is arranged to detect and communicate pest activity as indicated by a change in one or more electrical properties of pathway 154 of sensor subassembly 114. Circuit subassembly 116 includes circuit enclosure 118 for housing communication circuitry 160 and a pair of connection members 140 for detachably coupling communication circuitry 160 to sensor 150 of sensor subassembly 114. Various operational aspects of this arrangement are described in connection with FIGS. 8-10 hereinafter. Enclosure 118 includes cover piece 120, o-ring 124, and base 130, that each have a generally circular outer perimeter about axis A. Enclosure 118 is shown more fully assembled in FIG. 4 relative to FIG. 3. Cover piece 120 defines cavity 122 bounded by inner lip 123. Base 130 defines channel 131 (shown in phantom) sized to receive o-ring 124 and also includes outer flange 133 configured to engage inner lip 123 when base 130 is assembled with cover piece 120 (see FIG. 4).

Figure 5:
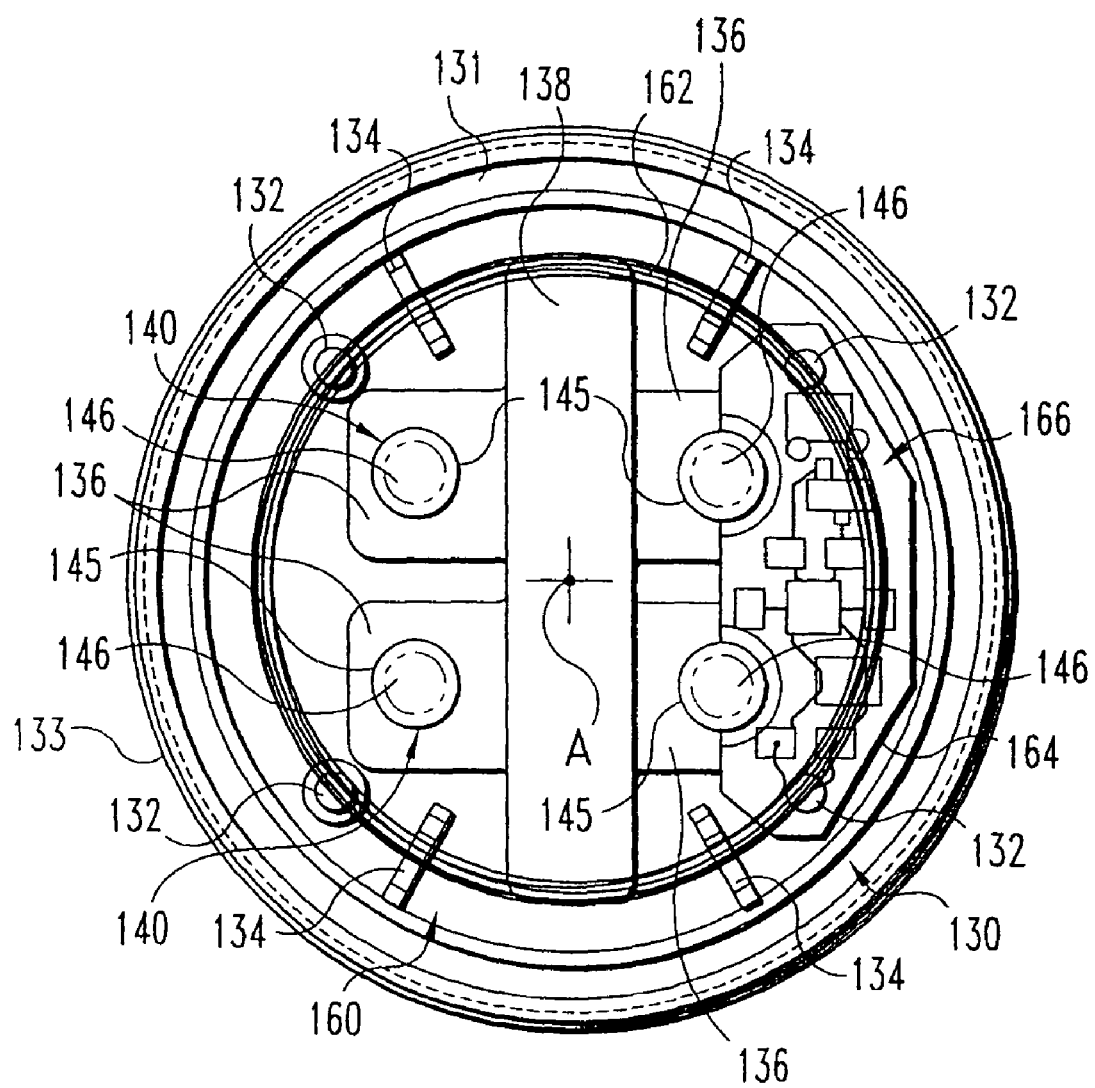
FIG. 5 is a partial, top view of a portion of a communication circuit subassembly of the pest monitoring assembly shown in FIGS. 3 and 4.

Communication circuitry 160 is positioned between cover piece 120 and base 130. Communication circuitry 160 includes coil antenna 162 and printed wiring board 164 carrying circuit components 166. Referring also to FIG. 5, a top view is shown of an assembly of base 130, connection members 140, and wireless communication circuitry 160. In FIG. 5, axis A is perpendicular to the view plane and is represented by like labeled cross-hairs. Base 130 includes posts 132 to engage mounting holes through printed wiring board 164. Base 130 also includes mounts 134 to engage coil antenna 162 and maintain it in fixed relation to base 130 and printed wiring board 164 when assembled together. Base 130 further includes four supports 136 each defining opening 137 therethrough as best illustrated in FIG. 4. Base 130 is shaped with a centrally located projection 138 between adjacent pairs of supports 136. Projection 138 defines recess 139 (shown in phantom in FIG. 3).

Referring generally to FIGS. 3-5, connection members 140 each include a pair of connection nubs 146. Each nub 146 has neck portion 147 and head portion 145 that extend from opposing end portions of the respective connection member 140. For each connection member 140, projection 148 is positioned between the corresponding pair of nubs 146. Projection 148 defines recess 149. Connection members 140 are formed from an electrically conductive, elastomeric material. In one embodiment, each connection member 140 is made from a carbon-containing silicone rubber, such as compound 862 available from TECKNIT, having a business address of 129 Dermody Street, Cranford, N.J. 07016. Nonetheless, in other embodiments, a different composition can be used.

To assemble each connection member 140 to base 130, the corresponding pair of nubs 146 are inserted through a respective pair of openings 137 of supports 136, with projection 148 extending into recess 139. Head portion 145 of each of nubs 146 is sized to be slightly larger than the respective opening 137 through which it is to pass. As a result, during insertion, head portions 145 are elastically deformed until fully passing through the respective opening 137. Once head portion 145 extends through opening 137, it returns to its original shape with neck 147 securely engaging the opening margin. By appropriate sizing and shaping of head portion 145 and neck portion 147 of nubs 146, openings 137 can be sealed to resist the passage of moisture and debris when base 130 and connection members 140 are assembled together. As shown in FIG. 5, printed wiring board 164 contacts one nub 146 of each connection member 140 after assembly.

After connection members 140 are assembled with base 130, enclosure 118 is assembled by inserting base 130 into cavity 122 with o-ring 124 carried in channel 131. During insertion, cover piece 120 and/or base 130 elastically deform so that flange 133 extends into cavity 122 beyond inner lip 123, such that cover piece 120 and base 130 engage each other with a "snap-fit" type of connection. The angled profile of the outer surface of base 130 facilitates this form of assembly. Once cover piece 120 and base 130 are connected in this manner, o-ring 124 provides a resilient seal to resist the intrusion of moisture and debris into cavity 122. The inner surface of cover piece 120 engaged by base 130 has a complimentary profile that can also assist with sealing.

After communication circuit subassembly 116 is assembled, sensor 150 is assembled to subassembly 116 by asserting end portion 152a into recess 149 of each connection member 140 carried by base 130. Connection members 140 are sized to be slightly elastically deformed by the insertion of end portion 152a into recess 149, such that a biasing force is applied by connection members 140 to end portion 152a to securely hold sensor 150 in contact therewith. Once end portion 152a is inserted into connection members 140, each pad 156 is electrically contacted by a different one of connection members 140. In turn, each nub 146 that contacts printed wiring board 164 electrically couples pathway 154 to printed wiring board 164.

Referring to FIG. 6, an exploded view of pest control device 110 and pest monitoring assembly 112 is depicted. In FIG. 6, sensor subassembly 114 and circuit subassembly 116 are shown assembled together and nested in carrying member 190 to maintain pest monitoring assembly 112 as a unit. Carrying member 190 is in the form of a frame that includes base 192 attached to opposing side members 194. Only one of side members 194 is fully visible in FIG. 6, with the other extending from base 192 along the hidden side of pest monitoring assembly 112 in a like manner. Side members 194 are joined together by bridge 196 opposite base 192. Bridge 196 is arranged to define a space 198 contoured to receive the assembled enclosure 118 of circuit subassembly 116.

Pest control device 110 includes housing 170 with removable cap 180 arranged for placement in the ground as shown, for example, in FIG. 2. Housing 170 defines chamber 172 intersecting opening 178. Pest monitoring assembly 112 and carrying member 190 are sized for insertion into chamber 172 through opening 178. Housing 170 has end portion 171a opposite end portion 171b. End portion 171b includes tapered end 175 to assist with placement of pest control 110 in the ground as illustrated in FIG. 2. End 175 terminates in an aperture (not shown). In communication with chamber 172 are a number of slots 174 defined by housing 170. Slots 174 are particularly well-suited for the ingress and egress of termites from chamber 172. Housing 170 has a number of protruding flanges a few of which are designated by reference numerals 176a, 176b, 176c, 176d, and 176e in FIG. 6 to assist with positioning of pest control device 110 in the ground.

Once inside chamber 172, pest monitoring assembly 112 can be secured in housing 170 with cap 180. Cap 180 includes downward prongs 184 arranged to engage channels 179 of housing 170. After cap 180 is fully seated on housing 170, it can be rotated to engage prongs 184 in a latching position that resists disassembly. This latching mechanism can include a pawl and detent configuration. Slot 182 can be used to engage cap 180 with a tool, such as a flat-bladed screwdriver, to assist in rotating cap 180. It is preferred that carrying member 190, base 130, cover piece 120, housing 170, and cap 180 be made of a material resistant to deterioration by expected environmental exposure and resistant to alteration by the pests likely to be detected with pest control device 110. In one form, these components are made from a polymeric resin like polypropylene or CYCOLAC AR polymeric plastic material available from General Electric Plastics, having a business address of One Plastics Avenue, Pittsfield, Mass. 01201.

Figure 7:
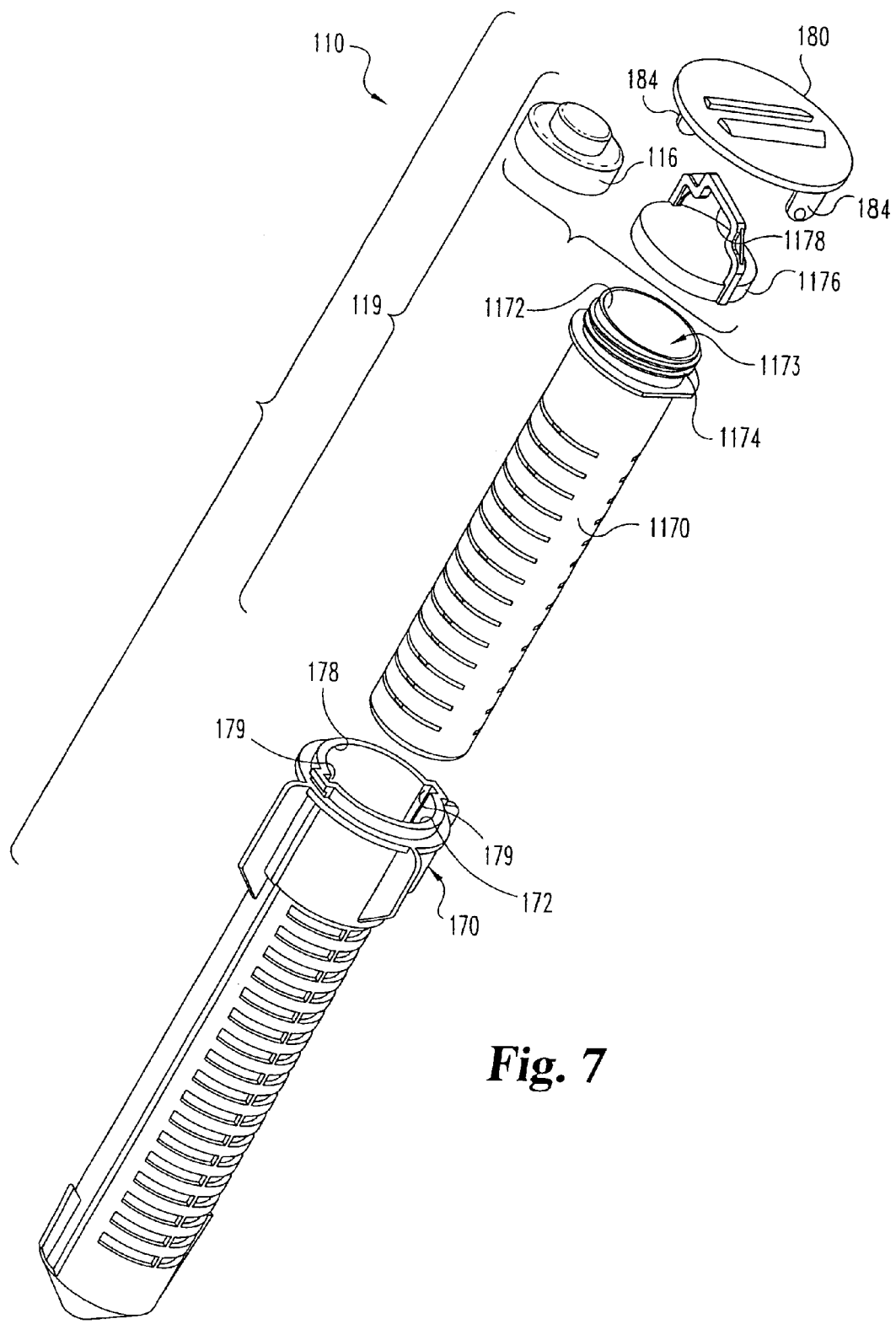
FIG. 7 is an exploded assembly view of the first type of pest control device with a pesticide delivery assembly in place of the pest monitoring assembly of FIG. 3.

Typically, pest monitoring assembly 112 is placed in chamber 172 after housing 170 is at least partially installed in the ground in the region to be monitored. Assembly 112 is configured to detect and report pest activity as will be more fully explained in connection with FIGS. 8-10. In one mode of operation, pest control device 110 is reconfigured to deliver a pesticide after pest activity is detected with pest monitoring assembly 112. FIG. 7 is an exploded assembly view of one example of such a reconfiguration. In FIG. 7, pest control device 110 utilizes pesticide delivery assembly 119 as a substitute for pest monitoring assembly 112 after pest activity has been detected. Substitution begins by rotating cap 180 in a direction opposite that required to latch it, and removing cap 180 from housing 170. Typically, the removal of cap 180 is performed with housing 170 remaining at least partially installed in the ground. Pest monitoring assembly 112 is then extracted from housing 170 by pulling carrying member 190. It has been found that application of pest control device 110 to pests such as termites can lead to the accumulation of a substantial amount of dirt and debris in chamber 172 before pest monitoring assembly 112 is removed. This accumulation can hamper the removal of pest monitoring assembly 112 from chamber 172. As a result, member 190 is preferably arranged to withstand at least 40 pounds (lbs.) of pulling force, and more preferably at least 80 lbs. of pulling force.

After pest monitoring assembly 112 is removed from chamber 172, pesticide delivery assembly 119 is placed in chamber 172 of housing 170 through opening 178. Pesticide delivery assembly 119 includes pesticide bait tube 1170 defining chamber 1172. Chamber 1172 contains pesticide bearing matrix member 1173. Tube 1170 has a threaded end 1174 arranged for engagement by cap 1176, which has complimentary inner threading (not shown). Cap 1176 defines aperture 1178. Circuit subassembly 116 is detached from sensor 150 before, during, or after removal of pest monitoring assembly 112 from housing 170. Aperture 1178 is accordingly sized and shaped to securely receive circuit subassembly 116 after disassembly from pest monitoring assembly 112. After pesticide delivery assembly 119 is configured with circuit subassembly 116, it is placed in chamber 1172, and cap 180 can re-engage housing 170 in the manner previously described.

Figure 8:
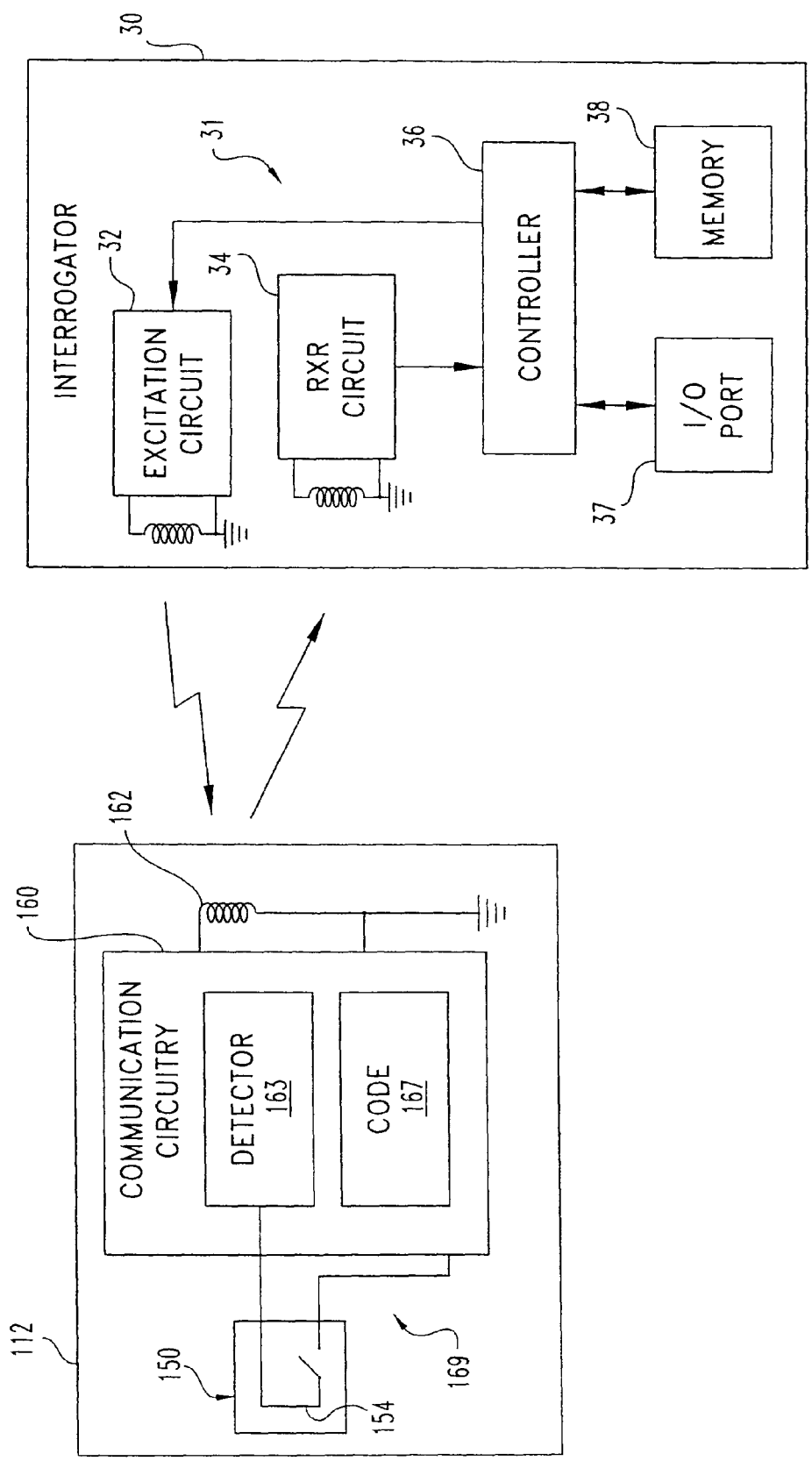
FIG. 8 is a schematic view of selected circuitry of the system of FIG. 1.

FIG. 8 schematically depicts circuitry of interrogator 30 and pest monitoring assembly 112 for a representative pest control device 110 of system 20 shown in FIG. 1. Monitoring circuitry 169 of FIG. 8 collectively represents communication circuitry 160 connected to conductor 153 of sensor 150 by connection members 140. In FIG. 8, pathway 154 of monitoring circuitry 169 is represented with a single-pole, single-throw switch corresponding to the capability of sensor 150 to provide a closed or open electrical pathway in accordance with pest activity. Further, communication circuitry 160 includes sensor state detector 163 to provide a two-state status signal when energized; where one state represents an open or high resistance pathway 154 and the other state represents an electrically closed or continuous-pathway 154. Communication circuit 160 also includes identification code 167 to generate a corresponding identification signal for device 110. Identification code 167 may be in the form of a predetermined multibit binary code or such other form as would occur to those skilled in the art.

Communication circuitry 160 is configured as a passive RF transponder that is energized by an external stimulation or excitation signal from interrogator 30 received via coil antenna 162. Likewise, detector 163 and code 167 of circuitry 160 are powered by this stimulation signal. In response to being energized by a stimulation signal, communication circuitry 160 transmits information to interrogator 30 with coil antenna 162 in a modulated RF format. This wireless transmission corresponds to the bait status determined with detector 163 and a unique device identifier provided by identification code 167.

Figure 9:
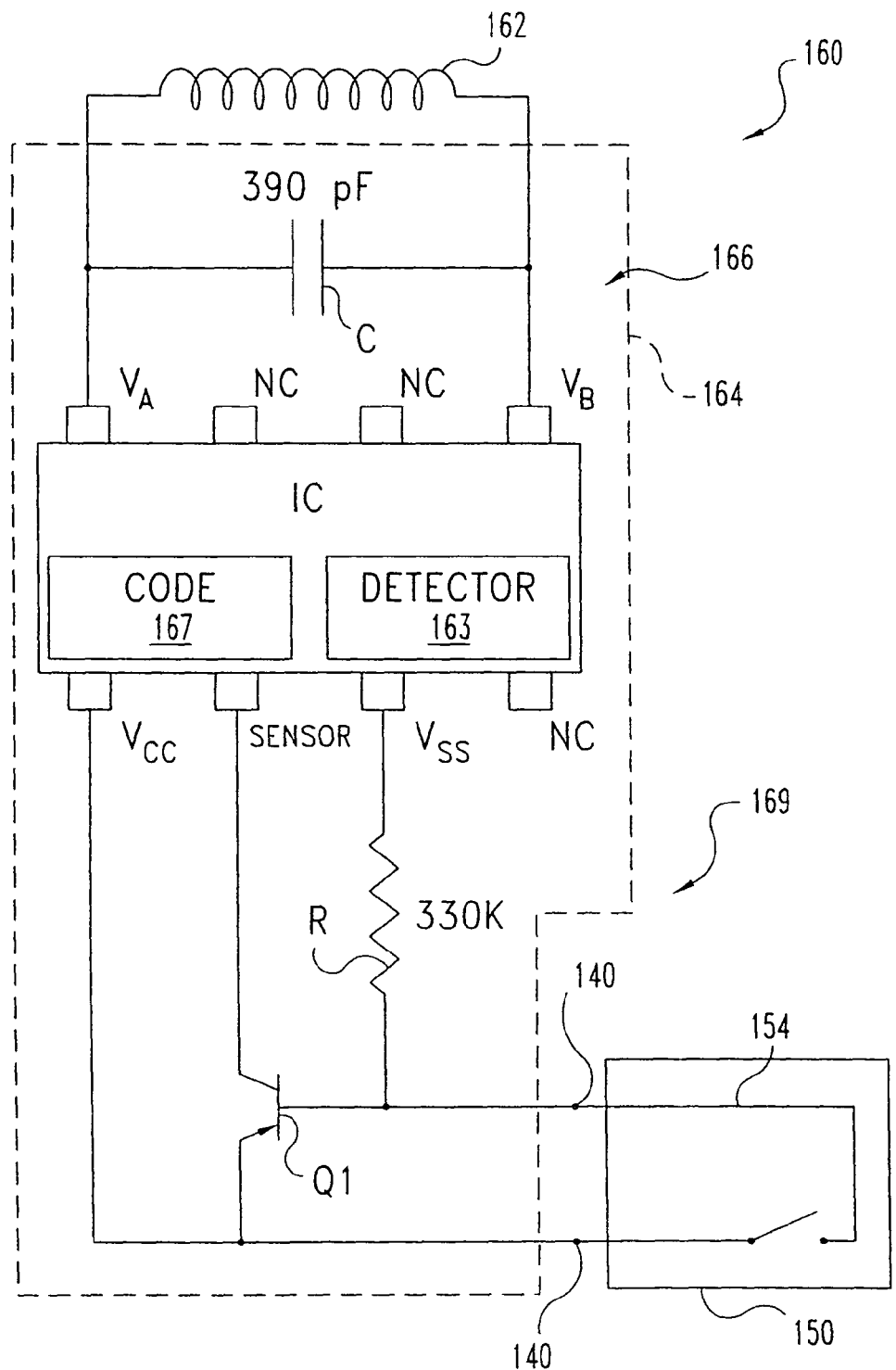
FIG. 9 is a schematic view of circuitry for the pest monitoring assembly of FIG. 3.

Referring additionally to FIG. 9, further details of communication circuitry 160 and monitoring circuitry 169 are depicted. In FIG. 9, a broken line box represents printed wiring board 164, circumscribing components 166 that it carries. Circuit components 166 include capacitor C, integrated circuit IC, resistor R, and PNP transistor Q1. In the depicted embodiment, integrated circuit IC is a passive, Radio Frequency Identification Device (RFID) model no. MCRF202 provided by Microchip Technologies, Inc of 2355 West Chandler Blvd., Chandler, Ariz. 85224-6199. Integrated circuit IC includes code 167 and detector 163.

IC also includes two (2) antenna connections $V_A$ and $V_B$, that are connected to a parallel network of coil antenna 162 and capacitor C. Capacitor C has a capacitance of about 390 picoFarads (pF), and coil antenna 162 has an inductance of about 4.16 milliHenries (mH) for the depicted embodiment. IC is configured to supply a regulated D.C. electric potential via contacts $V_{CC}$ and $V_{SS}$, with $V_{CC}$ being at a higher potential. This electric potential is derived from the stimulus RF input received with coil antenna 162 via connections $V_A$ and $V_B$. The $V_{CC}$ connection of IC is electrically coupled to the emitter of transistor Q1 and one of the electrical contact pads 156 of sensor 150. The base of transistor Q1 is electrically coupled to the other of electrical contact pads 156. Resistor R is electrically connected between the $V_{SS}$ connection of IC and the base of transistor Q1. The collector of transistor Q1 is coupled to the SENSOR input of IC. When intact, the serially connected electrically conductive pathway 154 and connection members 140 present a relatively low resistance compared to the depicted value of 330 Kilo-ohms for resistor R. Accordingly, the voltage presented at the base of transistor Q1 by the voltage divider formed by R, connection members 140, and electrically conductive pathway 154 is not sufficient to turn on transistor Q1—instead shunting current through R. As a result, the input SENSOR to IC is maintained at a logic low level relative to $V_{SS}$ via a pull-down resistor internal to IC (not shown). When the resistance of electrically conductive path 154 increases to indicate an open circuit condition, the potential difference between the emitter and base of transistor Q1 changes to turn-on transistor Q1. In correspondence, the voltage potential provided to the SENSOR input of IC is at a logic level high relative to $V_{SS}$. The transistor Q1 and resistor R circuit arrangement has the effect of reversing the logic level provided to the SENSOR input compared to placing electrically conductive pathway 154 directly across $V_{CC}$ and the SENSOR input.

In other embodiments, different arrangements of one or more components may be utilized to collectively or separately provide communication circuitry 160. In one alternative configuration, communication circuit 160 may transmit only a bait status signal or an identification signal, but not both. In a further embodiment, different variable information about device 110 may be transmitted with or without bait status or device identification information. In another alternative, communication circuit 160 may be selectively or permanently "active" in nature, having its own internal power source. For such an alternative, power need not be derived from an external stimulus signal. Indeed, device 110 could initiate communication instead. In yet another alternative embodiment, device 110 may include both active and passive circuits.

FIG. 8 also illustrates communication circuitry 31 of interrogator 30. Interrogator 30 includes RF excitation circuit 32 to generate RF stimulation signals and RF receiver (RXR) circuit 34 to receive an RF input. Circuits 32 and 34 are each operatively coupled to controller 36. While interrogator 30 is shown with separate coils for circuits 32 and 34, the same coil may be used for both in other embodiments. Controller 36 is operatively coupled to Input/Output (I/O) port 37 and memory 38 of interrogator 30. Interrogator 30 has its own power source (not shown) to energize circuitry 31 that is typically in the form of an electrochemical cell, or battery of such cells (not shown). Controller 36 may be comprised of one or more components. In one example controller 36 is a programmable microprocessor-based type that executes instructions loaded in memory 38. In other examples, controller 36 may be defined by analog computing circuits, hardwired state machine logic, or other device types as an alternative or addition to programmable digital circuitry. Memory 38 may include one or more solid-state semiconductor components of the volatile or nonvolatile variety. Alternatively or additionally, memory 38 may include one or more electromagnetic or optical storage devices such as a floppy or hard disk drive or a CD-ROM. In one example, controller 36, I/O port 37, and memory 38 are integrally provided on the same integrated circuit chip.

I/O port 37 is configured to send data from interrogator 30 to data collection unit 40 as shown in FIG. 1. Referring back to FIG. 1, further aspects of data collection unit 40 are described. Interface 41 of unit 40 is configured for communicating with interrogator 30 via I/O port 37. Unit 40 also includes processor 42 and memory 44 to store and process information obtained from interrogator 30 about devices 110. Processor 42 and memory 44 may be variously configured in an analogous manner to that described for controller 36 and memory 38, respectively. Further, interface 41, processor 42, and memory 44 may be integrally provided on the same integrated circuit chip.

Accordingly, for the depicted embodiment communication circuitry 160 transmits bait status and identifier information to interrogator 30 when interrogator 30 transmits a stimulation signal to device 110 within range. RF receiver circuit 34 of interrogator 30 receives the information from device 110 and provides appropriate signal conditioning and formatting for manipulation and storage in memory 38 by controller 36. Data received from device 110 may be transmitted to data collection unit 40 by operatively coupling I/O port 37 to interface 41.

Unit 40 can be provided in the form of a laptop personal computer, hand-held or palm type computer, or other dedicated or general purpose variety of computing device that is adapted to interface with interrogator 30 and programmed to receive and store data from interrogator 30. In another embodiment, unit 40 may be remotely located relative to interrogator 30. For this embodiment, one or more interrogators 30 communicate with unit 40 over an established communication medium like the telephone system or a computer network like the internet. In yet another embodiment, interrogator 30 is absent and unit 40 is configured to communicate directly with communication circuitry 160. Interrogator 30 and/or unit 40 is arranged to communicate with one or more pest control devices through a hardwired interface. In still other embodiments, different interface and communication techniques may be used with interrogator 30, data collection unit 40, and devices 110 as would occur to those skilled in the art.

In a preferred embodiment directed to subterranean termites, substrate 151 is preferably formed from a nonfood material that is resistant to changes in dimension when exposed to moisture levels expected in an in-ground environment. It has been found that such a dimensionally stable substrate is less likely to cause inadvertent alterations to the electrically conductive pathway 154. One preferred example of a more dimensionally stable substrate 151 includes a paper coated with a polymeric material, such as polyethylene. Nonetheless, in other embodiments, substrate 151 may be composed of other materials or compounds including those that may change in dimension with exposure to moisture and that may alternatively or additionally include one or more types of material favored as a food by targeted pests.

It has been found that in some applications, certain metal-based electrical conductors, such as a silver-containing conductor, tend to readily ionize in aqueous solutions common to the environment in which pest control devices are typically used. This situation can lead to electrical shorting or bridging of the pest control device conductive pathway by the resulting electrolytic solution, possibly resulting in improper device performance. It has also been surprisingly discovered that a carbon-based conductor has a substantially reduced likelihood of electrical shorting or bridging. Accordingly, for such embodiments, pathway 154 is preferably formed from a nonmetallic, carbon-containing ink compound. One source of such ink is the Acheson Colloids Company with a business address of 600 Washington Ave., Port Huron, Mich. Carbon-containing conductive ink comprising conductor 153 can be deposited on substrate 151 using a silk screening, pad printing, or ink jet dispensing technique; or such other technique as would occur to those skilled in the art.

Compared to commonly selected metallic conductors, a carbon-based conductor can have a higher electrical resistivity. Preferably, the volume resistivity of the carbon-containing ink compound is greater than or equal to about 0.001 ohm-cm (ohm-centimeter). In a more preferred embodiment, the volume resistivity of conductor 153 comprised of a carbon-containing material is greater than or equal to 0.1 ohm-cm. In a still more preferred embodiment, the volume resistivity of conductor 153 comprised of a carbon-containing material is greater than or equal to about 10 ohms-cm. In yet other embodiments, conductor 153 can have a different composition or volume resistivity as would occur to those skilled in the art.

In further embodiments, other electrically conductive elements and/or compounds are contemplated for pest control device conductors that are not substantially subject to ionization in aqueous solutions expected in pest control device environments. In still further embodiments of the present invention, metal-based conductors are utilized notwithstanding the risk of electrical bridging or shorting.

Referring generally to FIGS. 1-9, certain operational aspects of system 20 are further described. Typically, interrogator 30 is arranged to cause excitation circuit 32 to generate an RF signal suitable to energize circuitry 169 of device 110 when device 110 is within a predetermined distance range of interrogator 30. In one embodiment, controller 36 is arranged to automatically prompt generation of this stimulation signal on a periodic basis. In another embodiment, the stimulation signal may be prompted by an operator through an operator control coupled to interrogator 30 (not shown). Such operator prompting may be either as an alternative to automatic prompting or as an additional prompting mode. Interrogator 30 may include a visual or audible indicator of a conventional type (not shown) to provide interrogation status to the operator as needed.

Figure 10:
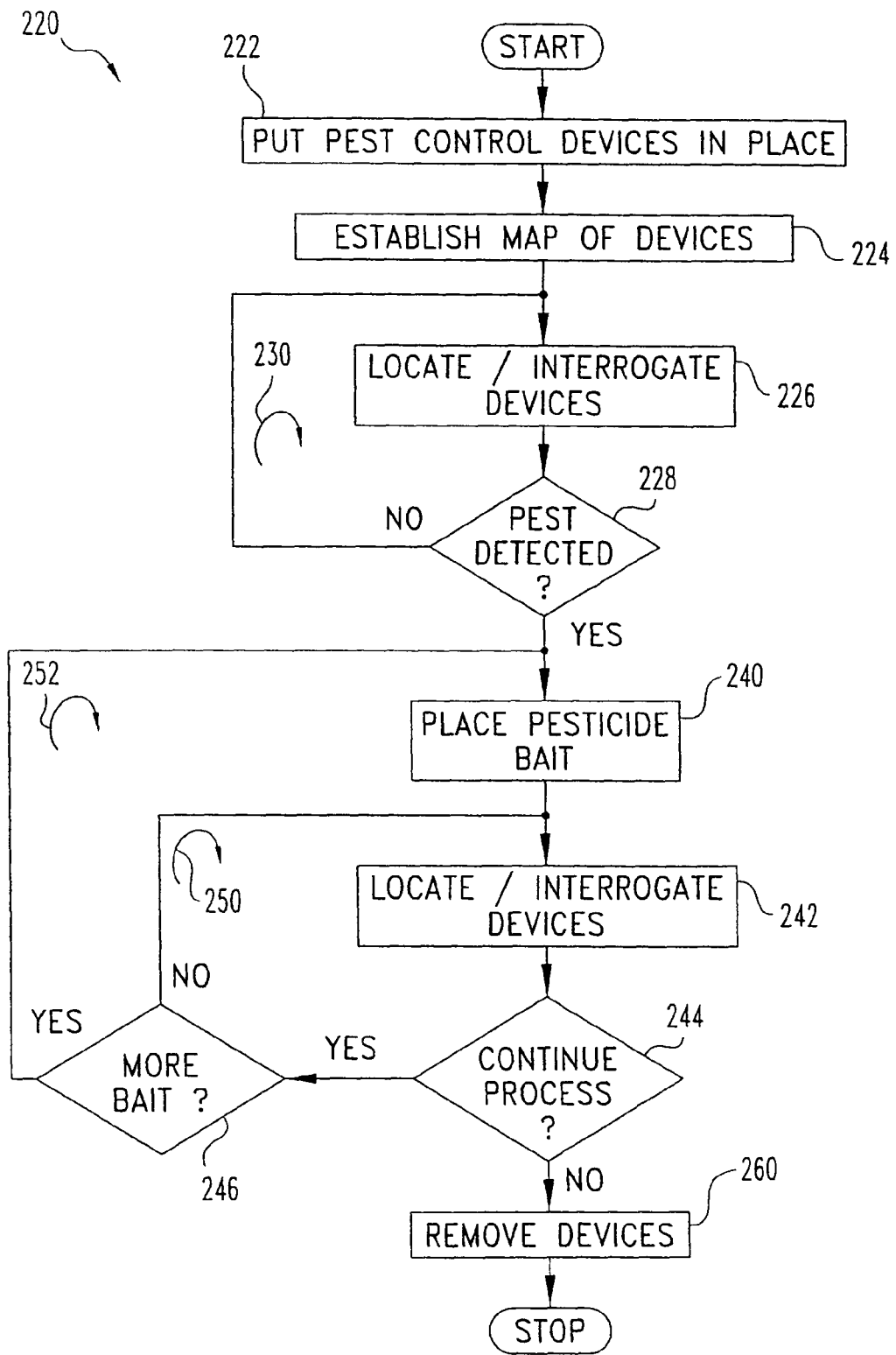
FIG. 10 is a flowchart of one example of a process of the present invention that may be performed with the system of FIG. 1.

Referring further to the flowchart of FIG. 10, termite control process 220 of a further embodiment of the present invention is illustrated. In stage 222 of process 220, a number of pest control devices 110 are installed in a spaced apart relationship relative to an area to be protected. By way of non-limiting example, FIG. 1 provides a diagram of one possible distribution of a number of devices 110 arranged about building 22 to be protected. One or more of these devices can be at least partially placed below ground as illustrated in FIG. 2.

For process 220, devices 110 are initially each installed with a pest monitoring assembly 112 each including a pair of bait members 132 of a monitoring variety that are favored as a food by subterranean termites and do not include a pesticide. It has been found that once a colony of termites establish a pathway to a food source, they will tend to return to this food source. Consequently, devices 110 are initially placed in a monitoring configuration to establish such pathways with any termites that might be in the vicinity of the area or structures desired to be protected, such as building 22.

Once in place, a map of devices 110 is generated in stage 224. This map includes indicia corresponding to the coded identifiers for installed devices 110. In one example, the identifiers are unique to each device 110. Pest monitoring loop 230 of process 220 is next encountered with stage 226. In stage 226, installed devices 110 are periodically located and data is loaded from each device 110 by interrogation of the respective wireless communication circuit 160 with interrogator 30. This data corresponds to bait status and identification information. In this manner, pest activity in a given device 110 may readily be detected without the need to extract or open each device 110 for visual inspection. Further, such wireless communication techniques permit the establishment and building of an electronic database that may be downloaded into data collection device 40 for long term storage.

It should also be appreciated that over time, subterranean pest monitoring devices 110 may become difficult to locate as they have a tendency to migrate, sometimes being pushed further underground. Moreover, in-ground monitoring devices 110 may become hidden by the growth of surrounding plants. In one embodiment, interrogator 30 and multiple devices 110 are arranged so that interrogator 30 only communicates with the closest device 110. This technique may be implemented by appropriate selection of the communication range between interrogator 30 and each of devices 110, and the position of devices 110 relative to each other. Accordingly, interrogator 30 may be used to scan or sweep a path along the ground to consecutively communicate with each individual device 110. For such embodiments, the wireless communication subsystem 120 provided by interrogator 30 with each of devices 110 provides a procedure and means to more reliably locate a given device 110 after installation as opposed to more limited visual or metal detection approaches. Indeed, this localization procedure may be utilized in conjunction with the unique identifier of each device and/or the map generated in stage 224 to more rapidly service a site in stage 226. In a further embodiment, the locating operation may be further enhanced by providing an operator-controlled communication range adjustment feature for interrogator 30 (not shown) to assist in refining the location of a given device. Nonetheless, in other embodiments, devices 110 may be checked by a wireless communication technique that does not include the transmission of identification signals or a coordinating map. Further, in alternative embodiments, localization of devices 110 with interrogator 30 may not be desired.

Process 220 next encounters conditional 228. Conditional 228 tests whether any of the status signals, corresponding to a broken pathway 154, indicate termite activity. If the test of conditional 228 is negative, then monitoring loop 230 returns to stage 226 to again monitor devices 110 with interrogator 30. Loop 230 may be repeated a number of times in this fashion. Typically, the rate of repetition of loop 230 is on the order of a few days or weeks and may vary. If the test of conditional 228 is affirmative, then process 220 continues with stage 240. In stage 240, the pest control service provider places a pesticide laden bait in the vicinity of the detected pests. In one example, pesticide placement includes the removal of cap 180 by the service provider and extraction of pest activity monitoring assembly 130 from housing 170. Next, for this example, pest control device 110 is reconfigured, exchanging pest monitoring assembly 112 with pesticide delivery assembly 119 as previously described in connection with FIG. 7.

In other embodiments, the replacement device may include a different configuration of communication circuit or lack a communication circuit entirely. In one alternative, the pesticide is added to the existing pest sensing device by replacing one or more of the bait members 132, and optionally, sensor 150. In still another embodiment, pesticide bait or other material is added with or without the removal of pest monitoring assembly 112. In yet a further embodiment, pesticide is provided in a different device that is installed adjacent to the installed device 110 with pest activity. During the pesticide placement operation of stage 240, it is desirable to return or maintain as many of the termites as possible in the vicinity of the device 110 where the pest activity was detected so that the established pathway to the nest may serve as a ready avenue to deliver the pesticide to the other colony members.

After stage 240, monitoring loop 250 is encountered with stage 242. In stage 242, devices 110 continue to be periodically checked. In one embodiment, the inspection of devices 110 corresponding to pesticide bait is performed visually by the pest control service provider while the inspection of other devices 110 in the monitoring mode ordinarily continues to be performed with interrogator 30. In other embodiments, visual inspection may be supplemented or replaced by electronic monitoring using the pest activity monitoring assembly 130 configured with a poisoned bait matrix, or a combination of approaches may be performed. In one alternative, pathway 154 is altered to monitor pesticide baits such that it is typically not broken to provide an open circuit reading until a more substantial amount of bait consumption has taken place relative to the pathway configuration for the monitoring mode. In still other alternatives, the pesticide bait may not ordinarily be inspected—instead being left alone to reduce the risk of disturbing the termites as they consume the pesticide.

After stage 242, conditional 244 is encountered that tests whether process 220 should continue. If the test of conditional 244 is affirmative—that is process 220 is to continue—then conditional 246 is encountered. In conditional 246, it is determined if more pesticide bait needs to be installed. More bait may be needed to replenish consumed bait for devices where pest activity has already been detected, or pesticide bait may need to be installed in correspondence with newly discovered pest activity for devices 110 that remained in the monitoring mode. If the conditional 246 test is affirmative, then loop 252 returns to stage 240 to install additional pesticide bait. If no additional bait is needed as determined via conditional 246, then loop 250 returns to repeat stage 242. Loops 250, 252 are repeated in this manner unless the test for conditional 244 is negative. The repetition rate of loops 250, 252 and correspondingly the interval between consecutive performances of stage 242, is on the order of a few days or weeks and may vary. If the test of conditional 244 is negative, then devices 110 are located and removed in stage 260 and process 220 terminates.

Data collected with interrogator 30 during performance of process 220 can be downloaded into unit 40 from time to time. However, in other embodiments, unit 40 may be optional or absent. In still another alternate process, monitoring for additional pest activity in stage 242 may not be desirable. Instead, the monitoring units may be removed. In a further alternative, one or more devices 110 configured for monitoring may be redistributed, increased in number, or decreased in number as part of the performance of the process. In yet other embodiments, a data collection unit is utilized to interface with one or more pest control devices in lieu of interrogator 30. Additionally or alternatively, interfacing with interrogator 30 and/or unit 40 may be through a hardwired communication connection.

Figure 11:
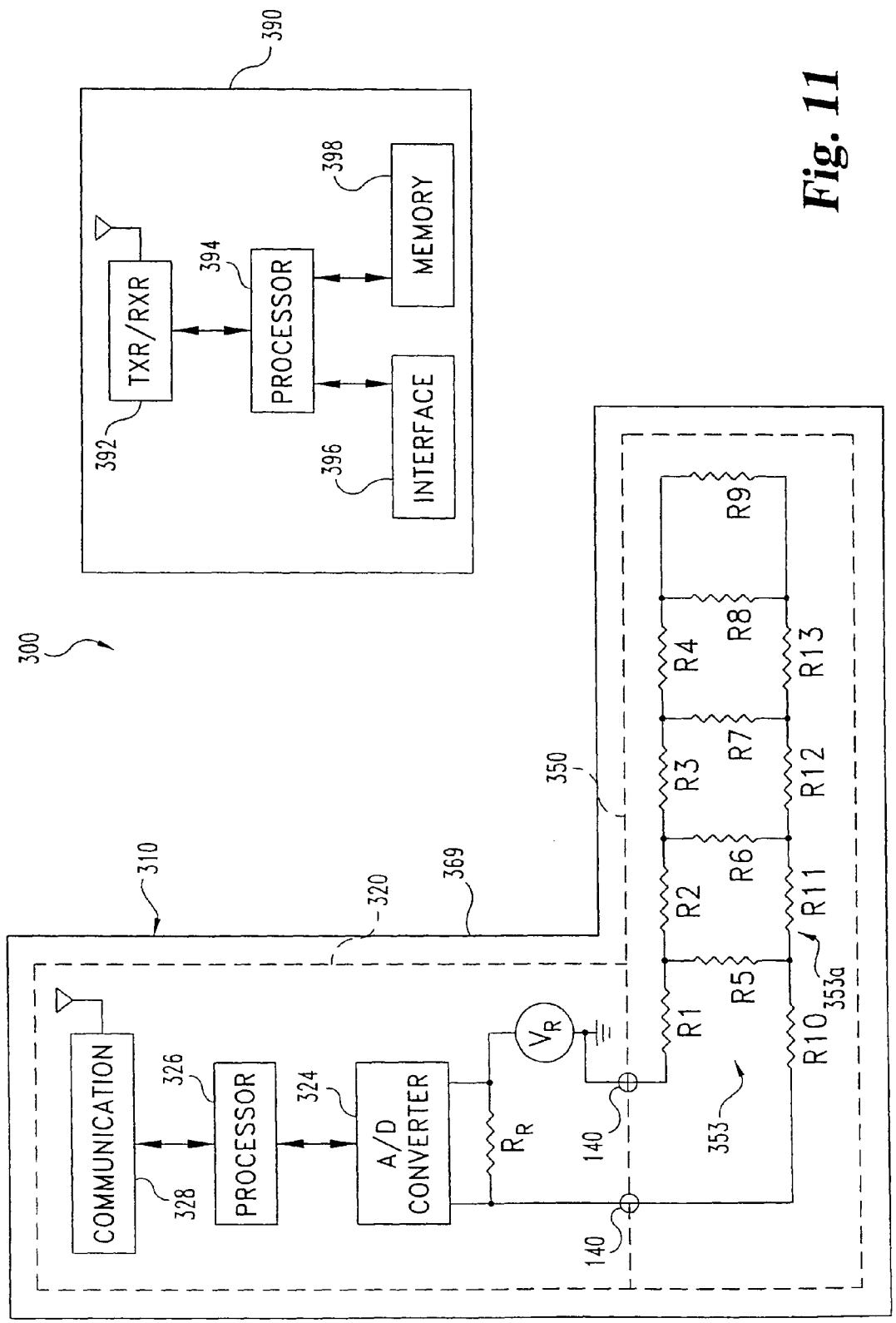
FIG. 11 is a diagrammatic view of a second type of pest control system according to the present invention that includes a second type of pest control device.

FIG. 11 illustrates pest control system 300 of another embodiment of the present invention where like reference numerals refer to like features previously described. Pest control system 300 includes pest control device 310 and data collection unit 390. Pest control device 310 includes circuitry 320 removably coupled to sensor 350 by connection members 140.

Figure 12:
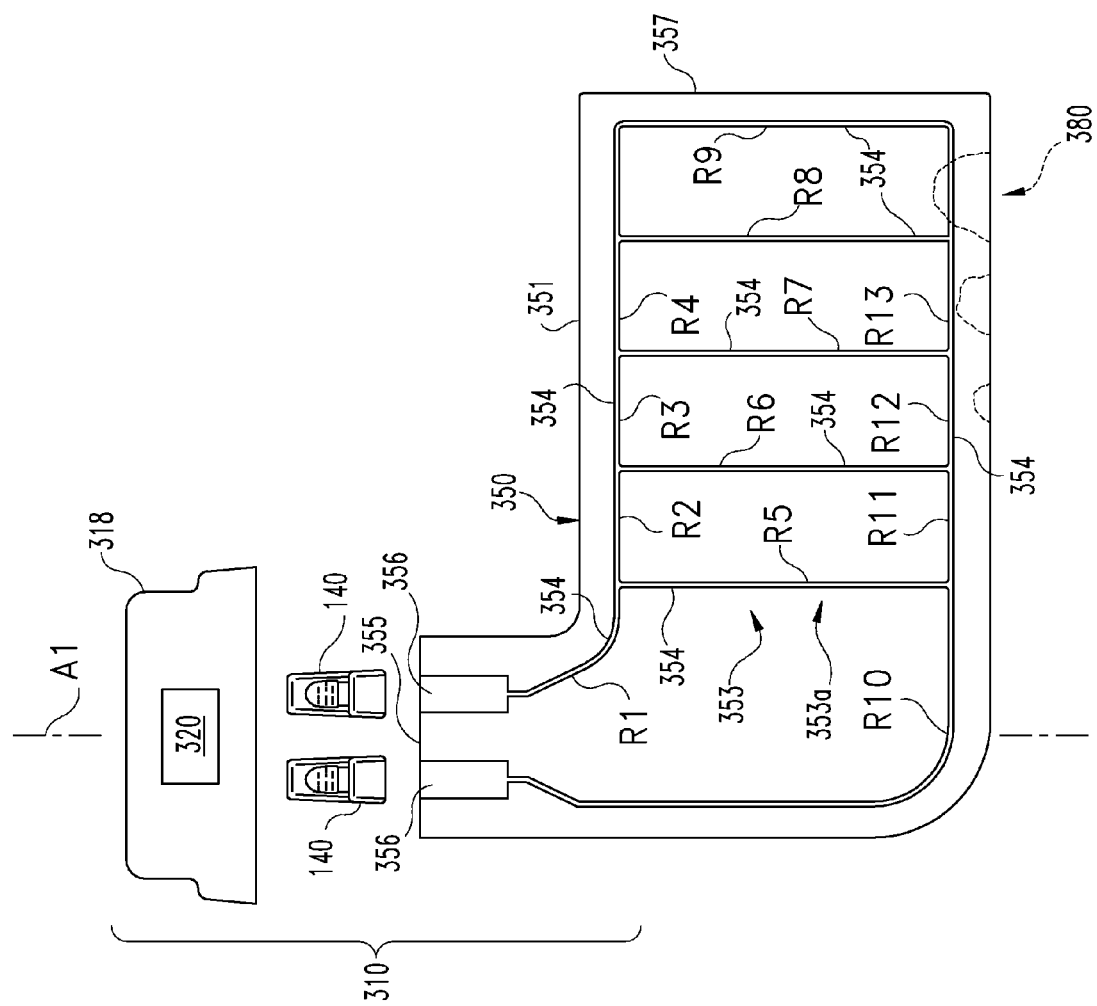
FIG. 12 is an exploded, partial assembly view of the second type of pest control device.

Referring additionally to the partial assembly view of FIG. 12, sensor 350 includes substrate 351 that carries electrically resistive network 353. Network 353 includes a number of sensing elements 353a in the form of electrically resistive branches or pathways 354 spaced apart from one another along substrate 351. Resistive pathways 354 are each schematically represented by a different resistor R1-R13 in FIG. 11. Network 353 extends from contact pads 356 at edge 355 to substrate end portion 357. When coupled together, network 353 and circuitry 320 comprise monitoring circuit 369.

Figure 13:
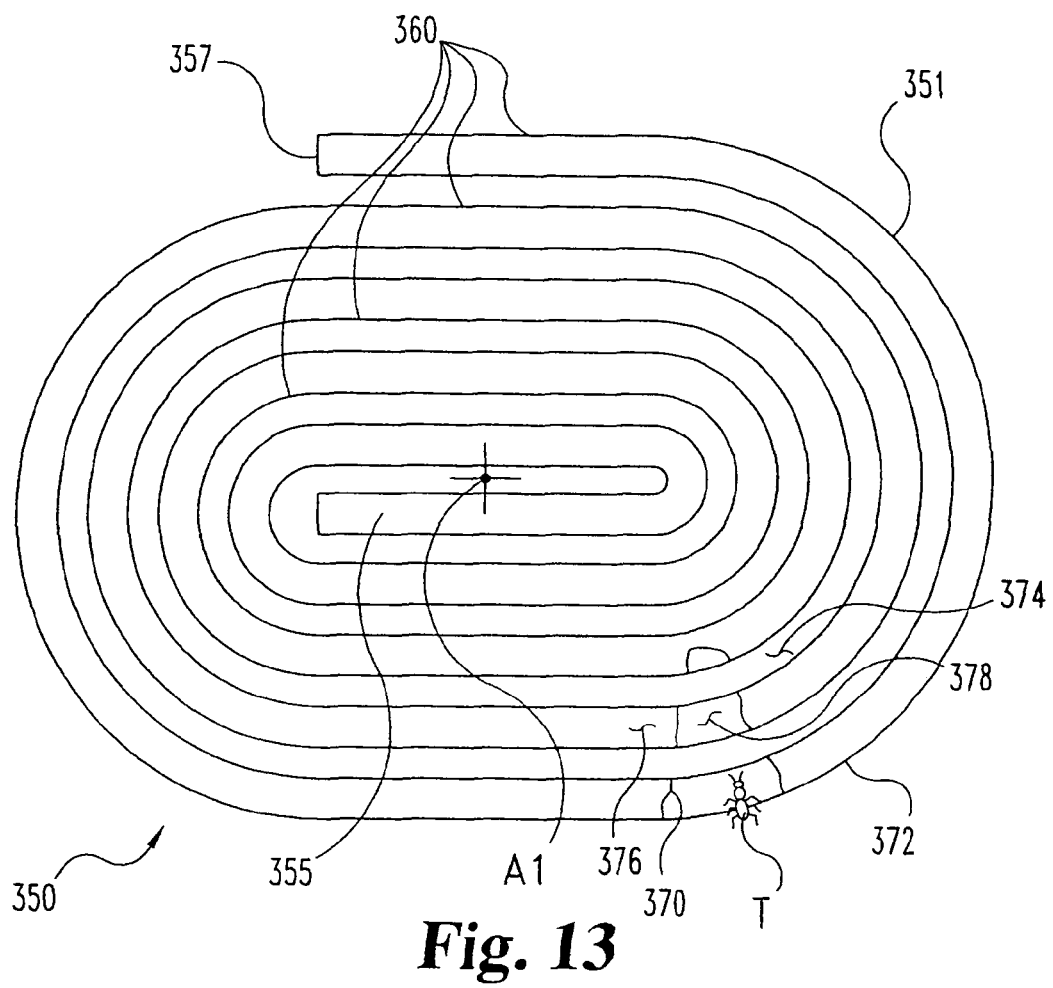
FIG. 13 is an end view of an assembled sensor of the second type of pest control device.

With further reference to the end view of FIG. 13, a fully assembled and implemented form of sensor 350 is shown. Sensor 350 is configured to be rolled, folded, bent, or wrapped about assembly axis A1 as shown in FIG. 13 to provide a number of adjacent layers 360, only a few of which are designated by reference numerals. It should be understood that axis A1 in FIG. 13 is perpendicular to the FIG. 13 view plane and is correspondingly represented by like-labeled cross-hairs. Referring back to FIGS. 11 and 12, circuitry 320 is contained in circuit enclosure 318. Enclosure 318 can be configured in a manner like enclosure 118 of pest monitoring subassembly 114 for pest control device 110. Indeed, enclosure 318 is arranged to receive a pair of connection members 140 to electrically couple pads 356 of sensor 350 to circuitry 320 in the same manner that pads 156 of sensor 150 are coupled to circuitry 160. Circuitry 320 includes a reference resistor $R_R$ connected in series with network 353 when circuitry 320 and sensor 350 are coupled together to form monitoring circuit 369. A voltage reference $V_R$ is also coupled across network 353 and reference resistor $R_R$. The voltage across reference resistor $R_R$, designated $V_i$, is selectively digitized by Analog-to-Digital (A/D) converter 324 using standard techniques. The digital output from A/D converter 324 is provided to processor 326. Processor 326 is operatively coupled to communication circuit 328.

Processor 326 can be comprised of one or more components. In one example, processor 326 is a programmable digital microprocessor arrangement that executes instructions stored in an associated memory (not shown). In other examples, processor 326 can be defined by analog computing circuits, hardwired state machine logic, or other device types as an alternative or an addition to programmable digital circuitry. Memory is also preferably included in communication circuitry 320 to store digitized values determined with A/D converter 324 (not shown). This memory can be integral to A/D converter 324 or processor 326, separate from either, or a combination of these.

Communication circuit 328 is of a wireless type, such as the active and passive wireless communication circuit embodiments previously described in connection with system 20. Communication circuit 328 is arranged to communicate with processor 326. Alternatively or additionally, communication circuit 328 can include one or more input/output (I/O) ports for hardwired communication.

One or more of voltage reference $V_R$, A/D converter 324, processor 326 or communication circuit 328 can be combined in an integrated circuit chip or unit. Further, circuitry 320, and correspondingly monitoring circuit 369, can be of a passive type powered by an external source; active with its own power source; or a combination of these.

Data collection unit 390 includes an active wireless transmitter/receiver (TXR/RXR) 392 configured to communicate with communication circuit 328 of device 310, processor 394 coupled to TXR/RXR 392, interface 396, and memory 398. Processor 394 and memory 398 can be the same as processor 42 and memory 44 of data collection unit 40, respectively, or be of a different arrangement as would occur to those skilled in the art. Interface 396 provides for the option of a hardwired interface to device 310 and/or other computing devices (not shown). Data collection unit 390 is configured to receive and process information from one or more pest control devices as will be more fully described hereinafter.

Referring generally to FIGS. 11-13, it should be understood that network 353 can be represented by an equivalent resistance $R_S$; where $R_S$ is a function of R1-R13 ($R_S=f(R1-R13)$). When R1-R13 are known, $R_S$ can be determined by applying standard electrical circuit analysis techniques for series and parallel resistances. Furthermore, it should be understood that $R_R$ and $R_S$ can be modeled as a voltage divider with respect to the reference voltage $V_R$ such that the input voltage $V_i$ to A/D converter 324 can be expressed by the following equation: $V_i = V_R * (R_R/(R_R + R_S))$.

Substrate 351 and/or network 353 are provided from one or more materials that are subject to consumption or displacement by one or more pests of interest. As sensor 350 is consumed or displaced by such pests, resistive pathways 354 comprising branches of network 353 are disrupted, becoming electrically open. As one or more resistive pathways 354 become open, the value of $R_S$ changes. Accordingly, with the proper selection of resistance values for resistive pathways 354 relative to each other, $R_R$, and $V_R$; a number of different values of $R_S$ can be provided in correspondence with the opening of different resistive pathways 354 and/or different combinations of open pathways 354.

Unlike FIG. 12, FIG. 13 depicts sensor 350 after one or more pests have begun consumption or displacement of substrate 351 and/or network 353. In FIG. 13, pest T is illustrated in connection with pest-created opening 370 that was caused by pest consumption or displacement. The location of pest-created opening 370 relative to network 353 corresponds to phantom overlay 380 shown in FIG. 12. Pest-created opening 370 partially penetrates several layers 360 of sensor 350 from outer sensor margin 372 towards the middle of sensor 350 in the vicinity of axis A1. The pest-created opening 370 corresponds to separation or displacement of one or more portions of sensor 350 relative to another portion that could result in opening one or more of resistive pathways 354, depending on relative location. Such separation or displacement can result from the removal of one or more pieces from sensor 350 due to pest activity. Even if a piece of sensor 350 is not removed by pests, separation or displacement of sensor 350 can still occur due to pest activity that separates or displaces a first portion relative to a second portion in one sensor region, but leaves the first and second portions connected together in another sensor region. For example, in FIG. 13 sensor portion 374 is separated or displaced relative to sensor portion 376 by the formation of opening 370; however, sensor portions 374 and 376 remain connected by sensor portion 378.

It should be further understood that by spatially arranging the resistive pathways 354 in a predetermined manner, sensor 350 can be configured to generally indicate a progressively greater degree of consumption and displacement as the value of $R_S$, and accordingly $V_i$, change. For instance, the arrangement of substrate 351 shown in FIG. 13 can be used to place resistive pathways 354 closer to substrate end portion 357 near the outer sensor margin 372, such as those resistive pathways 354 corresponding to R8 and R9. Because these resistive pathways 354 are closer to the outer margin 372, they are more likely to be encountered by pests before other of the resistive pathways 354. In contrast, resistive pathways 354 nearer to the middle of the rolled substrate 351 (axis A1), such as those corresponding to R1, R5 and R10, are most likely to be encountered last by the pests as they consume and displace sensor 350. Thus, as $R_S$ changes with the progressive consumption and displacement of pests from the outer sensor margin 372 towards the middle, the corresponding input voltage $V_i$ can be used to represent a number of different nonzero degrees of consumption or displacement of sensor 350.

Processor 326 can be used to evaluate one or more values corresponding to $V_i$ digitized with A/D converter 324 to determine if a change in pest consumption or displacement has occurred. This analysis could include various statistical techniques to reduce the adverse impact of noise or other anomalies. Furthermore, the analysis could be used to determine the rate of consumption or displacement as well as any changes in that rate with respect to time. These results can be provided by processor 326 via communication circuit 328 based on certain predefined triggering thresholds, on a periodic basis, in response to an external query with data unit 390, or through a different arrangement as would occur to those skilled in the art.

It should be understood that like pest control devices 110 of system 20, several devices 310 can be used in a spaced apart relationship in a multiple device pest control system. Devices 310 can be arranged for placement in-ground, on-ground, or above-ground. Furthermore, devices 310 can be used with an interrogator to assist in locating them as described in connection with system 20. Also, it should be understood that a number of different resistive network arrangements could be utilized at the same time in device 310 to facilitate the detection of differing degrees of pest consumption or displacement. In another alternative embodiment, a multilayer configuration is provided by stacking together a number of separate layers and electrically interconnecting the layers as required to provide a desired sensing network. In yet another alternative, sensor 350 is utilized in an unrolled, single layer configuration rather than being arranged as shown in FIG. 13. Still other embodiments include a different resistive sensing network configurations as would occur to those skilled in the art.

Figure 14:
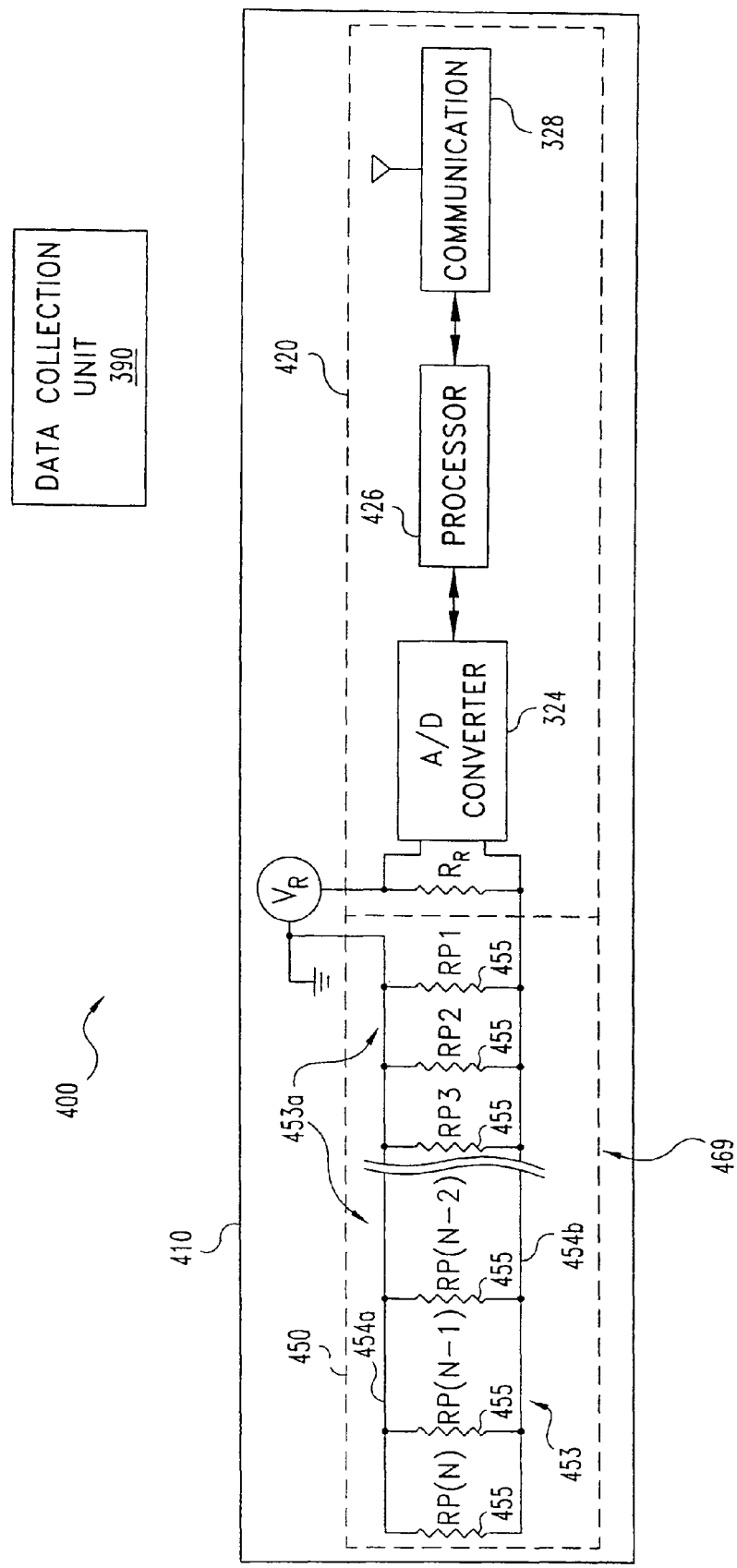
FIG. 14 is a diagrammatic view of a third type of pest control system according to the present invention that includes a third type of pest control device.
Figure 15:
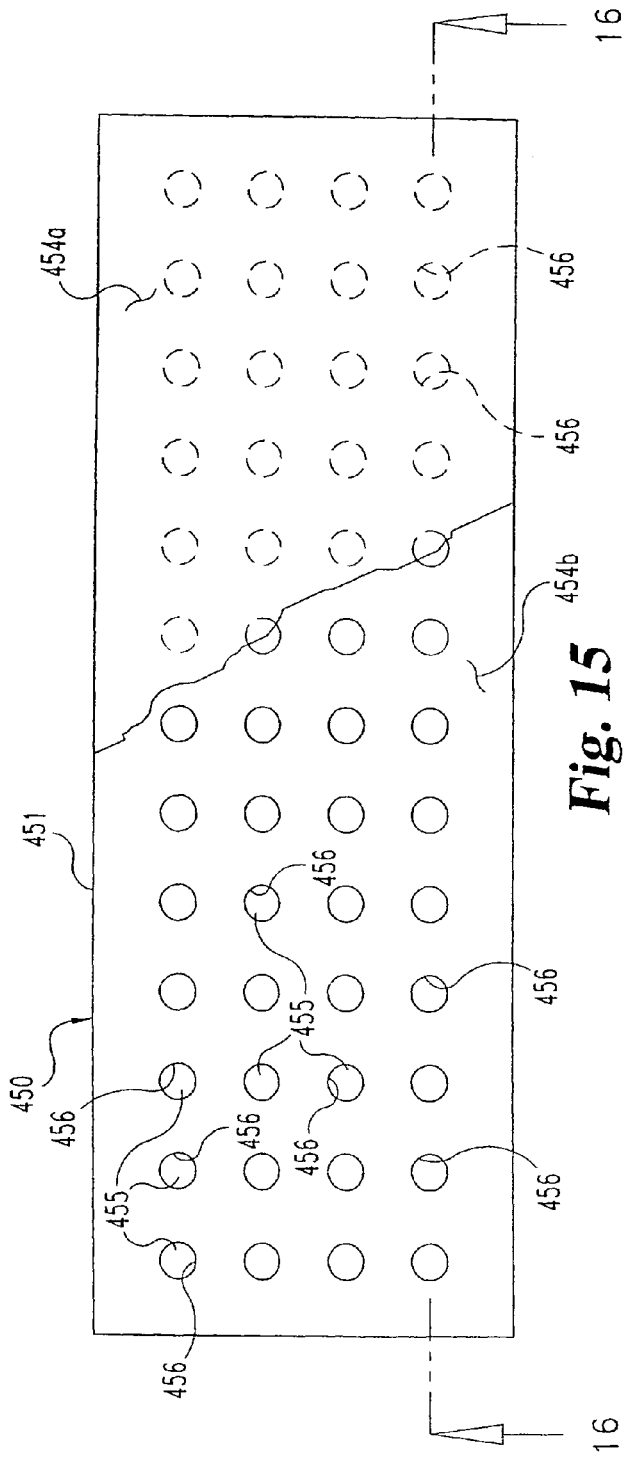
FIG. 15 is a partial cutaway view of a sensor for the third type of pest control device.
Figure 16:
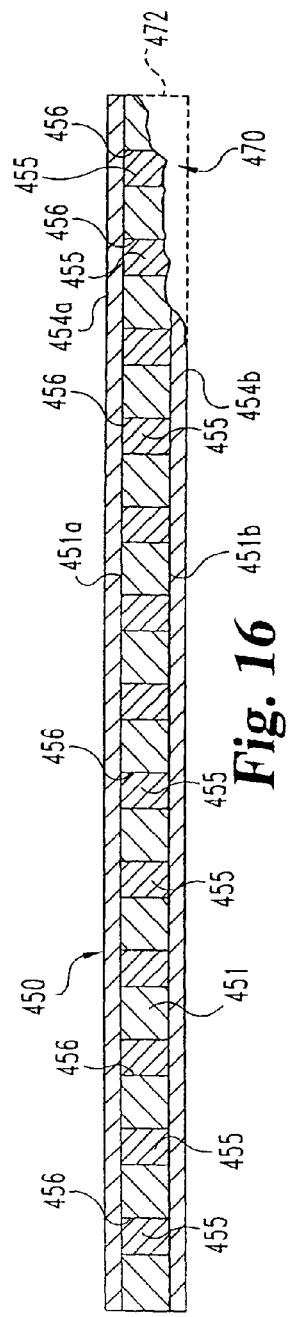
FIG. 16 is a sectional view of the sensor for the third type of pest control device taken along the section line 16-16 shown in FIG. 15.

Referring to FIGS. 14-16, a further pest control system embodiment 400 utilizing a resistive network to determine different degrees of pest activity is illustrated; where like reference numerals refer to like features as previously described. System 400 includes data collection unit 390 as described in connection with system 300 and pest control device 410. Pest control device 410 includes circuitry 420 coupled to sensor 450. Circuitry 420 includes reference resistor $R_R$, voltage reference $V_R$, A/D converter 324, and communication circuit 328 as previously described. Circuitry 420 also includes processor 426 that can be physically the same arrangement as processor 326, but is configured to accommodate any processing differences between sensors 350 and 450 as further explained hereinafter.

Sensor 450 includes substrate 451 with surface 451a opposite surface 451b. Substrate 451 defines a number of regularly spaced passages 456 from surface 451a to surface 451b. Resistive network 453 is comprised of a number of sensing elements 453a in the form of electrically resistive members 455. Each resistive member 455 extends through a different passage 456. Resistive members 455 are electrically coupled in parallel to one another by electrically conductive layers 454a and 454b that are in contact with substrate surfaces 451a and 451b, respectively. For this configuration, substrate 451 is comprised of an electrically insulative material relative to resistive members 455 and conductive layers 454a and 454b.

Collectively, circuitry 420 and network 453 comprise monitoring circuit 469. Referring specifically to FIG. 14, the parallel resistive members 455 of network 453 are each schematically represented by one of resistors RP1, RP2, RP3, . . . RPN-2, RPN-1, and RPN; where "N" is the total number of resistive members 455. Accordingly, the equivalent resistance $R_N$ of network 453 can be determined from the parallel resistance law: $R_N = (1/RP1 + 1/RP2 \ldots + 1/RPN)^{-1}$. The equivalent resistance $R_N$ of network 453 forms a voltage divider with reference resistor $R_R$ relative to reference voltage $V_R$. The voltage across reference resistor $R_R$, $V_i$, is input to A/D converter 324.

Substrate 451, layers 454a and 454b, and/or members 455 are provided from a material that is consumed or displaced by pests of interest. Further, sensor 450 is arranged so that pest consumption or displacement results in opening the electrical connections of the resistive members 455 to network 453 through separation or displacement of one or more portions of sensor 450 relative to other portions of sensor 450 as explained in connection with FIG. 13. FIG. 16 depicts region 470 where material has been separated or displaced from sensor 450, resulting in open electrical connections. In FIG. 16, the phantom outline 472 indicates the form factor of sensor 450 prior to pest activity. As more resistive members 455 are electrically opened, the equivalent resistance $R_N$ of network 453 increases, causing a corresponding change in $V_i$ that is monitored with circuitry 420 to determine different relative levels of pest consumption or displacement activity.

In one embodiment, resistive members 455 each generally have the same resistance, such that: RP1=RP2= . . . =RPN within expected tolerances. In other embodiments, the resistive members 455 can have substantially different resistances relative to one another. Processor 426 is configured to analyze changes in consumption and displacement as indicated by variation in $V_i$ and transmit corresponding data to data collection unit 390 as discussed in connection with system 300. Conductive layers 454a and 454b can be coupled to circuitry 420 using an elastomeric connector adapted to engage these surfaces or another arrangement as would occur to those skilled in the art.

Figure 17:
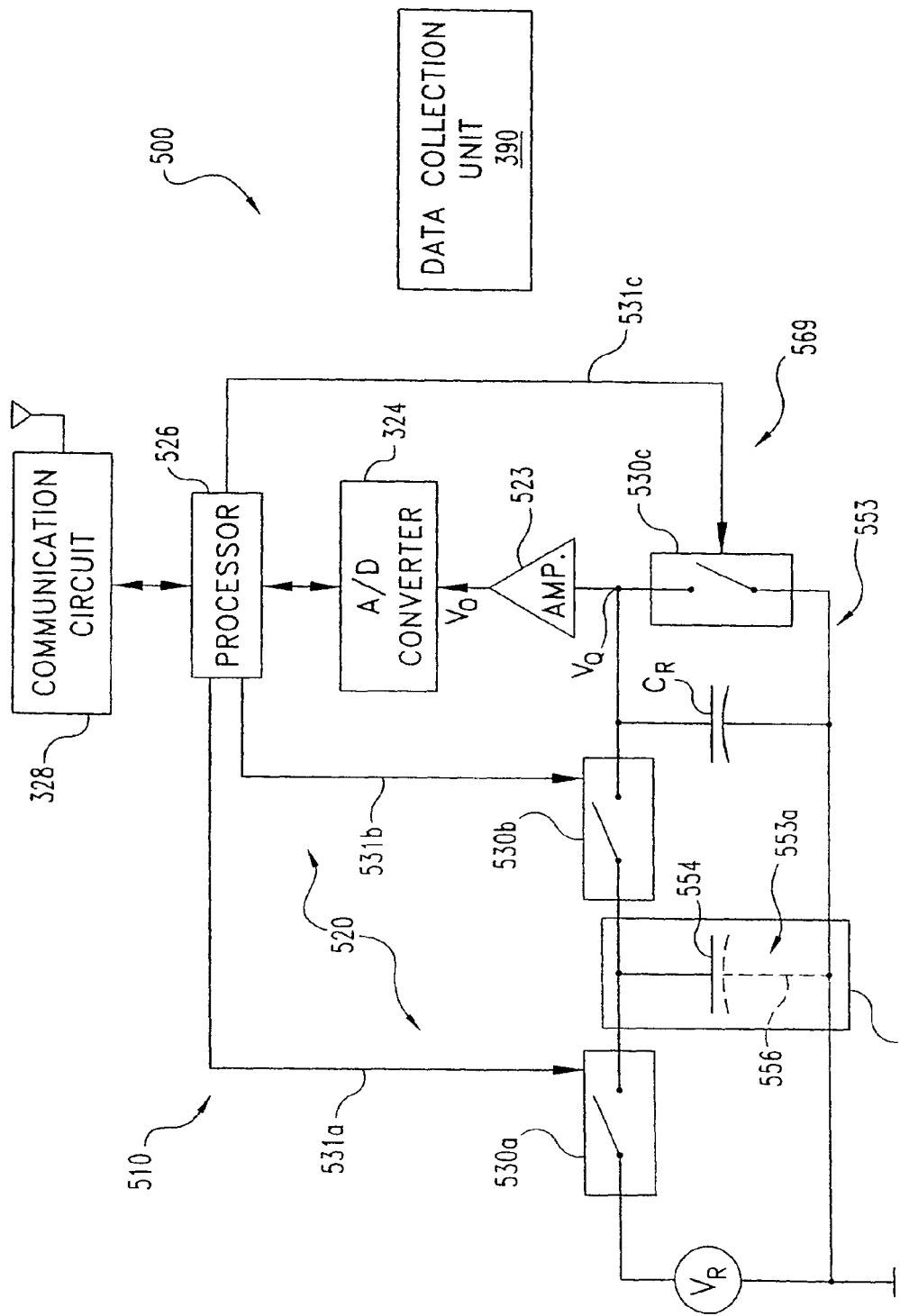
FIG. 17 is a diagrammatic view of a fourth type of pest control system according to the present invention that includes a fourth type of pest control device.
Figure 18:
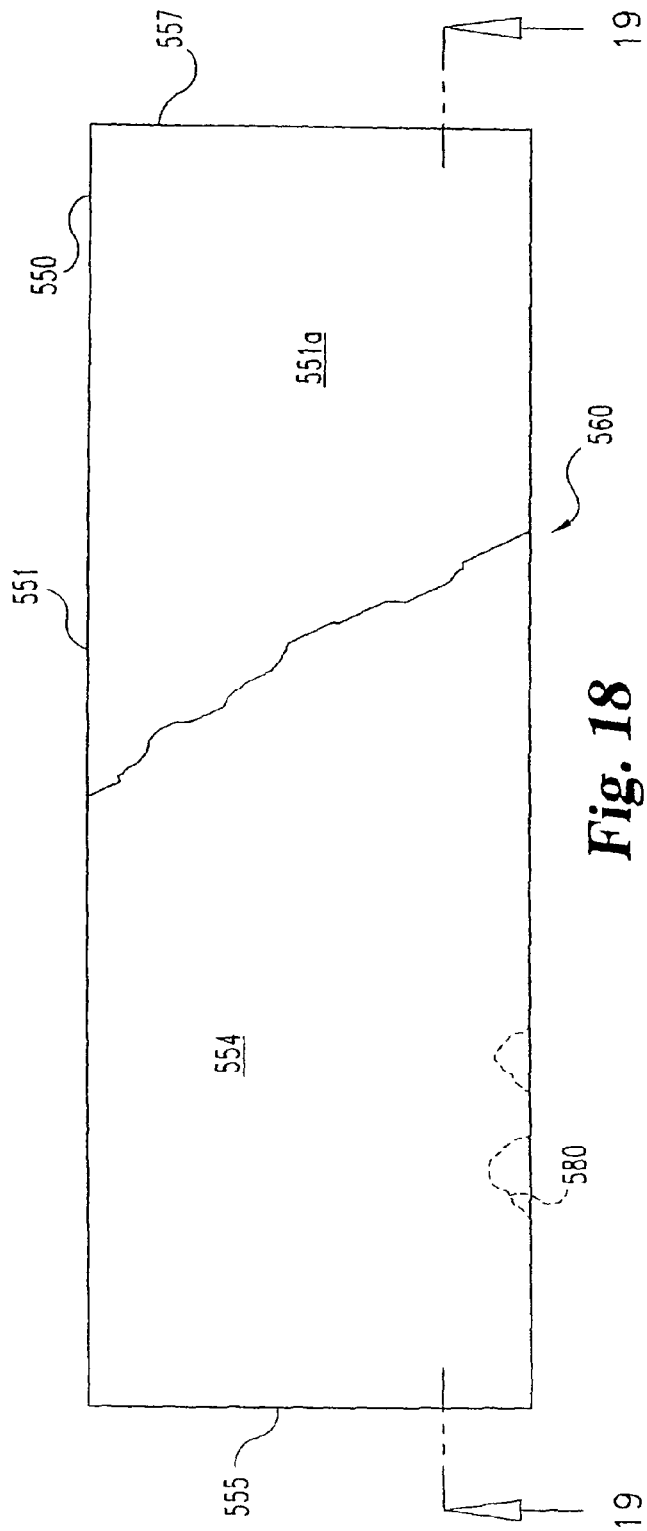
FIG. 18 is a partial cutaway view of a sensor for the fourth type of pest control device.
Figure 19:
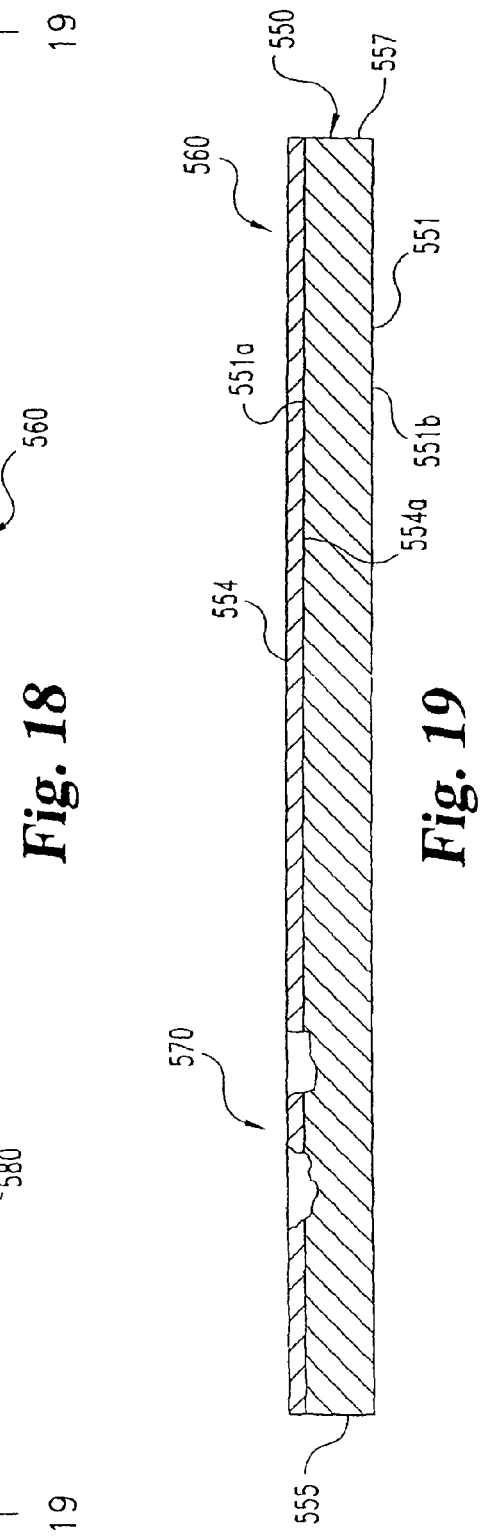
FIG. 19 is a sectional view of the sensor for the fourth type of pest control device taken along the section line 19-19 shown in FIG. 18.

Besides resistance, other electrical characteristics of a sensing element that change with pest consumption or displacement can be monitored to gather pest activity data. Referring to FIGS. 17-19, pest control system 500 of another embodiment of the present invention is illustrated; where like reference numerals refer to like features previously described. Pest control system 500 includes data collection unit 390 and pest control device 510. Pest control device 510 is comprised of circuitry 520 and sensor 550.

Referring specifically to FIG. 17, circuitry 520 includes voltage reference $V_R$, A/D converter 324, and communication circuit 328 as previously described. Circuitry 520 also includes processor 526 coupled between A/D converter 324 and communication circuit 328. Processor 526 can be of the same physical type as processor 326 of system 300, but is configured to accommodate aspects of system 500 that differ from system 300. For example, processor 526 is operably coupled to a number of switches 530a, 530b, and 530c by signal control pathways 531a, 531b and 531c, respectively. Processor 526 is arranged to selectively open and close switches 530a-530c by sending corresponding signals along the respective pathways 531a-531c. Switches 530a-530c are each schematically illustrated as being of the single-pole, single-throw operational configuration. Switches 530a-530c can be of a semiconductor type, such as an Insulated Gate Field Effect Transistor (IGFET) arrangement, an electromechanical variety, a combination of these, or such other types as would occur to those skilled in the art.

Circuitry 520 also includes reference capacitor $C_R$ that is coupled in parallel to switch 530c, and voltage amplifier (AMP.) 523. Voltage amplifier 523 amplifies input voltage $V_Q$ and provides an amplified output voltage $V_O$ to A/D converter 324 to be selectively digitized.

In FIG. 17, sensor 550 includes sensing element 553a that is schematically depicted in the form of a capacitor with electrode 554. Collectively, circuitry 520 and sensor 550 define monitoring circuit 569. Within monitoring circuit 569, voltage reference $V_R$, switches 530a-530c, reference capacitor $C_R$, and sensor 550 provide sensing network 553. In sensing network 553, voltage reference $V_R$ forms a branch that is electrically coupled to ground and one terminal of switch 530a. The other terminal of switch 530a is electrically coupled to electrode 554 and a terminal of switch 530b. The other terminal of switch 530b is coupled to the input of voltage amplifier 523, to reference capacitor $C_R$, and to a terminal of switch 530c by a common electrical node. Switch 530c is coupled in parallel to reference capacitor $C_R$, both of which also have a terminal that is grounded.

Referring also to FIGS. 18-19, sensor 550 has end portion 555 opposite end portion 557, and is comprised of multiple layers 560 including dielectric 551 and electrode-554. Dielectric 551 defines surface 551a opposite surface 551b. Electrode 554 includes surface 554a in contact with surface 551a. As depicted, surfaces 551a and 554a are generally coextensive.

Sensor 550 is depicted in FIG. 17 as a capacitor in an "open electrode" configuration; where the electrical connection to ground is by way of dielectric 551, and possibly other substances such as an air gap between dielectric 551 and the ground. In other words, sensor 550 does not include a predefined pathway to ground—instead allowing for the possibility that the ground coupling will vary. This dielectric coupling is symbolized by a dashed line representation 556 for sensor 550 in FIG. 17.

Dielectric 551 and/or electrode 554 is comprised of one or more materials consumed or displaced by a pest of interest. As pests consume or displace these materials, one portion of dielectric 551 and/or electrode 554 is removed or separated relative to another. FIG. 19 illustrates region 570 that has been consumed or displaced by pests. Region 570 corresponds to the phantom overlay 580 shown in FIG. 18. This type of mechanical alteration of sensor 550 tends to change the ability of electrode 554 to hold charge Q and correspondingly changes capacitance $C_S$ of sensor 550. For example, as the area of electrode surface 554a decreases, the relative charge-holding capacity or capacitance of electrode 554 decreases. In another example, as the dielectric dimensions are altered or the dielectric composition changes, capacitance typically varies. In a further example, a change in distance between electrode 554 and the ground as caused by separation or displacement of one or more portions of sensor 550 can impact the ability to hold charge.

Referring generally to FIGS. 17-19, one mode of operating circuitry 520 is next described. For each measurement taken with this mode, a switching sequence is executed by processor 526 as follows: (1) switch 530a is closed while holding switch 530b open to place voltage reference $V_R$ across sensor 550, causing a charge Q to build on electrode 554; (2) after this charging period, switch 530a is opened; (3) switch 530b is then closed to transfer at least a portion of charge Q to reference capacitor $C_R$ as switch 530c is held open; and (4) after this transfer, switch 530b is reopened. The voltage $V_Q$ corresponding to the charge TQ transferred to reference capacitor $C_R$ is amplified with amplifier 523 and presented as an input voltage to A/D converter 324. The digitized input to A/D converter 324 is provided to processor 526 and/or stored in memory (not shown). After the voltage is measured, reference capacitor $C_R$ can be reset by closing and opening switch 530c with processor 526. The sequence is then complete. For a sensor capacitance $C_S$ that is much smaller than the reference capacitance $C_R$ ($C_S \ll C_R$), capacitance $C_S$ can be modeled by the equation: $C_S = C_R*(V_Q/V_R)$ for this arrangement.

Processor 526 can be arranged to repeat this switching sequence from time to time to monitor for changes in Q and correspondingly $C_S$. This data can be analyzed with processor 526 and reported through communication circuit 328 using the techniques described in connection with system 300. These repetitions can be periodic or nonperiodic; by demand through another device such as communication circuit 328; or through different means as would occur to those skilled in the art.

In an alternative embodiment, a burst mode of charge/capacitance monitoring can be used. For the burst mode, processor 526 is configured to repeat the sequence of: (1) closing switch 530a while switch 530b is held open to charge electrode 554 and isolate reference capacitor $C_R$, (2) opening switch 530a, and then (3) closing switch 530b to transfer charge to reference capacitor $C_R$. Switch 530c remains open throughout these repetitions for this mode. As a result, reference capacitor $C_R$ is not reset as the repetitions are executed. Once a desired number of the repetitions are completed (a "burst"), A/D converter 324 digitizes the input voltage. By executing the repetitions rapidly enough, the amount of charge Q transferred from electrode 554 to reference capacitor $C_R$ increases. This increased charge transfer provides a relative increase in gain. Accordingly, gain can be controlled by the number of repetitions executed per burst. Also, reference capacitor $C_R$ operates as an integrator to provide a degree of signal averaging.

In other alternative embodiments, network 560 can be operated to continuously repeat the burst mode sequence with a resistor in place of switch 530c to facilitate concurrent monitoring. For this arrangement the resistor used for switch 530c and reference capacitor $C_R$ define a single pole, low pass filter. This continuous mode has a "charge gain" (expressed in electric potential per unit capacitance) determined as a function of the replacing resistor, the reference voltage $V_R$, and the frequency at which the repetitions are performed. In still other alternatives, network 560 is modified to use an operational amplifier (opamp) integrator or unipolar equivalent as described in *Charge Transfer Sensing* by Hal Phillip (dated 1997), which is hereby incorporated by reference. In still other embodiments, a different circuit arrangement to measure charge Q, voltage $V_Q$, $C_S$, or another value corresponding to $C_S$ can be used as would occur to those skilled in the art.

Electrode 554 can be electrically connected to circuitry 520 with an elastomeric connector or a different type of connector as would occur to those skilled in the art. In an alternative embodiment, sensor 550 can be arranged to include a defined pathway to ground rather than an open electrode configuration, or a combination of both approaches. Still other embodiments include a stacked, wrapped, folded, bent, or rolled arrangement of alternating electrode layers and dielectric layers with one or more of the layers being of a material consumed or displaced by pests of interest. Alternatively or additionally, a sensor can include two or more separate electrodes or sensing capacitors arranged in a network in series, in parallel, or a combination of these.

In other embodiments, electrode 554 of sensor 550 can be applied to sense one or more properties besides pest consumption or displacement. In one example, sensor 550 is arranged to detect wear, abrasion, or erosion. For this arrangement, sensor 550 is formed from one or more materials disposed to wear away in response to a particular mechanical activity that correspondingly changes the charge holding capacity of electrode 554. For example, the area of surface 554a of electrode 554 could be reduced as one or more portions are removed due to this activity. Circuitry 520 can be used to monitor this change and report when it exceeds a threshold value indicative of a need to replace or service a device being monitored with the sensor, discontinue use of such device, or take another action as would occur to those skilled in the art.

In another example, sensor 550 is formed from one or more materials selected to separate or otherwise decrease charge holding capacity in response to a change in an environmental condition to which the one or more materials are exposed, a chemical reaction with the one or more materials, or through a different mechanism as would occur to those skilled in the art. For these nonpest embodiments, operation of processor 526 can correspondingly differ. Also, a hardwired connection, an indicator, and/or other device may be utilized as an addition or alternative to communication circuit 328.

Referring to systems 300, 400, and 500 generally, one or more conductive elements, resistive elements, or capacitive elements of sensors 350, 450, 550 can be comprised of a carbon-containing ink as described in connection with pest control device 110. Indeed, different resistance values for various sensing elements, such as elements 353a and 453a, can be defined by using inks with different volume resistivities. Alternatively or additionally, different resistance values can be defined by varying dimensions of the material through which electricity is conducted and/or employing different interconnected components for these elements. Furthermore, substrates 351, 451, and/or 551 can be formed from a paper coated with a polymeric compound, such as polyethylene, to reduce dimensional changes due to moisture as described in connection with pest control device 110.

Figure 20:
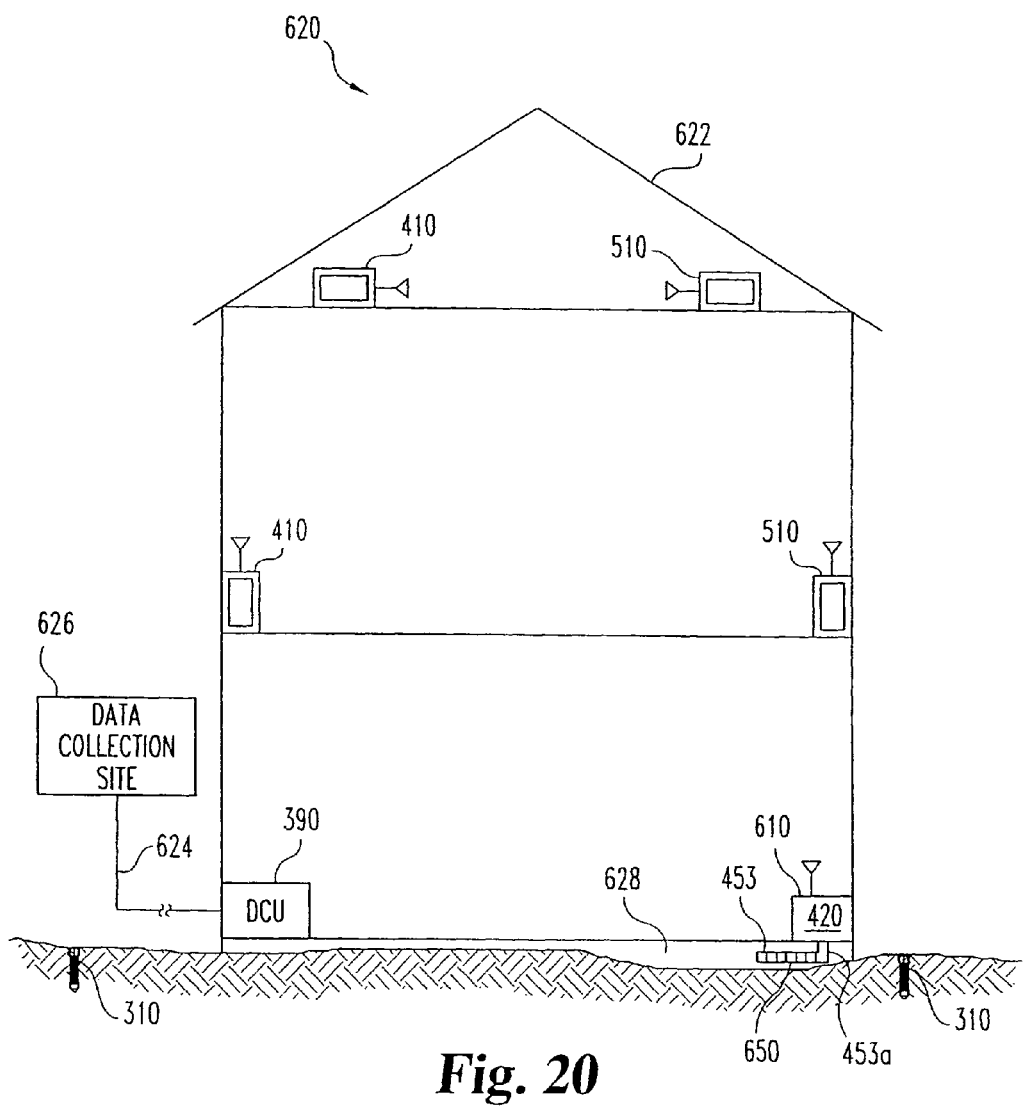
FIG. 20 is a diagrammatic view of a fifth type of pest control system according to the present invention that includes pest control devices of the second, third, and fourth types, and further includes a fifth type of pest control device.

FIG. 20 illustrates a fifth type of pest control system 620 that includes pest control devices 310, 410, 510, and 610, where like reference numerals refer to like features previously described. System 620 includes building 622 that houses data collection unit 390. System 620 also includes a central data collection site 626 that is connected by communication pathway 624 to data collection unit 390. Communication pathway 624 can be a hardwired connection through a computer network such as the internet, a dedicated telephone interconnection, a wireless link, a combination of these, or such other variety as would occur to those skilled in the art.

For system 620, pest control devices 310 are depicted in-ground for use as discussed in connection with system 20. Pest control devices 410 and 510 of system 620 are located within building 622, and are shown at or above ground level. Pest control devices 310, 410, 510 are arranged to communicate with data collection unit 390 through wireless means, hardwired means, through another device like a hand-held interrogator 30, or a combination of these.

Pest control device 610 is comprised of circuitry 420 previously described and sensor 650. Sensor 650 includes network 453 comprised of sensing elements 453a. For sensor 650, network 453 is directly coupled to member 628 of building 622. Member 628 is comprised of one or more materials subject to destruction by one or more species of pests. For example, member 628 can be formed of wood when termites are the targeted type of pest. As a result, pest activity relative to member 628 of building 622 is directly monitored with pest control device 610. Like pest control devices 310, 410, and 510, pest control device 610 communicates with data collection unit 390 through wireless means, hardwired means, through another device like a hand-held interrogator 30, or a combination of these.

Central data collection site 626 can be connected to a number of data collection units 390 arranged to monitor different buildings or areas each having one or more of pest control devices 110, 310, 410, 510, and/or 610.

Figure 21:
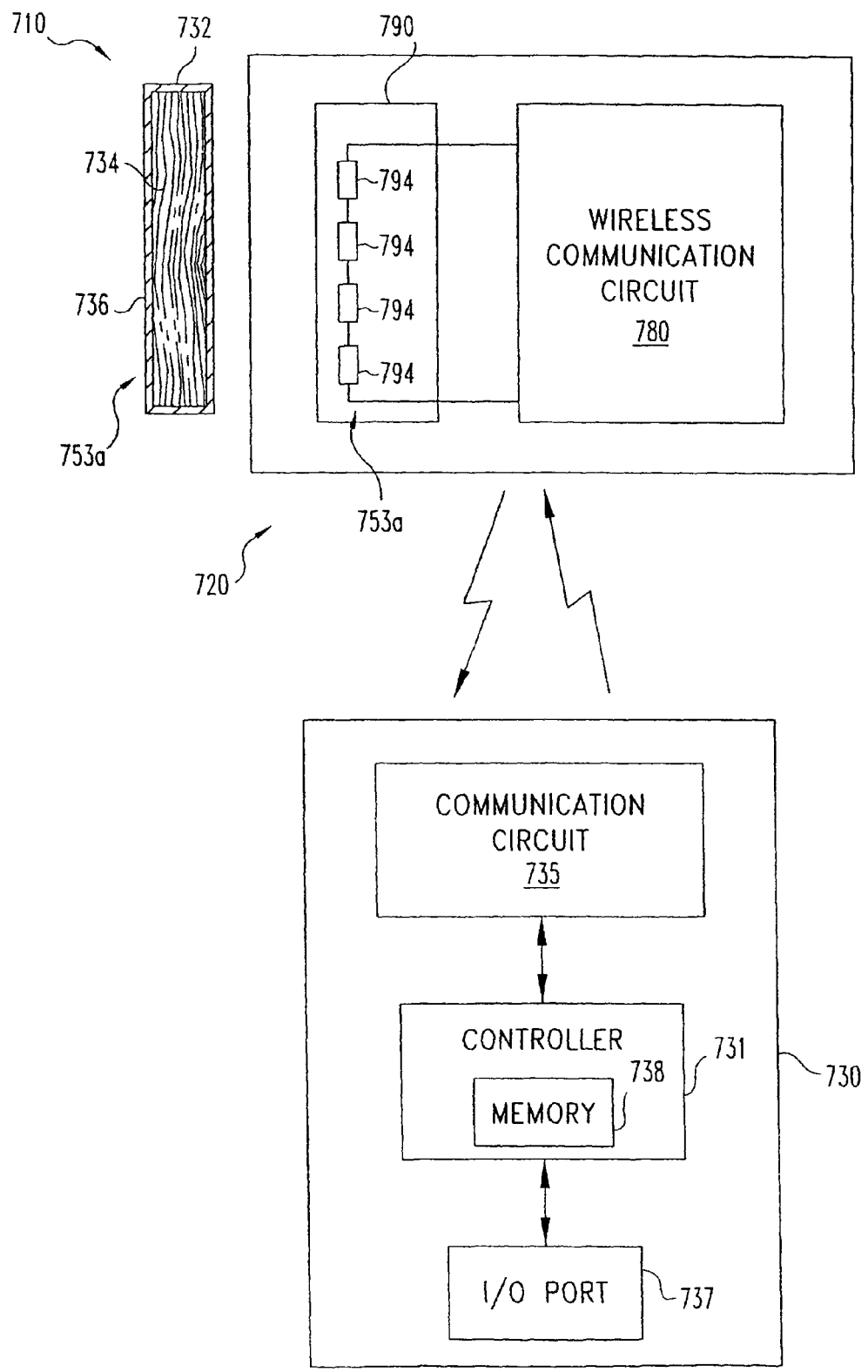
FIG. 21 is a diagrammatic view of a sixth type of pest control system according to the present invention that includes a sixth type of pest control device.

FIG. 21 illustrates pest control device system 720 of still another embodiment of the present invention; where like reference numerals refer to like features previously described. System 720 includes interrogator 730 and pest control device 710. Pest control device 710 includes pest monitoring member 732 arranged to be consumed and/or displaced by pests. In one example, member 732 is configured as a bait that includes pest-edible material 734, such as wood in the case of termites, and magnetic material 736 in the form of a coating on material 734. Magnetic material 736 may be a magnetic ink or paint applied to a wood core serving as material 734. In other examples, material 734 may be formed from a substance other than a food source that is typically removed or displaced by the targeted pests—such as a closed cell foam in the case of subterranean termites. In yet other examples, material 734 may be comprised of food and non-food components.

Device 710 further includes wireless communication circuit 780 electrically coupled to magnetic signature sensor 790. Sensor 790 comprises a series of magnetoresistors 794 fixed in a predetermined orientation relative to member 732 to detect a change in resistance resulting from an alteration in the magnetic field produced by magnetic material 736. Accordingly, material 736 and magnetoresistors 794 are alternatively designated sensing elements 753a. Alterations in the monitored magnetic field can occur, for instance, as member 732 is consumed, displaced, or otherwise removed from member 732 by pests. Sensor 790 provides a means to characterize a magnetic signature of member 732. In alternative embodiments, sensor 790 may be based on a single magnetoresistor, or an alternative type of magnetic field sensing device such as a Hall effect device or reluctance-based sensing unit.

The magnetic field information from sensor 790 may be transmitted as variable data with communication circuit 780. Circuit 780 may further transmit a unique device identifier and/or discrete bait status information as described for communication circuit 160. Circuit 780, sensor 790, or both may be passive or active in nature.

Interrogator 730 includes communication circuit 735 operable to perform wireless communication with circuit 780 of device 710. In one embodiment, circuits 780 and 790 are of a passive type with circuit 780 being in the form of an RF tag like circuitry 160. For this embodiment, communication circuit 735 is configured comparable to circuits 32 and 34 of interrogator 30 to perform wireless communications with device 710. In other embodiments, device 710 may be adapted to alternatively or additionally include an active wireless communication circuit and/or hardwired communication interface. For these alternatives, interrogator 730 is correspondingly adapted, a data collection unit may be used in lieu of interrogator 730, or a combination of both approaches may be utilized.

Interrogator 730 includes controller 731, I/O port 737, and memory 738 that are the same as controller 36, I/O port 37, and memory 38 of interrogator 30, except they are configured to receive, manipulate and store magnetic signature information in addition or as an alternative to discrete bait status and identification information. It should be appreciated that like the resistance characteristics of devices 310, 410, and 610 or the capacitance characteristics of device 510; magnetic signature information may be evaluated to characterize pest consumption behavior. This behavior may be used to establish predictions concerning bait replenishment needs and pest feeding patterns.

Figure 22:
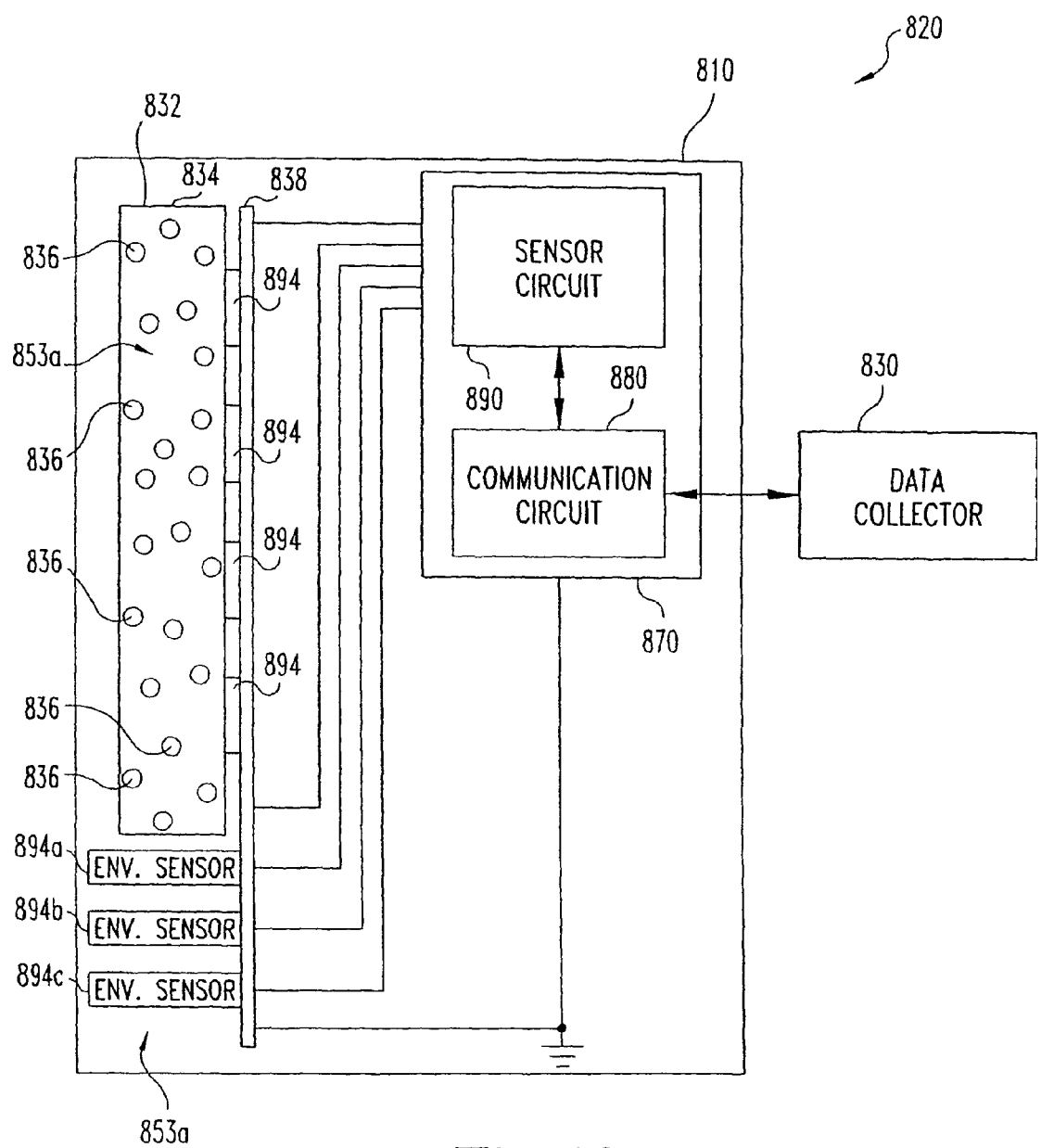
FIG. 22 is a diagrammatic view of a seventh type of pest control system according to the present invention that includes a seventh type of pest control device.

FIG. 22 depicts system 820 of still another embodiment of the present invention. System 820 includes pest control device 810 and data collector 830. Device 810 includes monitoring member 832 arranged to be consumed and/or displaced by the pests of interest. Member 832 includes matrix 834 with a magnetic material 836 dispersed throughout. Material 836 is schematically represented as a number of particles in matrix 834. Matrix 834 may have a food composition, non-food composition, or a combination of these.

Device 810 also includes communication circuit 880 and sensor circuit 890 electrically coupled thereto. Circuit 890 includes a series of magnetoresistors 894 fixed in relation to member 832 to detect change in a magnetic field produced by material 836 as it is consumed, displaced, or otherwise removed from member 832.

Circuit 890 further includes a number of environmental (ENV.) sensors 894a, 894b, 894c configured to detect temperature, humidity, and barometric pressure, respectively. Material 836 and sensor 894, 894a, 894b, and 894c are alternatively designated sensing elements 853a. Sensors 894, 894a, 894b, 894c are coupled to substrate 838, and may provide a signal in either a digital or analog format compatible with associated equipment. Correspondingly, circuit 890 is configured to condition and format signals from sensors 894a, 894b, 894c. Also, circuit 890 conditions and formats signals corresponding to the magnetic signature detected with magnetoresistors 894. The sensed information provided by circuit 890 is transmitted by communication circuit 880 to data collector 830. Communication circuit 880 may include discrete bait status information, a device identifier, or both as described in connection with devices 110. Circuit 880 and circuit 890 may each be passive, active, or a combination of both with data collector 830 being correspondingly adapted to communicate in accordance with the selected approach.

For a passive embodiment of circuit 880 based on RF tag technology, data collector 830 is configured the same as interrogator 30 with the exception that its controller is arranged to manipulate and store the different forms of sensed information provided by circuit 890. In another embodiment, data collector 830 may be in the form of a standard active transmitter/receiver to communicate with an active transmitter/receiver form of circuit 880. In still other embodiments, data collector 830 and device 810 are coupled by a hardwired interface to facilitate data exchange.

Figure 23:
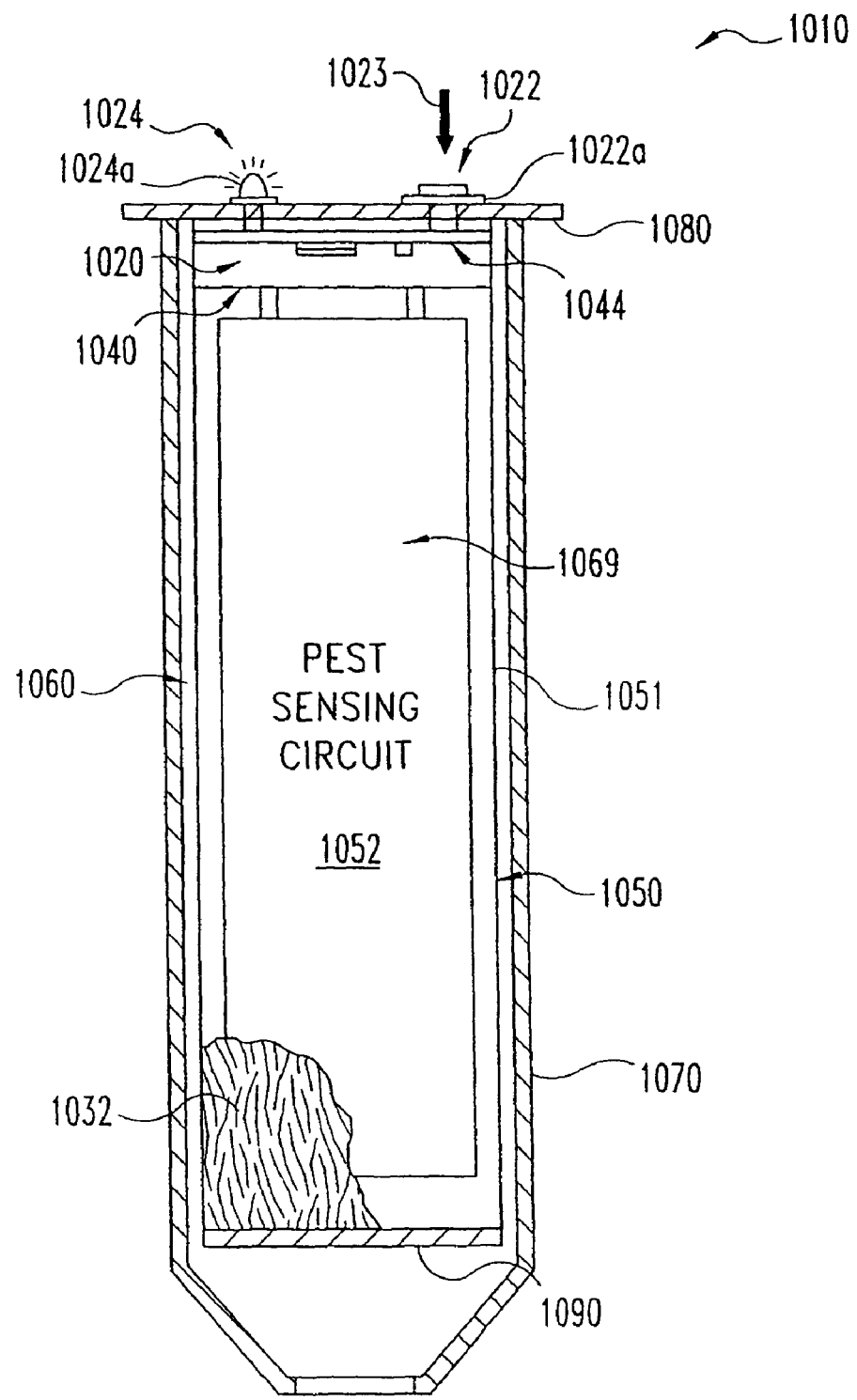
FIG. 23 is a partial diagrammatic, sectional view of an eighth type of pest control device according to the present invention.
Figure 24:
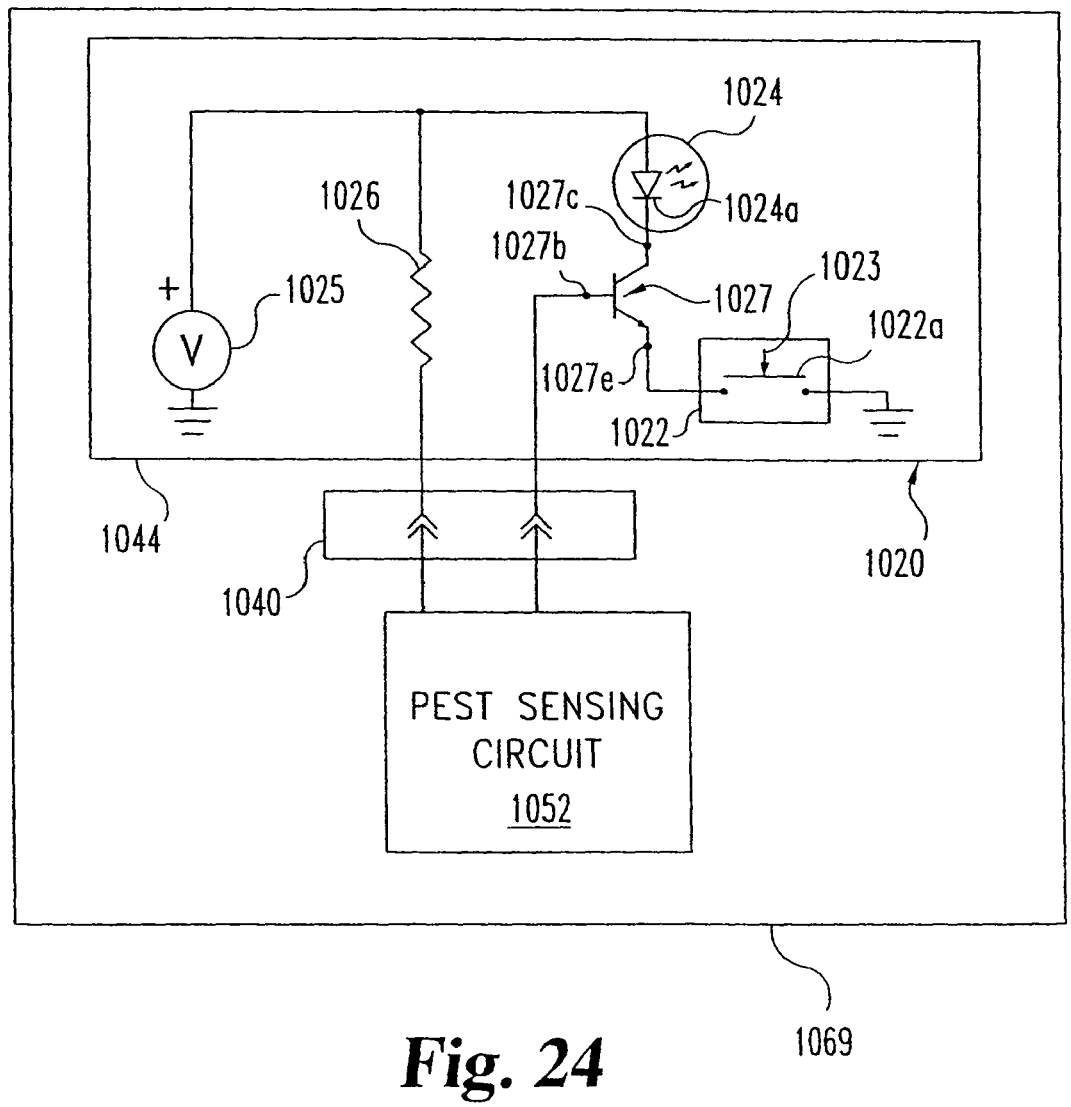
FIG. 24 is a schematic view of circuitry for the eighth type of pest control device of FIG. 23.

FIGS. 23 and 24 depict pest control device 1010 of a further embodiment of the present invention; where like reference numerals refer to like features. Pest control device 1010 includes communication circuitry 1020, connector 1040, and sensor 1050 configured in a pest monitoring arrangement 1060 as shown in FIG. 23. Communication circuitry 1020 includes activation device 1022 and indicating device 1024 to output information. Communication circuitry 1020 also includes other components assembled to provide circuit subassembly module 1044. Module 1044 can include a printed wiring board to electrically interconnect various components and/or other members to mechanically support communication circuitry 1020. Module 1044, and correspondingly communication circuitry 1020, are electrically and mechanically coupled to sensor 1050 by connector 1040. Connector 1040 can include an electrically conductive elastomeric material as described for connection members 140 of pest control device 110, and/or such different materials or configuration as would occur to one skilled in the art.

Sensor 1050 includes substrate 1051 carrying pest sensing circuit 1052. Pest sensing circuit 1052 includes an electrically conductive loop or network that has an electrical resistance below a predefined level when installed and that is subject to alteration by pest activity as previously described for conductor 153 of pest control device 110. Substrate 1051 and/or pest sensing circuit 1052 include material that is typically displaced or consumed by one or more pests to be monitored with arrangement 1060. When coupled to communication circuitry 1020, pest sensing circuit 1052 cooperates therewith to provide monitoring circuitry 1069.

Pest monitoring arrangement 1060 further includes bait 1032, a surface of which is shown by the cut away view in the lower portion of FIG. 23. Bait 1032 can be configured the same as bait member 132 or any previously described variations thereof. In one arrangement, bait 1032 is in the form of at least two members positioned on opposing sides of sensor 1050 as depicted in FIGS. 3 and 6 for bait members 132 in relation to sensor 150 of pest control device 110.

Pest monitoring arrangement 1060 is configured as a portable unit for installation in and removal from housing 1070. Housing 1070 can be shaped and composed of material suitable for installation in the ground like housing 170 described in connection with pest control device 110. Sensor 1050 is fixed in relation to circuit subassembly module 1044 by connector 1040 which is in turn fixed to cap 1080 (shown in section). Carrying member 1090 provides further mechanical support for arrangement 1060, including one or more side members (not shown) connected to module 1044 and/or cap 1080. Cap 1080 can be configured comparably to cap 180 of pest control device 110, allowing for the mounting of devices 1022 and 1024 as illustrated. Carrying member 1090 can be configured comparably to carrying member 190 of pest control device 110, and may be permanently fixed in relation to module 1044 and/or cap 1080, or selectively connected thereto.

In FIG. 24, communication circuitry 1020 is shown in a schematic form. Activation device 1022 is further shown in the form of a "normally open" push button switch 1022a, such that electrical contact is made only as long as switch 1022a is being pressed in the direction indicated by arrow 1023. Indicating device 1024 is shown in the form of a Light Emitting Diode (LED) 1024a that can be selectively illuminated to output information. Components of communication circuitry 1020 also include electrical energy source 1025 arranged to supply a generally constant voltage V, resistor 1026, and NPN transistor 1027 electrically interconnected as shown in FIG. 24.

Referring generally to FIGS. 23 and 24, the operation of pest control device 1010 is next described. Pest control device 1010 is arranged for placement in a region to be monitored for one or more pests as illustrated for various pest control devices in FIG. 2 and FIG. 20. Further, as depicted, pest control device 1010 is suitable for installation in the ground.

Indeed, during normal use, one or more pest control devices 1010 are installed at least partially below ground with cap 1080 remaining accessible.

Once installed, an operator stimulates operation of communication circuitry 1020 (and correspondingly monitoring circuitry 1069) by pressing switch 1022a. In response, emitter 1027e of transistor 1027 is grounded relative to voltage supplied by source 1025. With emitter 1027e grounded, LED 1024a will emit light when transistor 1027 is active, such that voltage from source 1025 drops across LED 1024a, and the collector 1027c and emitter 1027e terminals of transistor 1027. Transistor 1027 is activated with switch 1022a being closed if an electrical interconnection between source 1025 and base 1027b of transistor 1027 presents a voltage level to base 1027b sufficient to turn-on transistor 1027. This electrical interconnection includes the resistance of resistor 1026 and pest sensing circuit 1052 in series. Accordingly, for an electrical resistance of pest sensing circuit 1052 at or below a given threshold, LED 1024a is illuminated if switch 1022a is pressed. However, as pests consume or displace substrate 1051 and/or pest sensing circuit 1052, resulting circuit alteration can cause a sufficiently increased electrical resistance or open circuit condition so that transistor 1027 is no longer activated by pressing switch 1022a, and correspondingly LED 1024a will not emit light.

Through the operation of communication circuitry 1020, a two-state signal is provided with LED 1024a that visually indicates whether or not the electrical continuity/resistance of pest sensing circuit 1052 has been altered. This two-state signal can be used to determine when to reconfigure pest control device 1010 to add a pesticide, exchange pest monitoring arrangement 1060 with a pesticide delivery arrangement, and/or prompt another action. Such other actions may include installing additional devices with or without pesticide. In still a further embodiment, pest control device 1010 is configured to initially include a pesticide laden bait so that communication circuitry 1020 provides information indicative of pesticide consumption.

For one embodiment of the present invention, resistor 1026 is nominally about 10,000 ohms, source 1025 provides a generally constant three volt output and is in the form of one or more electrochemical cells (e.g., a "battery"), transistor 1027 is of a standard bipolar junction switching variety, and pest sensing circuit 1052 is an electrically conductive loop as described in connection with pest control device 110. In other embodiments, electrical energy source 1025, the value of resistor 1026, and/or nature of transistor 1027 can differ. Such alternative arrangements can include a PNP bipolar junction transistor, a Field Effect Transistor (FET), an electromechanical relay, or a Solid State Relay (SSR) in place of NPN transistor 1027 with corresponding adjustments to circuitry 1020, to name only a few possibilities. Alternatively or additionally, source 1025 can be of a form other than a battery, can be external to device 1010 and/or can be selectively applied to device 1010 by an operator.

Alternatively or additionally, monitoring circuitry 1069 can be adapted to communicate different information about the device. For example, an additional subcircuit can be included to test whether the voltage source 1025 is operational. In another example, the manual interrogation of pest sensing circuit with activation device 1022 and output with device 1024 can be added to wireless communication circuits of previously described pest control devices to provide a manually triggered operational test. In still another example, the manual interrogation technique is utilized to output different nonzero levels of pest consumption or displacement. Accordingly, information quantitizing the amount of consumption or displacement can be realized in response to the manual stimulus. For such embodiments, the sensor arrangements of devices 310, 410, 510, 610, 710, and/or 810 can be utilized with appropriate adaptations to communication circuitry 1020 to provide for activation by a switch or other operator input device. In one such form, multiple LEDs or another visual display arrangement output varying nonzero levels of consumption. In still another form, a single two-state indicating LED is utilized; however, a threshold level is set that corresponds to a given nonzero degree of consumption or displacement. This threshold can be factory set and/or set with an operator control.

In further embodiments, an activation device different than a normally open switch 1022*a* can be alternatively or additionally utilized. In one example, the activation device is in the form of a wireless RF receiving circuit. In another example, the activation device is in the form of a switch with more than two states or such different form as would occur to one skilled in the art. For other embodiments, an indicating device other than an LED can be used. Such an indicator can be visual, audible, a combination of these, or such different type as would occur to those skilled in the art. In one example, the identifying device is in the form of an incandescent lamp or electromechanical indicator. In another example, the indicating device is in the form of an RF signal transmitter that outputs information provided by monitoring circuitry 1069 in response to a stimulus with activation device 1022. In still another form, activation device 1022, indicating device 1024, and/or other features of communication circuitry 1020 are provided in the form of a signal transponder that can be active or passive in nature. In yet another form, activation device 1022, indicating device 1024, and/or other features of communication circuitry 1020 are configured as a unit that can engage and disengage from the rest of device 1010 by way of a connector or otherwise. For this form, such a unit could be used to interrogate multiple devices 1010 by manually engaging/disengaging each of the multiple devices 1010 in a desired sequence. In a further variation, such a unit could be configured to retain the information from multiple devices 1010.

Figure 25:
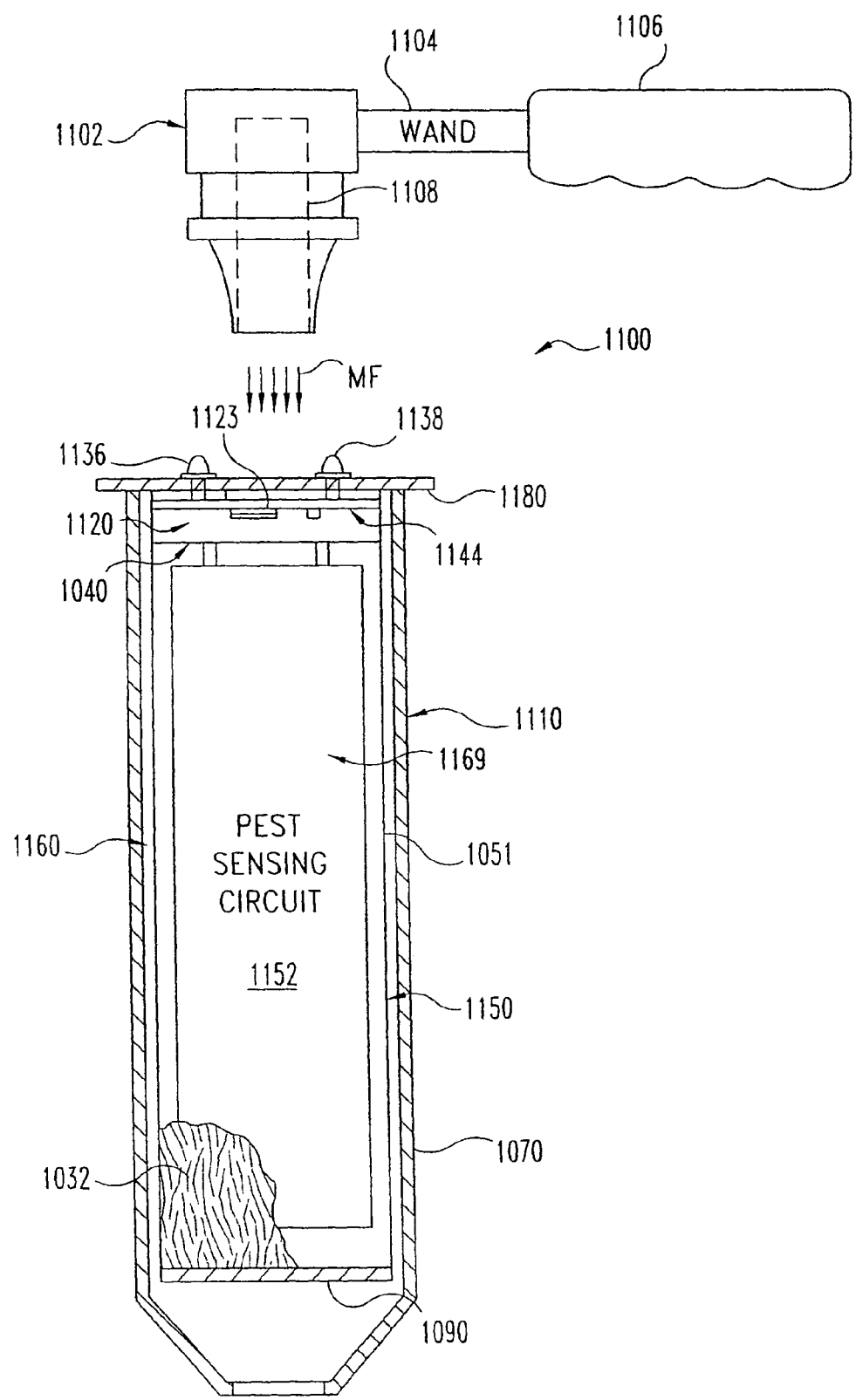
FIG. 25 is a partial diagrammatic, sectional view of a ninth type of pest control system according to the present invention.

FIG. 25 depicts pest control system 1100 of a further embodiment of the present invention, where like reference numerals refer to like features. Pest control system 1100 includes an operator-controlled magnetic activation device in the form of wand 1102. Wand 1102 includes body 1104 with operator grip 1106 and magnetic field source 1108. Magnetic field source 1108 provides magnetic field MF symbolically depicted in FIG. 25. Magnetic field source 1108 can be provided by a permanent magnet or an electromagnet, to name a few examples.

Figure 26:
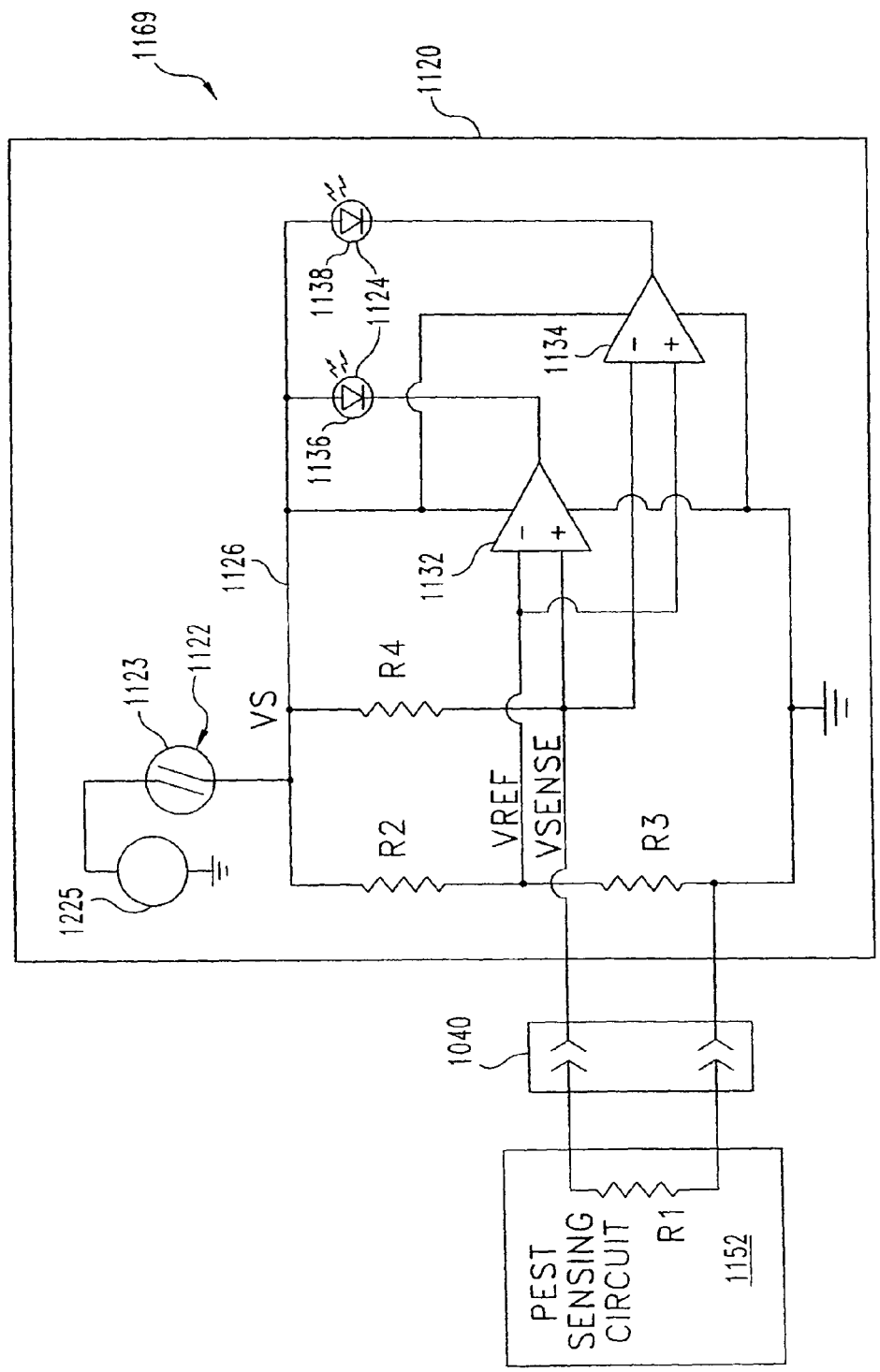
FIG. 26 is a schematic view of circuitry for a ninth type of pest control device included in the system of FIG. 25.

System 1100 also includes pest control device 1110. Referring additionally to FIG. 26, pest control device 1110 includes communication circuitry 1120, connector 1040, and sensor 1150 configured in a pest monitoring arrangement 1160. Communication circuitry 1120 includes device 1122 responsive to magnetic field MF when in close proximity thereto, and indicators 1136 and 1138 to output information. Communication circuitry 1120 also includes other components assembled to provide circuit subassembly module 1144. Module 1144 can include a printed wiring board to electrically interconnect various components and/or other members to mechanically support communication circuitry 1120. Module 1144, and correspondingly communication circuitry 1120, are electrically and mechanically coupled to sensor 1150 by connector 1040, as previously described in connection with pest control device 1010.

Sensor 1150 includes substrate 1051 carrying pest sensing circuit 1152. Pest sensing circuit 1152 includes an electrically conductive loop or network that has an electrical resistance, represented in FIG. 26 by R1, that is below a predefined level when installed and that is subject to alteration by pest activity as previously described for conductor 153 of pest control device 110. Substrate 1051 and/or pest sensing circuit 1152 include material that is typically displaced or consumed by one or more pests to be monitored with arrangement 1160. When coupled to communication circuitry 1120, pest sensing circuit 1152 cooperates therewith to provide monitoring circuitry 1169. Pest monitoring arrangement 1160 further includes bait 1032 as previously described in connection with device 1010, a surface of which is shown by the cut away view in the lower portion of FIG. 25.

Pest monitoring arrangement 1160 is configured as a portable unit for installation in and removal from housing 1070, as previously described for device 1010. Sensor 1150 is fixed in relation to circuit subassembly module 1144 by connector 1040 which is in turn fixed to cap 1180 (shown in section). Also, as described for device 1010, member 1090 provides further mechanical support for arrangement 1160, including one or more side members (not shown) connected to module 1144 and/or cap 1180. Cap 1180 can be configured comparably to cap 1080 of pest control device 1010, allowing for the mounting of devices 1136 and 1138 as illustrated.

In FIG. 26, communication circuitry 1120 is shown in a schematic form. Activation device 1122 is further shown in the form of a "normally open" switch 1123, such that switch 1123 is closed only as long as device 1122 is activated by magnetic field MF shown in FIG. 25. Indicators 1136 and 1138 are each provided in the form of LED 1124 that can be selectively illuminated with communication circuitry 1120. Components of communication circuitry 1120 also include electrical energy source 1125 arranged to supply a generally constant voltage VS, resistors R2-R4, and comparators 1132 and 1134 electrically interconnected as shown in FIG. 26.

Referring generally to FIGS. 25 and 26, the operation of pest control device 1110 is next described. Pest control device 1110 is arranged for placement in a region to be monitored for one or more pests as illustrated for various pest control devices in FIG. 2 and FIG. 20. Further, as depicted, pest control device 1110 is suitable for installation in the ground. Indeed, during normal use, one or more pest control devices 1110 are installed at least partially below ground, with cap 1180 remaining at least partly visible.

Once pest control device 1110 is installed, an operator stimulates operation of communication circuitry 1120 (and correspondingly monitoring circuitry 1169) by placing wand 1102 proximate to cap 1180 to align magnetic field MF with device 1122 in a manner sufficient to correspondingly actuate device 1122 so that switch 1123 closes. With switch 1123 being closed, energy source 1125 is electrically coupled to the other components of communication circuitry 1120 via electrical node 1126. Resistors R2 and R3 are configured as a voltage divider that provides a reference voltage VREF to the inverting (−) input of comparator 1132 and to the noninverting (+) input of comparator 1134, while switch 1123 couples the voltage VS of source 1125 to circuit node 1126. Resistor R4 and the resistance of pest sensing device 1152, represented by R1, also form a voltage divider that is electrically parallel to the voltage divider formed by resistors R2 and R3. A sense voltage, VSENSE, is applied to the noninverting (+) input of comparator 1132 and the inverting (−) input of comparator 1134. Both the R2/R3 and R1/R4 voltage dividers are coupled between VS and electrical ground while switch 1123 is closed.

The relative resistance values of the four resistors, R1-R4, are selected so that VREF is nominally greater than VSENSE, prior to any alteration of pest sensing circuit 1152. Letting the impedance of the inverting (−) and noninverting (+) inputs of comparators 1132 and 1134 be infinite (typically a reasonable approximation for values of R1-R4 each less than one million ohms), then VREF=VS(R3/(R2+R3) and VSENSE=VS(R1/R1+R4)).

When VREF is greater than VSENSE (VREF>VSENSE), the output of comparator 1134 is at a high state and the output of comparator 1132 is at a low state. For these conditions, voltage VS is presented across LED 1124 of indicator 1136, causing it to emit light if VS is sufficiently large enough. In contrast, a turn-on voltage is not provided to LED 1124 of indicator 1138, preventing its illumination.

However, as pest activity increases, the resistance of pest sensing circuit 1152, R1, increases. If R1 exceeds R3, then VSENSE becomes greater than VREF (VSENSE>VREF) and the output states of comparators 1132 and 1134 reverse. Correspondingly, indicator 1138 illuminates while indicator 1136 does not, which provides information showing a change in status of pest sensing circuit 1152 compared to conditions for VREF>VSENSE. Anytime magnetic field MF is separated from device 1122 sufficiently by moving wand 1102 or otherwise, switch 1123 opens, removing VS from node 1126 and deactivating communication circuitry 1120, such that neither indicator 1136 nor 1138 is illuminated.

Through the operation of communication circuitry 1120, a two-state signal is provided with indicators 1136 and 1138 that each visually indicates whether or not the electrical continuity/resistance of pest sensing circuit 1152 has been altered relative to an established threshold. This two-state signal can be used to determine when to reconfigure pest control device 1110 to add a pesticide, exchange pest monitoring arrangement 1160 with a pesticide delivery arrangement, and/or prompt another action. Such other actions may include installing additional devices with or without pesticide. In still a further embodiment, pest control device 1110 is configured to initially include a pesticide laden bait so that communication circuitry 1120 provides information indicative of pesticide consumption.

For one embodiment of the present invention, resistors R2 and R4 are nominally 330,000 ohms, resistor R3 is nominally about 25,000 ohms and the resistance of pest sensing circuit 1152 is nominally about 15,000 ohms (R1) before alternation by pests. For this embodiment, source 1125 provides a generally constant three (3) volt output and is in the form of one or more electrochemical cells (e.g., a "battery"), comparator 1132 and 1134 are each of an LM339 variety, device 1122 is in the form of a magnetically activated reed switch, indicator 1136 is in the form of a green colored LED, and indicator 1138 is in the form of a red colored LED. In other embodiments, electrical energy source 1125, the value of resistances represented by any of resistors R1-R4, device 1122, indicators 1136 and 1138, and/or comparators 1132 and 1134 can differ. In one alternative embodiment, VREF is provided by a voltage reference other than a voltage divider. For example, a zener diode, a bandgap reference, and/or a voltage regulator component could be used instead just to name a few.

Besides a magnetic reed switch form of device 1122, other magnetically activated devices could be used, such as one or more Hall effect sensors, an electromechanically activated component, an inductive coil responsive to external magnetic fields, or such different device type as would occur to those skilled in the art. Alternatively or additionally, the activation is performed with a device that has more than two operational states.

In other embodiments, only a single indicator is used. For one form of this embodiment, an LED only illuminates when pest activity is detected or when pest activity is not detected, but not for both. For another form of this embodiment, a multicolor LED type of indicator is used instead of two discrete LED components. For other embodiments, one or more indicators other than an LED can be used. Such an indicator can be visual, audible, a combination of these, or such different type as would occur to those skilled in the art. In one example, the indicator is in the form of an incandescent lamp or electromechanical indicator. In another example, the indicator is in the form of an RF signal transmitter that outputs information provided by monitoring circuitry 1169 in response to a magnetic field MF stimulus. It should be understood that magnetic field MF can be the magnetic field component(s) of time varying electromagnetic radiation.

In still another form, device 1122, indicator(s) 1136 and 1138, and/or other features of communication circuitry 1120 are provided in the form of a signal transponder that can be active or passive in nature. In yet another form, device 1122, source 1125, indicator(s) 1136 and 1138 and/or other features of communication circuitry 1120 are configured as a unit that can engage and disengage from the rest of device 1110 by way of a connector or otherwise. For this form, such a unit could be used to interrogate multiple devices 1110 by manually engaging/disengaging each of the multiple devices 1110 in a desired sequence. In a further variation, such a unit could be configured to retain the information from multiple devices 1110.

Further embodiments include circuitry and/or component(s) other than comparators to provide desired output states indicative of the status of pest sensing circuit 1152. For example, one or more transistors, logic devices, and the like responsive to a change in the status of pest sensing circuit 1152 could be used. Alternatively or additionally, source 1125 can be of a form other than a battery, can be external to device 1110 and/or can be selectively applied to device 1110 by an operator. In one alternative, the magnetic field stimulus MF is of a varying type and communication circuit 1120 is configured to derive operating power from it in addition to or as an alternative to source 1125.

Alternatively or additionally, monitoring circuitry 1169 can be adapted to communicate different information about the device. For example, an additional subcircuit can be included to test whether source 1125 is operational. In another example, the manual interrogation of pest sensing circuit with wand 1102 and corresponding output with indicators can be added to wireless communication circuits of previously described pest control devices to provide an operator triggered test. In still another example, the manual interrogation technique embodied in device 1110 is utilized to output different nonzero levels of pest consumption or displacement. Accordingly, information quantitizing the amount of consumption or displacement can be realized in response to the stimulus. For such embodiments, the sensor arrangements of devices 310, 410, 510, 610, 710, and/or 810 can be utilized with appropriate adaptations to communication circuitry 1120 to provide for activation by a magnetically activated device or other operator input device. In one such form, multiple LEDs or another visual display outputs varying nonzero levels of consumption. In still another form, a single two-state indicating LED is utilized; however, a threshold level is set that corresponds to a given nonzero degree of consumption or displacement. This threshold can be factory set and/or set by an operator.

Figure 27:
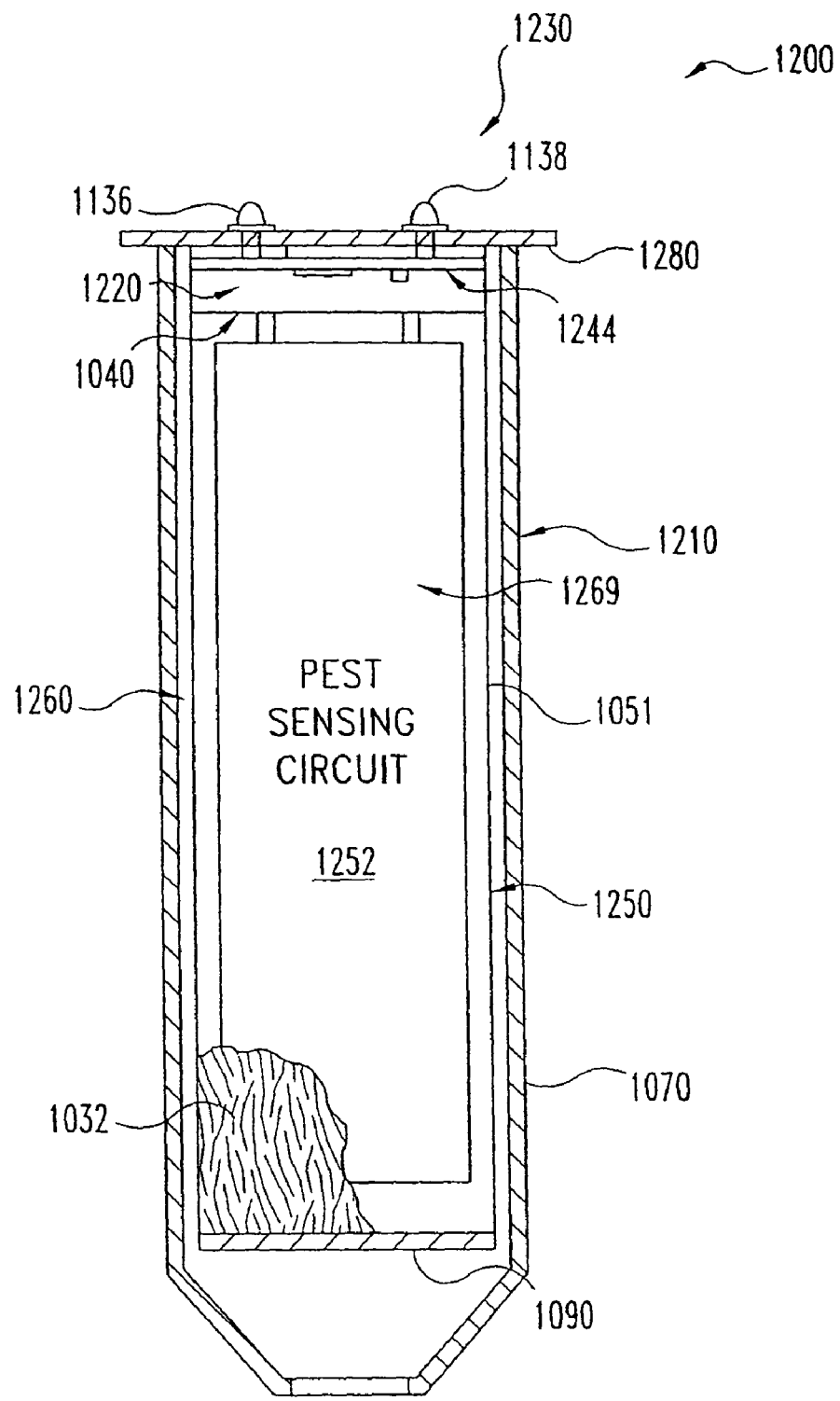
FIG. 27 is a partial diagrammatic, sectional view of a tenth type of pest control system according to the present invention.
Figure 28:
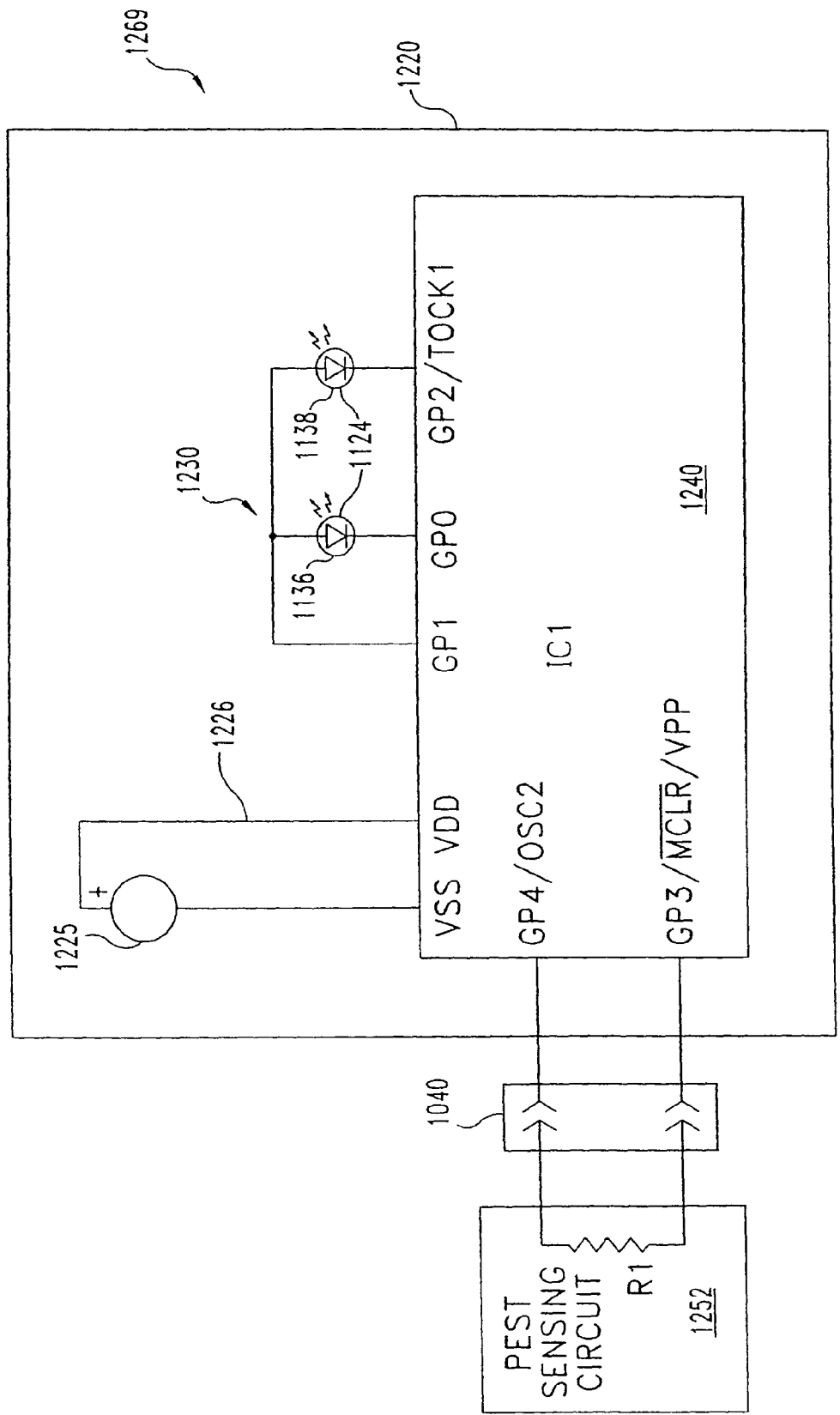
FIG. 28 is a schematic view of circuitry for a tenth type of pest control device included in the system of FIG. 27.

FIG. 27 depicts pest control system 1200 of a further embodiment of the present invention, where like reference numerals refer to like features. System 1200 also includes pest control device 1210. Referring additionally to FIG. 28, pest control device 1210 includes circuitry 1220, connector 1040, and sensor 1250 configured in a pest monitoring arrangement 1260. Circuitry 1220 includes indicator arrangement 1230. Arrangement 1230 includes indicators 1136 and 1138 in the form of LEDs 1124 as previously described. Circuitry 1220 also includes one or more other components assembled to provide circuit subassembly module 1244. Module 1244 can include a printed wiring board to provide various electrical interconnections, and/or other members to mechanically support circuitry 1220. Module 1244, and correspondingly circuitry 1220, are electrically and mechanically coupled to sensor 1250 by connector 1040, as previously described.

Sensor 1250 includes substrate 1051 carrying pest sensing circuit 1252. Pest sensing circuit 1252 includes an electrically conductive loop or network that has an electrical resistance, represented in FIG. 28 by R1. This electrical resistance R1 is below a predefined level when pest control device 1210 is installed and is subject to alteration by pest activity as previously described for conductor 153 of pest control device 110. Substrate 1051 and/or pest sensing circuit 1252 include material that is typically displaced or consumed by one or more pests to be monitored with arrangement 1260. When coupled to circuitry 1220, pest sensing circuit 1252 cooperates therewith to provide monitoring circuitry 1269. Pest monitoring arrangement 1260 further includes bait 1032 as previously described in connection with device 1010, a surface of which is shown by the cut away view in the lower portion of FIG. 27.

Pest monitoring arrangement 1260 is configured as a portable unit for installation in and removal from housing 1070, as previously described for device 1010. Sensor 1250 is fixed in relation to circuit subassembly module 1244 by connector 1040 which is in turn fixed to cap 1280 (shown in section). Also, as described for device 1010, member 1090 provides further mechanical support for arrangement 1260, including one or more side members (not shown) connected to module 1244 and/or cap 1280. Cap 1280 can be configured comparably to cap 1080 of pest control device 1010, allowing for the mounting of indicators 1136 and 1138 to be visible to an operator external to device 1210.

In FIG. 28, circuitry 1220 is shown in a schematic form. Indicators 1136 and 1138 of arrangement 1230 can each be selectively illuminated with circuitry 1220. Circuitry 1220 also includes electrical energy source 1225 arranged to supply a generally constant voltage, and controller circuit 1240 operatively coupled to source 1225 and indicator arrangement 1230.

Controller circuit 1240 is selectively coupled to pest sensing circuit 1252 by connector 1040. Controller circuit 1240 can be comprised of one or more components of a digital variety, analog variety, a different variety as would occur to one skilled in the art, or a combination of these. In one form, controller circuit 1240 is based on a solid-state, integrated circuit device. For example, controller circuit 1240 is symbolically illustrated as a single integrated circuit device IC1 in FIG. 28. The illustrated embodiment corresponds to a model number PIC12C5XX microcontroller from Microchip Technology, Inc. This form of microcontroller is of a programmable type, has a Reduced Instruction Set Computer (RISC) processor, and includes one or more forms of memory. Source 1225 can be comprised of one or more electrochemical cells (such as a common battery) that provide approximately a three (3) volt Direct Current (DC) coupled between contacts VDD and VSS to provide power to IC1 for the depicted embodiment. Connector 1040 is coupled across the GP4/OSC2 and GP3/$\overline{\text{MCLR}}$/VPP contacts of IC1; and arrangement 1230 is coupled to contacts GP1, GP0, and GP2/TOCK1. A data sheet for the PIC12C5XX family of microcontrollers, is hereby incorporated by reference. Alternatively or additionally, in other embodiments a different type of controller circuit of a programmable or nonprogrammable variety can be utilized as would occur to those skilled in the art.

Referring generally to FIGS. 27 and 28, the operation of pest control device 1210 is next described. Pest control device 1210 is arranged for placement in a region to be monitored for one or more pests as illustrated for various pest control devices in FIG. 2 and FIG. 20. Further, as depicted, pest control device 1210 is suitable for installation in the ground. Indeed, during normal use, one or more pest control devices 1210 can be installed at least partially below ground, with cap 1280 remaining at least partly visible.

To conserve power, circuitry 1220 can be arranged such that it is not activated until it is electrically coupled to pest sensing circuit 1252 via connector 1040. For example, this coupling can cause the closure of a conductive path that triggers activation (such as path 1226 shown in FIG. 28). In one form, a switch could be triggered by the insertion of pest sensing circuit 1252 into connector 1040 and/or an auxiliary conductor provided with pest sensing circuit 1252 to close the electrical path. Alternatively or additionally, circuitry 1220 could be activated by an operator control, such as a manual switch mounted to cap 1280; a magnetic or electromagnetic activation signal; an activation/stimulus technique utilized with any of devices 310, 410, 510, 610, 710, 810, 1010, or 1110; and/or be arranged to operate without a specific activation requirement.

Once activated and installed, controller circuit 1240 of pest control device 1210 operates to automatically monitor the status of pest sensing circuit 1252 on a continuous basis and/or a periodic basis. Controller circuit 1240 is further operable to detect a change in status of pest sensing circuit 1252 from a first state to a second state. In one example, the first state can correspond to an electrically closed circuit with a value of resistance R1 below an established threshold and the second state can correspond to an electrically open circuit with a value of resistance R1 above an established threshold. In other examples, one or more different parameters, such as capacitance, inductance, and/or magnetic signature (to name just a few) could be monitored/detected with controller circuit 1240, and a corresponding change of status of pest sensing circuitry 1252 defined in relation to such one or more different parameters as an addition or alternative to resistance and/or an open/closed circuit condition.

For the first state of pest sensing circuit 1252, controller circuit 1240 outputs a signal via contact GP0 to indicator 1136 (one of LEDs 1124) of arrangement 1230 to cause it to emit light, while indicator 1138 (another of LEDs 1124) of arrangement 1230 remains unilluminated. This condition can be considered a first light emitting configuration of arrangement 1230. Controller circuit 1240 responds to the detection of the change in status of the pest sensing circuit 1252 from the first state to the second state by adjusting its output to discontinue illuminating indicator 1136 via output through contact GP2/TOCK1 and to begin illuminating indicator 1138. This condition can be considered a second light emitting configuration of arrangement 1230.

In one form, indicator 1136 is a green colored LED 1124 that is pulsed with the output from controller circuit 1240 to intermittently emit light in a blinking pattern and/or vary the intensity of emitted light for the first light emitting configuration; and indicator 1138 is a red colored LED 1124 that is pulsed by the output from controller circuit 1240 to intermittently emit light in a blinking pattern and/or vary intensity of emitted light for the second light emitting configuration. Such blinking patterns can include alternating the light emitting device between an "on state" and an "off state." A given state of a pest sensor can be represented by a variation in the emitted light that is periodic and/or in accordance with a predefined pattern of variation. Such variation can be based on change in intensity, reflection, direction, refraction, filtering, and/or blocking of the emitted light. In one nonlimiting form, light intensity is varied between two nonzero intensity levels. In other forms, the illumination may be approximately constant for a given state; the coloration type and number of light emitting indicators may vary; and/or the light emitting configurations may be different.

It should be understood that when power is no longer available from source 1225, neither indicator 1136 nor indicator 1138 will illuminate, indicating a power failure. The monitoring of pest sensing circuit 1252, the detection of a change of state, the adjustment of one or more output signals from controller circuit 1240 to arrangement 1230, or other operations can be performed in accordance with the operating logic executed by controller circuit 1240. This operating logic can be in the form of programming instructions, dedicated circuitry, a combination of these, and/or such different forms as would occur to those skilled in the art. By way of nonlimiting example, for the PIC12C5XX controller embodiment previously described, at least a portion of the operating logic is in the form of programming instructions stored in a resident, nonvolatile memory.

Through the operation of circuitry 1220, a two-state signal is provided with indicators 1136 and 1138 that each visually indicates whether or not the electrical continuity/resistance of pest sensing circuit 1252 has been altered relative to an established threshold. This two-state signal can be used to determine when to reconfigure pest control device 1210 to add a pesticide, exchange pest monitoring arrangement 1260 with a pesticide delivery arrangement, and/or prompt another action. Such other actions may include installing additional devices with or without pesticide. In still a further embodiment, pest control device 1210 is configured to initially include a pesticide laden bait so that circuitry 1220 provides information indicative of pesticide consumption.

In other embodiments, only a single indicator is used for arrangement 1230. For one form of this embodiment, an LED only illuminates when pest activity is detected or when pest activity is not detected, but not for both. For another form of this embodiment, a multicolor LED type of indicator is used instead of two discrete LED components. For other embodiments, one or more indicators other than an LED can be used. Such an indicator can be visual, audible, a combination of these, or such different type as would occur to those skilled in the art. In one example, the indicator is in the form of an incandescent lamp or electromechanical indicator. In another example, the indicator is in the form of an RF signal transmitter that outputs information provided by monitoring circuitry 1269 in response to a stimulus.

In yet another form, 1220, source 1225, indicator(s) 1136 and 1138 and/or other features of circuitry 1220 are configured as a unit that can engage and disengage from the rest of device 1210 by way of a connector or otherwise. For this form, such a unit could be used to interrogate multiple devices 1210 by manually engaging/disengaging each of the multiple devices 1210 in a desired sequence. In a further variation, such a unit could be configured to retain the information from multiple devices 1210.

In further embodiments, source 1225 can be of a form other than a battery, can be external to device 1210 and/or can be selectively applied to device 1210 by an operator. Alternatively or additionally, monitoring circuitry 1269 can be adapted to communicate different information about the device. In another example, controller circuit 1240 and arrangement 1230 can be added to wireless communication circuits of previously described pest control devices. Controller circuit 1240 is adapted to output indications corresponding to different nonzero levels of pest consumption or displacement of bait 1032 and/or corresponding alteration of pest sensing circuit 1252. Accordingly, information quantitizing the amount of alteration, consumption, and/or displacement can be realized. For such embodiments, the sensor arrangements of devices 310, 410, 510, 610, 710, and/or 810 can be utilized with appropriate adaptations to circuitry 1220. In one such form, multiple LEDs or another visual display outputs varying nonzero levels of consumption. In still another form, a single two-state indicating LED is utilized; however, a threshold level is set that corresponds to a given nonzero degree of alteration, consumption and/or displacement. This threshold can be factory set and/or set by an operator.

Generally, it should be appreciated that embodiments utilizing one or more light emitting indicators can flash, change color, change a blinking pattern, and/or vary intensity of the emitted light in accordance with one or more patterns to represent a given state. Likewise, a changing output pattern can be utilized with other types of output devices such as audible and mechanical indicator types, to name just a few.

Figure 29:
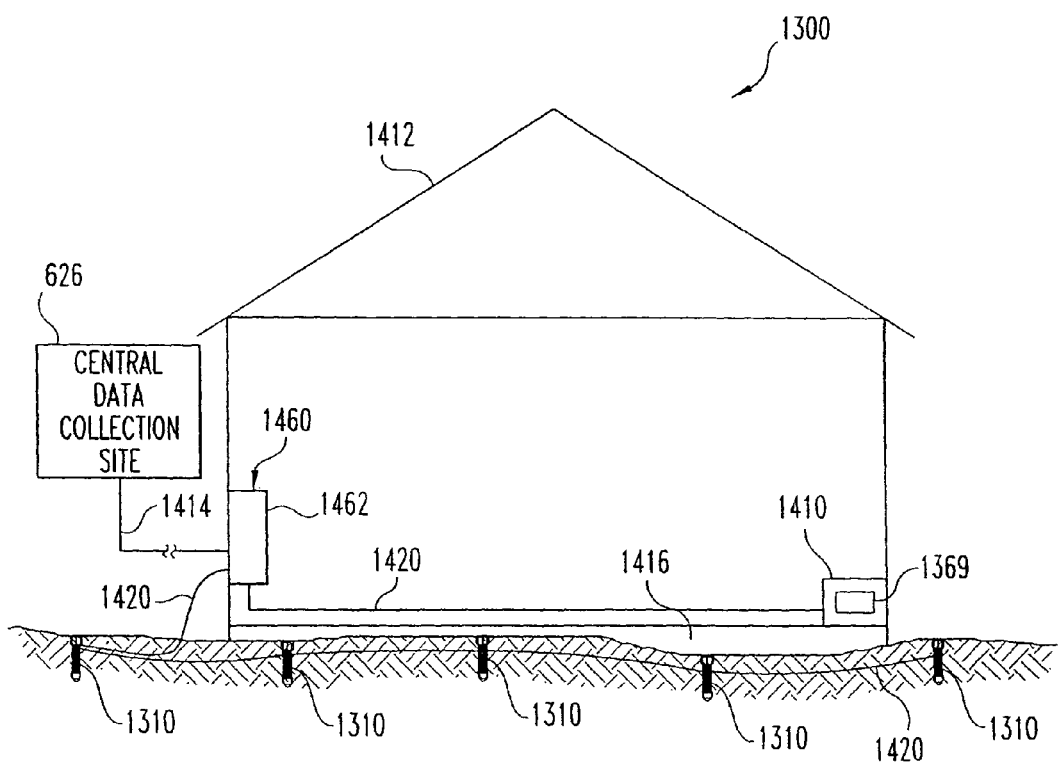
FIG. 29 is a partial diagrammatic view of an eleventh type of pest control system according to the present invention.

FIG. 29 illustrates a further type of pest control system 1300 that includes pest control devices 1310 and 1410, where like reference numerals refer to like features previously described. System 1300 includes building 1412 that houses system data collection device 1460 in the form of a display and control panel 1462. System 1300 also includes a central data collection site 626 (see FIG. 20) that is connected by communication pathway 1414 to device 1460. Communication pathway 1414 can be a hardwired connection through a computer network such as the internet, a dedicated telephone interconnection, a wireless link, a combination of these, or such other variety as would occur to those skilled in the art.

For system 1300, pest control devices 1310 are depicted in-ground and pest control device 1410 is depicted within building 1412. Pest control devices 1310 and 1410 are coupled by bus 1420 to device 1460 to selectively communicate therewith. Central data collection site 626 can be connected to a number of remotely located devices 1460 and/or units 390 (see FIGS. 11, 14, 17, and 20). Alternatively or additionally, central data collection site 626 can be arranged to monitor different buildings or areas through such units 390 or devices 1460 with one or more of pest control devices 110, 310, 410, 510, 610, 710, 810, 1010, 1110, 1210, 1310, and/or 1410.

Figure 30:
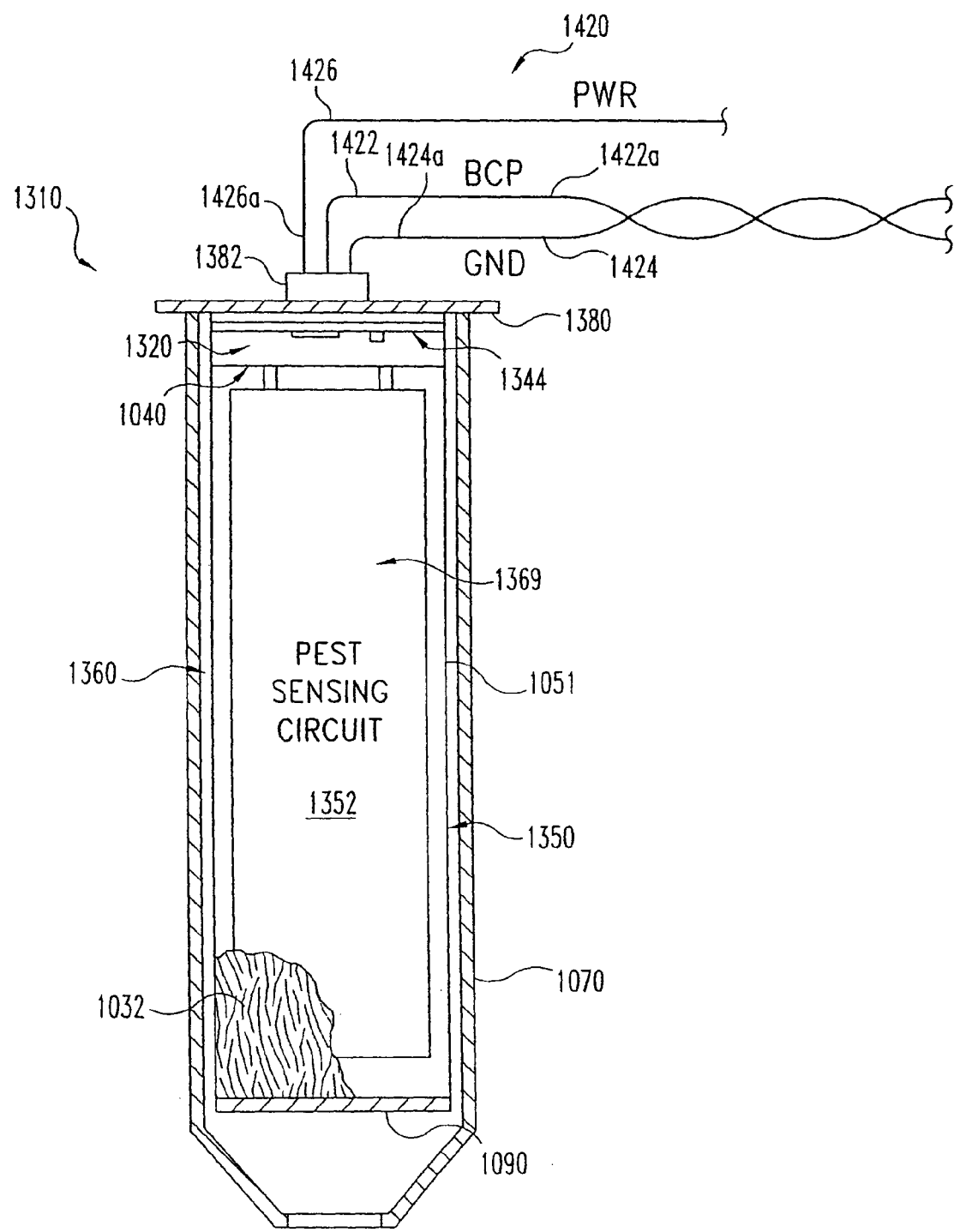
FIG. 30 is a partial diagrammatic view of an eleventh type of pest control device included in the system of FIG. 29.
Figure 31:
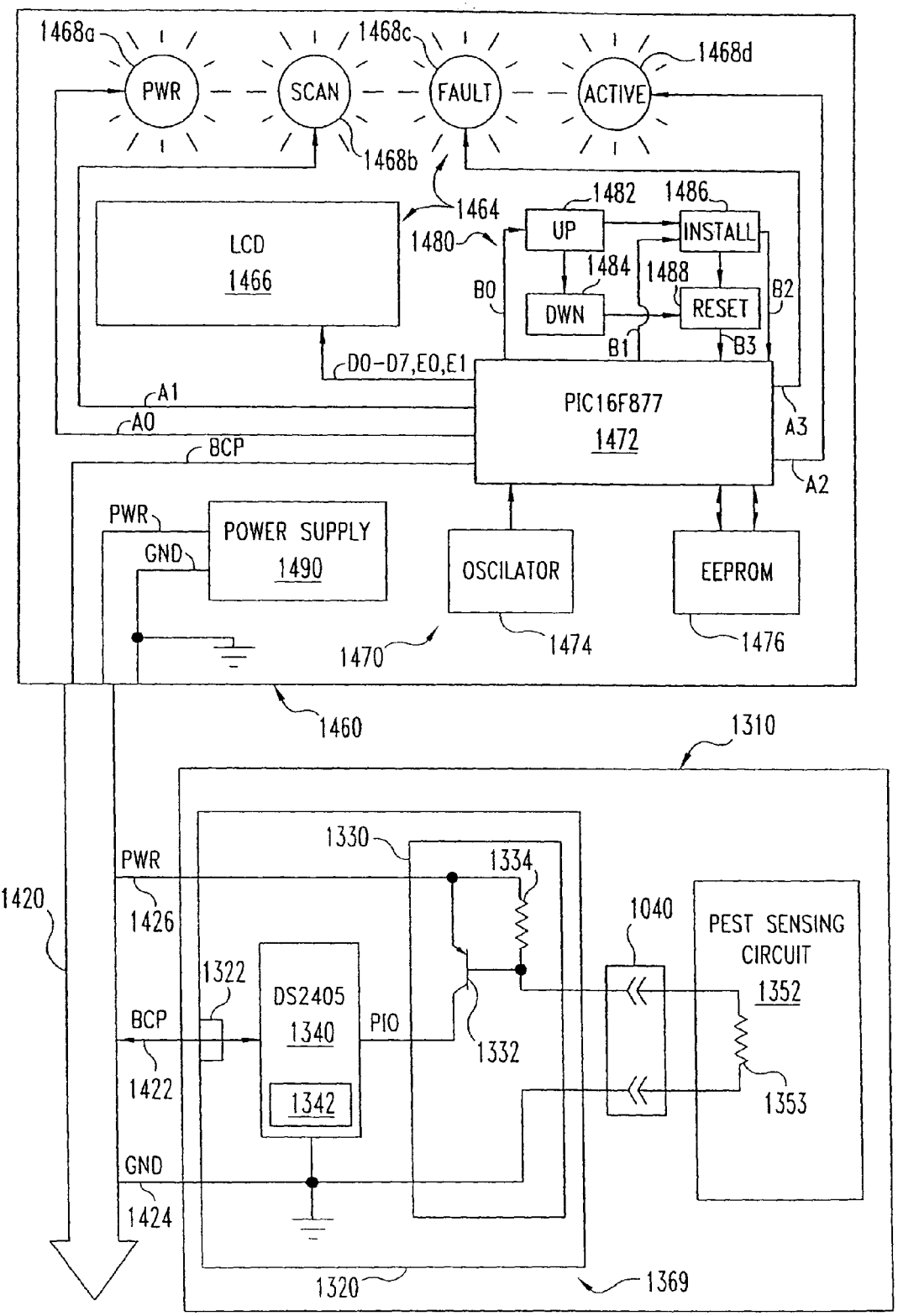
FIG. 31 is a schematic view of circuitry for the eleventh type of pest control system of FIG. 29.

Referring additionally to FIGS. 30 and 31, a representative pest control device 1310 of system 1300 is further depicted; where like reference numerals refer to like features. FIG. 31 also illustrates device 1460 in schematic form. Pest control device 1310 includes communication circuitry 1320, connector 1040, and sensor 1350 configured in a pest monitoring arrangement 1360 as shown in FIG. 30. Communication circuitry 1320 is coupled to bus 1420. Bus 1420 includes a two-way (bidirectional) communication pathway 1422 (also designated BCP) in the form of electrical conductor 1422a, a corresponding electrical ground line 1424 (also designated GND) in the form of electrical conductor 1424a, and a sensing circuit power supply line 1426 (also designated PWR) in the form of electrical conductor 1426*a*. As schematically shown in FIG. 30, conductors 1422 and 1424 may be a "twisted pair" configuration to assist with electrical noise elimination; however, in other embodiments a different wiring configuration could be utilized.

Communication circuitry 1320 includes addressable communication device 1340 connected to pathway 1422 of bus 1420, and also includes sensing interface 1330 coupled between device 1340 and pest sensing circuit 1352. The components of communication circuitry 1320 are assembled to provide circuit subassembly module 1344. Module 1344 can include a printed wiring board to electrically interconnect various components and/or other members to mechanically support communication circuitry 1320. Module 1344, and correspondingly communication circuitry 1320, are electrically and mechanically coupled to sensor 1350 by connector 1040. Connector 1040 can include an electrically conductive elastomeric material as described for connection members 140 of pest control device 110, and/or such different materials or configuration as would occur to one skilled in the art.

Sensor 1350 includes substrate 1051 carrying pest sensing circuit 1352. Pest sensing circuit 1352 includes an electrically conductive loop or network that has an electrical resistance below a predefined level when installed and that is subject to alteration by pest activity as previously described for conductor 153 of pest control device 110. Substrate 1051 and/or pest sensing circuit 1352 include material that is typically displaced or consumed by one or more pests to be monitored with arrangement 1360. When coupled to communication circuitry 1320, pest sensing circuit 1352 cooperates therewith to provide monitoring circuitry 1369.

Pest monitoring arrangement 1360 further includes bait 1032, a surface of which is shown by the cut away view in the lower portion of FIG. 30. Bait 1032 can be configured the same as bait member 132 or any previously described variations thereof. In one arrangement, bait 1032 is in the form of at least two members positioned on opposing sides of sensor 1350 as depicted in FIGS. 3 and 6 for bait members 132 in relation to sensor 150 of pest control device 110.

Pest monitoring arrangement 1360 is configured as a portable unit for installation in and removal from housing 1070. Housing 1070 can be shaped and composed of material suitable for installation in the ground like housing 170 described in connection with pest control device 110. Sensor 1350 is fixed in relation to circuit subassembly module 1344 by connector 1040 which is in turn fixed to cap 1380 (shown in section). Carrying member 1090 provides further mechanical support for arrangement 1360, including one or more side members (not shown) connected to module 1344 and/or cap 1380. Cap 1380 can be configured comparably to cap 180 of pest control device 110, with modification to accommodate coupling of conductors 1422*a*, 1424*a*, and 1426*a* to device 1310 with connector 1382. Carrying member 1090 can be configured comparably to carrying member 190 of pest control device 110, and may be permanently fixed in relation to module 1344 and/or cap 1380, or selectively connected thereto.

Referring specifically to FIG. 31, further details of data collection device 1460 and pest control device 1310 are illustrated, it being understood that only one of devices 1310 is shown to enhance clarity. Device 1340 of pest control device 1310 is depicted in the form of an addressable semiconductor switch component provided by Dallas Semiconductor under model number DS2405. For this model, the DATA pin (Shown as BCP pathway connection in FIGS. 30 and 31) is connected to data pathway 1422 of bus 1420, providing a single bit, bidirectional communication port 1322 therewith. Likewise, the GND pin is connected to the ground line 1424 of bus 1420. The power supply line 1426 of bus 1420 (providing about 5 volts D.C. in this example), is connected to sensing interface 1330 to provide electrical power thereto. In the illustrated arrangement, device 1340 includes an internal capacitor (not shown) that stores electric charge sufficient to power its internal circuitry. This capacitor parasitically derives its stored energy from the voltage across pathway 1422 and ground line 1424. Because of this parasitic capacitive power source; device 1340 does not need to draw electrical power from power supply line 1426. Nonetheless, in other embodiments, device 1340 may additionally or alternatively receive power through a connection to power supply line 1426 and/or a different power source, such as one or more electrochemical cells to name just one example. Likewise, interface 1330 can be powered by more than one source and/or a different source such as one or more electrochemical cells or a capacitor, just to name a few.

Each addressable monitoring device 1340 includes a permanent, factory-inscribed identifier 1342 in the form of a binary number. Devices 1340 can be obtained in groups with each identifier 1342 being different from that of any other members in the group. Device 1340 is configured to compare its identifier to information received over bus 1420 to determine if it is being addressed. For a group of addressable communication devices 1340 with different individual identifiers 1342, each device 1340 can be uniquely addressed over pathway 1422. Once addressed, a given device 1340 can be interrogated to output the status of a separate input (I/P) node over pathway 1422—more particularly whether the I/P node is at a high or low binary logic level. For the DS2405 form of device 1340, the I/P node is a connection pin designated as the "PIO" pin, which is also capable of providing an output in various operating modes as an "open collector" type of node. Additional information concerning the model DS2405 form of device 1340 is provided in the "Dallas Semiconductor DS2405 Addressable Switch" data sheet obtained from the universal resource locator (URL) of www.maxim-ic.com on 16 Jul. 2002.

Interface 1330 includes PNP transistor 1332 with a collector connected to the I/P node of device 1340, an emitter coupled to power supply line 1426, and a base coupled between one contact of connector 1040 and resistor 1334. In one embodiment suitable for use with the DS2407 form of device 1340, transistor 1332 is of a model 2N3906 type and resistor 1334 is of a 220,000 ohm variety. When engaged with connector 1040, pest sensing circuit 1352 is placed between the base of transistor 1332 and electrical ground. In FIG. 31, pest sensing circuit 1352 is represented by resistor 1353.

Referring also to FIG. 29, pest control device 1410 is of a type suitable for use in building 1412, and is adapted to interface with bus 1420 in the manner described for device 1310. Accordingly, pest control device 1410 could be provided by modifying any of the previously described "in-building" devices 410, 510, and 610 depicted in FIG. 20 to include monitoring circuitry 1369. Although FIG. 29 presents only one pest control device 1410 and several pest control devices 1310, it should be understood that in other embodiments, more or fewer of each type could be utilized, either with or without one or more of pest control devices 110, 310, 410, 510, 610, 710, 810, 1010, 1110, and/or 1210. It should be appreciated communication port 1322 of each of the pest control devices 1310, 1410 is connected to a common electrical node 1423 provided by conductor 1422*a* of communication pathway 1422. Likewise, common electrical ground and power connections are shared through conductors 1424*a* and 1426*a*, respectively.

Data collection device 1460 individually interrogates pest control devices 1310 and 1410 and collects and stores data received in response over bus 1420. Data collection device 1460 also provides for an operator interface through various operator output devices 1464 and operator input devices 1480. Output devices 1464 include Liquid Crystal Display (LCD) 1466 capable of displaying designated alphanumeric strings, light emitting device 1468*a* to indicate power status, light emitting device 1468*b* to indicate scan status, light emitting device 1468*c* to indicate fault status, and light emitting device 1468*d* to indicate active status. Devices 1468*a*, 1468*b*, 1468*c*, and/or 1468*d* could be of an LED type, incandescent type, a different type, or combination of these types just to name a few.

Output devices 1464 are coupled to control circuitry 1470 of device 1460. Control circuitry 1470 includes controller 1472, oscillator 1474, and memory 1476. Controller 1472 is provided with operating logic in the form of programming instructions, dedicated logic circuitry, a combination of these, or such different forms as would occur to those skilled in the art. Various operations of control circuitry 1470 are implemented with controller 1472 according to this operating logic, including, but not limited to communications over bus 1420; data processing, storage, and retrieval; and directing input and output operations. In one embodiment, controller 1472 is of a form provided by Microchip Technologies under model number PIC16F877, with at least a portion of its operating logic provided as programming instructions. Controller 1472 includes a single bit, bidirectional I/O port arrangement to communicate over pathway 1422 of bus 1420. Oscillator 1474 is of a standard type provided to generate clock signals for operation of controller 1472. Memory 1476 is shown as being of a nonvolatile Electrically Erasable Programmable Read Only Memory (EEPROM); however, it can be of one or more other types such as a flash memory, battery backed-up Random Access Memory (RAM), magnetic bubble memory, optical or electromagnetic disc, Dynamic RAM (DRAM), and/or Static RAM (SRAM), to name just a few. If a nonvolatile type is used, it could be reloaded as needed from an external device, such as site 626 via pathway 1414 and/or an input device such as a disk drive (not shown). Alternatively or additionally, a personal computer (not shown) could be coupled to device 1460 through which pathway 1414 is established over a computer network, such as the Internet. This personal computer could also or instead provide means to communicate data and/or programming from/to device 1460.

Device 1460 further includes operator input devices 1480 in the form of pushbutton switches 1482, 1484, 1486, and 1488 coupled to controller 1472 to provide four unique inputs: up, down, install, and reset, respectively, to control circuitry 1470. Power supply 1490 is also included that provides electrical power to components of device 1460 and bus 1420. For an embodiment implemented with the PIC16F877 form of controller 1472, pins A0-A3 are coupled to devices 1468*a*-1468*d*; pins D0-D7, E0, and E1 are coupled to LCD 1466; and pins B0-B3 are coupled to input devices 1480 in an appropriate manner.

Referring generally to FIGS. 29-31, various modes of operation of system 1300 are further described. Data collection device 1460 and pest control devices 1310, 1410 are arranged for placement in a region to be monitored, such as building 1412 and the region surrounding it. Pest control devices 1310, 1410 are installed and coupled to data collection device 1460 by bus 1420. For the depicted embodiment, pest control device 1310 is suitable for installation in the ground. Indeed, during normal use, one or more pest control devices 1310 are installed at least partially below ground, while pest control device 1410 is installed in building 1412. Data collection device 1460 is also installed in building 1412 as illustrated in FIG. 29.

For a group of devices 1310 and 1410 each having a different identifier 1342, members of this group can each be uniquely addressed as slaves on bus 1420 with respect to a bus master. For system 1300, the bus master operation is performed in accordance with operating logic of controller 1472. When a device 1340 is uniquely addressed by controller 1472 over bus 1420, a protocol is established that permits I/P node status interrogation to be sent by controller 1472. In response to such interrogation, the uniquely addressed device 1340 transmits the logic state of its corresponding I/P node over pathway 1422 as previously described.

The logic state of the I/P node is determined by the status of pest sensing circuit 1352. If pest sensing circuit 1352 is intact and electrically coupled across the base of transistor 1332 and ground by connector 1040, the voltage divider formed by resistors 1334 and 1353 presents a voltage across the base and emitter that turns-on transistor 1332. As previously described in connection with other embodiments, if one or more pests displace material such that pest sensing circuit 1352 becomes electrically open or of a sufficiently greater electrical resistance, then the voltage across the base and emitter decreases to turn-off transistor 1332. As the on/off status of transistor 1332 changes, so does the logic level presented at the I/P node of device 1340.

The operating logic of controller 1472 recognizes and stores data corresponding to the identifiers 1342 of the group of installed pest control devices 1310, 1410; where such identifiers 1342 are each unique relative to the others within this group. Installation of individual pest control devices is indicated by an operator with pushbutton 1486. A list of installed pest control devices 1310, 1410 can be generated and displayed with display 1466. The operator can scroll-up and down this list with pushbuttons 1482 and 1484, respectively. The control circuitry 1470 can be reset with pushbutton 1488.

The operating logic of controller 1472 is further provided to appropriately illuminate device 1468*a* to indicate power is provided and device 1468*d* to indicate system 1300 is active. Further, in accordance with its programming, controller 1472 periodically scans the coupled pest control devices 1310, 1410 one-by-one, interrogating each about the status of the corresponding pest sensing circuit 1352 as reflected by the logic level on the I/P node of the respective device 1340. Device 1468*b* is illuminated by controller 1472 to indicate this operation. As the pest control devices 1310, 1410 are individually addressed, the resulting status is transmitted by the corresponding device 1340 to control circuitry 1470 over pathway 1422 and stored. The list of installed pest control devices 1310, 1410 presented with display 1466 is updated to reflect: (1) if it is "active" and (2) if pest presence is indicated by a change in state of the I/P node of one or more of devices 1310, 1410. The "active" status of a given device 1310 or 1410 can be indicated by a switch or other circuit function that changes in response to the mechanical connection of substrate 1051 to connector 1040 as previously described in connection with pest control device 1210.

If a change in state indicative of pest presence occurs, a fault is indicated and controller 1472 is programmed to illuminate device 1468*c* to indicate a "fault" condition. A corresponding audible alarm could alternatively or additionally be generated (not shown). If not apparent from the information shown with display 1466, the fault indication can prompt an operator to scroll through the list to find any pest control devices with a fault.

Once the presence of one or more pests is determined, one mode of operation reports the fault to a central data site 626 via pathway 1414 and/or causes a pest control service provider to inspect system 1300 and take further action as deemed appropriate. Alternatively or additionally, an operator at building 1412 can report the fault to a pest control service provider. In another mode, the occupant of building 1412 can address the detection of pests without notifying a remotely located pest control service provider. The actions that might be taken by the operator and/or a notified pest control service provider include reconfiguring one or more of pest control devices 1310, 1410 to add a pesticide by exchanging pest monitoring arrangement 1360 with a pesticide delivery arrangement. Other actions may include installing additional devices with or without pesticide. In still a further embodiment, pest control device 1310, 1410 is configured to initially include a pesticide laden bait so that communication circuitry 1320 provides information indicative of pesticide consumption.

In a different embodiment, the I/P node is interfaced to pest sensing circuit 1352 without a transistor. In still other embodiments, different resistor values and/or a different type of switching device is used in addition or as an alternative to transistor 1332. Such alternative arrangements can include an NPN bipolar junction transistor, a Field Effect Transistor (FET), an electromechanical relay, or a Solid State Relay (SSR) in place of PNP transistor 1332 with corresponding adjustments to circuitry 1320, to name only a few possibilities.

In other embodiments, addressable communication device 1340 is of type other than model DS2405 and/or provided by custom circuitry comprised of one or more components suitable to interface with pest sensing circuit 1352 directly or through interface 1330. In one such alternative, identifiers 1342 of each of devices 1310, 1410 can be assigned or changed electronically and/or mechanically. In another alternative, monitoring circuitry 1369 and/or device 1340 is adapted to communicate different information about the device, such as changes in nonzero levels of pest consumption or displacement to quantitize the amount of consumption or displacement realized. For such embodiments, the sensor arrangements of devices 310, 410, 510, 610, 710, and/or 810 can be utilized with appropriate adaptations to communication circuitry 1320. Further, multiple devices 1340 can be used in the same pest control device with appropriate support circuitry to reflect different discrete levels of consumption or displacement.

Controller 1472 can be provided by a type other than a PIC16F877, and/or comprised of one or more components suitably arranged to perform the operations described in connection with control circuitry 1470. Correspondingly, support components such as oscillator 1474 and/or memory 1476 can differ, be used with other components, or may be absent. Different types of output devices 1464 can be used in other embodiments such as a plasma display, electromechanical indicators, or a Cathode Ray Tube (CRT), to name only a few. Different types of input devices 1480 can be used in other embodiments such as toggle switches, an alphanumeric keyboard or keypad, a pointing device such as a noise or light pin used in concert with a display, or a voice recognition subsystem, to name just a few.

In other embodiments, bus 1420 can be of an optical variety using an optic fiber or other transmission means. Alternatively, bus 1420 can be arranged with one-way communication along a given pathway rather then being bidirectional in all embodiments. For such an example, multiple communication pathways can be used with at least one pathway being master-to-slave and another being slave-to-master. Also, further embodiments can be configured for a parallel communication format as an additional or alternative to serial communication. Likewise, any compatible bus protocol can be used.

In still another form, communication circuitry 1320 and/or control circuitry 1470 are provided in the form of a wireless signal transponder that can be active or passive in nature. In a further variation, communication circuitry 1320 and/or control circuitry 1470 is adapted to provide for wireless and/or manual interrogation using techniques of previously described embodiments.

In still other embodiments, pest control devices 310, 410, 510, 610, 710, 810, 1010, 1110, 1210, 1310, or 1410 can include one or more bait members 132 as described in connection with pest control device 110 of system 20. Furthermore, any of pest control devices 110, 310, 410, 510, 610, 710, 810, 1010, 1110, 1210, 1310, and 1410 can be configured for in-ground placement, on-ground placement, or above-ground placement. In another embodiment, a pest control device is adapted to combine the sensing techniques of two or more of pest control devices 110, 310, 410, 510, 610, 710, 810, 1010, 1110, 1210, 1310, or 1410. Additionally or alternatively, two or more different types of pest control devices 110, 310, 410, 510, 610, 710, 810, 1010, 1110, 1210, 1310, and 1410 can be used to monitor pest activity and/or deliver pesticide in a common region.

In further embodiments, pest control devices 110, 310, 410, 510, 610, 710, 810, 1010, 1110, 1210, 1310, or 1410 can be arranged to be completely or partially replaced by a pesticide delivery device once pests are detected. This replacement can include removing a communication circuit module or other circuitry from a pest monitoring arrangement for incorporation into a pesticide delivery arrangement. Any of pest control devices 110, 310, 410, 510, 610, 710, 810, 1010, 1110, 1210, 1310, or 1410 can be configured to simultaneously monitor pest activity and deliver pesticides in other embodiments. Alternatively or additionally, pest control devices 110, 310, 410, 510, 610, 710, 810, 1010, 1110, 1210, 1310, and/or 1410 can be configured to automatically deliver pesticide once a given degree of pest consumption or displacement is detected. For this arrangement, delivery can be triggered automatically in accordance with monitoring data and/or by an external command received via a communication circuit.

Figure 32:
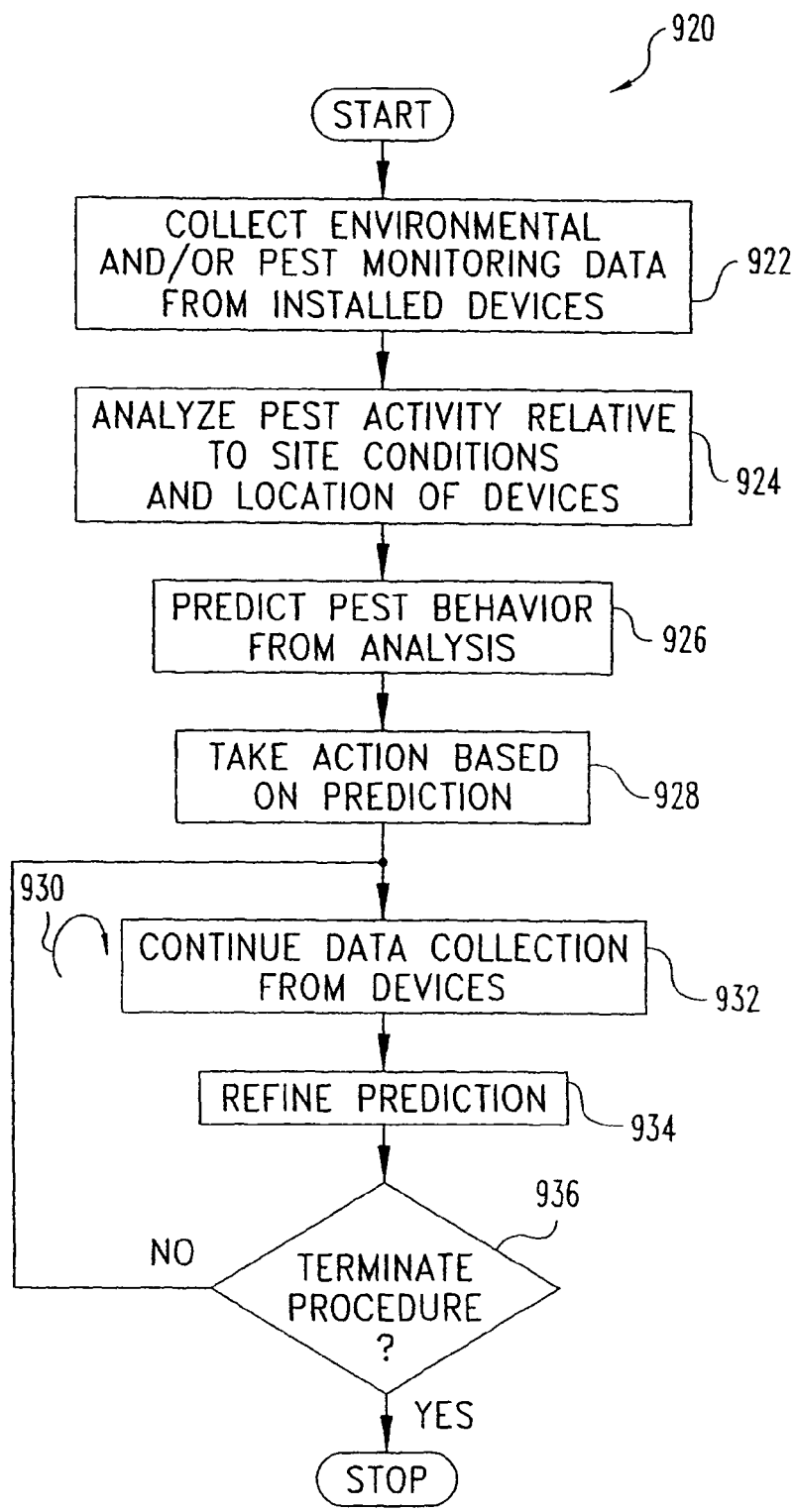
FIG. 32 is a flowchart of one example of a procedure of the present invention that may be performed with one or more different types of the pest control devices.

The flowchart of FIG. 32 depicts procedure 920 of yet another embodiment of the present invention. In stage 922 of process 920, data is collected from one or more devices 110, 310, 410, 510, 610, 710, 810, 1010, 1110, 1210, 1310, and/or 1410. In stage 924, gathered data is analyzed relative to environmental conditions and/or location. Next, pest behavior is predicted from this analysis in stage 926. In accordance with the predictions of stage 926, action is taken in stage 928 that may include installation of one or more additional devices.

Next, loop 930 is entered with stage 932. In stage 932, data collection from devices continues and pest behavior predictions are refined in stage 934. Control then flows to conditional 936 that tests whether to continue procedure 920. If procedure 920 is to continue, loop 930 returns to stage 932. If procedure 920 is to terminate in accordance with the test of conditional 936, the procedure is then halted.

Examples of other actions that may be additionally or alternatively performed in association with stage 928 include the application of pest behavior patterns to better determine the direction pests may be spreading in a given region. Accordingly, warnings based on this prediction may be provided. Also, advertising and marketing of pest control systems can target sites that, based on procedure 920, are more likely to benefit. Further, this information may be evaluated to determine if the demand for pest control servicing in accordance with one or more embodiments of the present invention seasonally fluctuates. Allocation of pest control resources, such as equipment or personnel, may be adjusted accordingly. Further, the placement efficiency of pest control devices may be enhanced.

In other alternative embodiments, devices 110, 310, 410, 510, 610, 710, 810, 1010, 1110, 1210, 1310, and 1410, and corresponding interrogators, data collection units and data collectors may be used in various other system combinations as would occur to one skilled in the art. While Interrogator 30 and wand 1102 are each shown in a hand-held form, in other embodiments, such interrogation devices can be in a different form, carried by a vehicle, or installed in a generally permanent location. Indeed, a data collection unit can be utilized to directly interrogate/receive information from a pest control device. Also, while bait for devices 110, 310, 410, 510, 610, 710, 810, 1010, 1110, 1210, 1310, and 1410 may be provided in an edible form suitable for termites, a bait variety selected to control a different type of pest, insect or non-insect, may be selected and the device housing and other characteristics adjusted to suit monitoring and extermination of the different type of pest. Moreover, bait for devices 110, 310, 410, 510, 610, 710, 810, 1010, 1110, 1210, 1310, and 1410 may be of a material selected to attract the targeted species of pest that is not substantially consumed by the pest. In one alternative, one or more pest control devices include non-food material that is displaced or altered by targeted pests. By way of nonlimiting example, this type of material may be used to form a non-consumable sensing member substrate with or without consumable bait members. Moreover, any of the pest control devices of the present invention can include one or more components that are potted with a polyurethane or other appropriate resin, or coated with epoxy or other appropriate resin to reduce the intrusion of moisture. In one alternative embodiment of that illustrated in FIGS. 3-5, there is no inner lip 123 of cover piece 120 and o-ring 124 is absent. For this alternative embodiment, base 130 is ultrasonically welded to cover piece 120 and a polyurethane potting material is utilized to fill any unoccupied space remaining in cavity 122 after assembly of circuit enclosure 118 to reduce moisture contact with circuitry 160. However, it should be appreciated that in other embodiments of the present invention, it may not be desirable to address intrusion of moisture or another substance in this manner, it my be addressed in a different manner as would occur to those skilled in the art, or it may not be addressed at all.

In further alternatives, one or more pest control devices according to the present invention lack a housing, such as housing 170 or housing 1070 (and correspondingly cap 180, cap 1080, cap 1180, cap 1280, or cap 1380). Instead, for this embodiment the housing contents may be placed directly in the ground, on a member of a building to be monitored, or arranged in a different configuration as would occur to those skilled in the art. Also, any of the pest control devices of the present invention may be alternatively arranged so that bait consumption or displacement of a sensing member causes movement of a conductor to close an electrical pathway instead of causing an open circuit.

Pest control devices based on wireless communication techniques may alternatively or additionally include hardwired communication connections to interrogators, data collection units, data collectors, or such other devices as would occur to those skilled in the art. Hardwired communication may be used as an alternative to wireless communication for diagnostic purposes, when wireless communication is hampered by local conditions, or when a hardwired connection is otherwise desired. Moreover process 220 and procedure 920 may be performed with various stages, operations, and conditionals being resequenced, altered, rearranged, substituted, deleted, duplicated, combined, or added to other processes as would occur to those skilled in the art without departing from the spirit of the present invention.

In another embodiment, a pest control device includes circuitry coupled to one or more sensing elements with one or more elastomeric connection members. The one or more elastomeric connection members can be comprised of a carbon-containing synthetic compound, such as silicone rubber.

For still a further embodiment, a pest control device includes a bait operable to be consumed or displaced by one or more species of pest, a pest sensing circuit proximate to the bait, and an indicator arrangement. Also included is a controller circuit operatively coupled to the pest sensing circuit and indicator arrangement that monitors the pest sensing circuit, detects a change of status of the pest sensing circuit, and provides one or more signals to the indicator arrangement corresponding to this change of status. The indicator arrangement changes its output in response to these one or more signals. This embodiment may further include a structure operable to at least partially enclose the bait, the pest sensing circuit, and the controller circuit; and which is further arranged to position at least a portion of the indicator arrangement to be visible to an operator. In one form, the indicator arrangement is comprised of two light emitting components where one of these components is at least intermittently illuminated before the change of status and another of these components is at least intermittently illuminated after the change of status. Other embodiments include a system comprising several such pest control devices.

Yet another embodiment includes: installing a plurality of pest control devices each including a respective bait for one or more species of pest; a respective pest sensing circuit; a respective indicator arrangement; and a respective controller circuit; indicating a first state of one of the pest control devices with the respective indicator arrangement; detecting a change in status of the respective pest sensing circuit with the respective controller circuit; adjusting one or more output signals from the respective controller circuit in response to the change in status; and indicating a second state of the one of the pest control devices with the respective indicator arrangement in response to this adjustment.

A further embodiment of the present invention includes a group of pest control devices. These devices each have a bidirectional communication port, a pest sensing circuit to detect activity of one or more species of pests, a bait, and an identifier that is unique in relation to the identifier of any other of the devices in the group. A bidirectional communication pathway connects the bidirectional communication port of each of the pest control devices to a data collection device. The data collection device is operable to address a selected one of the pest control devices over the bidirectional communication pathway based on uniqueness of the identifier of the selected one of the pest control devices and receive status of the pest sensing circuit of the selected one of the pest control devices.

Yet a further embodiment of the present invention includes: operating a data collection device coupled to a group of pest control devices by a communication pathway, the pest control devices each including a communication port, a pest sensing circuit, and an address unique in relation to the address of any other of the pest control devices in the group; sensing termites with the pest sensing circuit of one of the pest control devices;

and receiving sensed information from the one of the pest control devices in response to transmitting an address from the data collection device.

Yet still a further embodiment of the present invention includes: operating a plurality of pest control devices each including a bait for one or more species of pest; a respective pest sensing circuit; a respective visual indicator arrangement; and a respective controller circuit; and providing light from the respective visual indicator arrangement of one of the pest control devices in accordance with a periodic pattern of variation to represent one state of the one of the pest control devices.

Another form includes: installing a plurality of pest control devices each including a bait, a pest sensing circuit; a visual indicator arrangement, and a controller circuit; emitting light of a first color from the indicator arrangement of one of the devices to represent a first state; detecting a change in status of the pest sensing circuit of the one of the pest control devices; adjusting one or more output signals from the controller circuit for the one of the pest control devices in response to the change in status; and emitting light of a second color different than the first color from the visual indicator arrangement of the one of the pest control device to represent a second state of the respective pest sensing circuit different than the first state.

All publications, patents, and patent applications cited in this specification are herein incorporated by reference as if each individual publication, patent, or patent application were specifically and individually indicated to be incorporated by reference and set forth in its entirety herein, including but not limited to, U.S. patent application Ser. No. 10/103,460 filed 21 Mar. 2002, U.S. patent application Ser. No. 09/925,392 filed 9 Aug. 2001, International Patent Application Number PCT/US00/26373 filed 25 Sep. 2000, International Patent Application Number PCT/US99/16519 filed 21 Jul. 1999, U.S. patent application Ser. No. 09/669,316 filed 25 Sep. 2000, and U.S. patent application Ser. No. 09/812,302 filed 20 Mar. 2001. Further, any theory, proposed mechanism of operation, or finding stated herein is meant to further enhance understanding of the present invention, and is not intended to in any way limit the present invention to such theory, proposed mechanism of operation, or finding. While the invention has been illustrated and described in detail in the drawings and foregoing description, the same is to be considered as illustrative and not restrictive in character, it being understood that only the selected embodiments have been shown and described and that all changes, equivalents, and modifications that come within the scope of the invention defined herein or by following claims are desired to be protected.

What is claimed is:

1. A system, comprising: a plurality of pest control devices each including:
   a bait operable to be consumed or displaced by one or more species of pest;
   circuitry including a pest sensing circuit, an activation device and an indicating device, the activation device being operable to selectively activate the circuitry as directed by an operator and the indicating device being operable to provide the operator information about the pest sensing circuit in response to activation of the circuitry with the activation device; and
   a housing at least partially enclosing the bait and the circuitry, the activation device and the indicating device are mounted to the housing, the indicating device including a visual indicator and the activation device being a switch.

2. The system of claim 1, wherein the pest sensing circuit is carried on a substrate operable to be selectively connected and disconnected from the circuitry.

3. The system of claim 1, wherein the indicating device is a light emitting diode, and further including a transistor and a power source selectively coupled together by the switch.

4. The system of claim 1, wherein the pest sensing circuit includes an electrically conductive loop on a substrate configured to be altered by consumption or displacement by the one or more species of pest.

5. The system of claim 1, wherein the bait includes a pesticide.

6. The system of claim 1, wherein the bait is of a monitoring type selected for one or more varieties of termites.

* * * * *